United States Patent
Shacham et al.

(10) Patent No.: US 12,020,027 B2
(45) Date of Patent: *Jun. 25, 2024

(54) CONVOLUTIONAL NEURAL NETWORK ON PROGRAMMABLE TWO DIMENSIONAL IMAGE PROCESSOR

(71) Applicant: Google LLC, Mountain View, CA (US)

(72) Inventors: Ofer Shacham, Los Altos, CA (US); David Patterson, Kensington, CA (US); William R. Mark, Mountain View, CA (US); Albert Meixner, Mountain View, CA (US); Daniel Frederic Finchelstein, Redwood City, CA (US); Jason Rupert Redgrave, Mountain View, CA (US)

(73) Assignee: Google LLC, Mountain View, CA (US)

( * ) Notice: Subject to any disclaimer, the term of this patent is extended or adjusted under 35 U.S.C. 154(b) by 759 days.

This patent is subject to a terminal disclaimer.

(21) Appl. No.: 17/028,097

(22) Filed: Sep. 22, 2020

(65) Prior Publication Data
US 2021/0004633 A1   Jan. 7, 2021

Related U.S. Application Data

(63) Continuation of application No. 15/631,906, filed on Jun. 23, 2017, now Pat. No. 10,789,505, which is a
(Continued)

(51) Int. Cl.
*G06N 3/06*      (2006.01)
*G06F 9/30*      (2018.01)
(Continued)

(52) U.S. Cl.
CPC ........ *G06F 9/3001* (2013.01); *G06F 9/30032* (2013.01); *G06F 9/30036* (2013.01);
(Continued)

(58) Field of Classification Search
CPC .......... G06K 9/56; G06K 9/46; G06F 9/3001; G06F 9/30032; G06F 9/30036;
(Continued)

(56) References Cited

U.S. PATENT DOCUMENTS 4,445,177 A   4/1984   Bratt et al.
4,935,894 A   6/1990   Ternes et al.
(Continued)

FOREIGN PATENT DOCUMENTS

EP   0293701   12/1988
EP   0303204   2/1989
(Continued)

OTHER PUBLICATIONS

Peemen et al., "Memory-Centric Accelerator Design for Convolutional Neural Networks", IEEE 2013. (Previously supplied). (Year: 2013).*

(Continued)

*Primary Examiner* — Dave Misir
(74) *Attorney, Agent, or Firm* — Fish & Richardson P.C.

(57) ABSTRACT

A method is described that includes executing a convolutional neural network layer on an image processor having an array of execution lanes and a two-dimensional shift register. The two-dimensional shift register provides local respective register space for the execution lanes. The executing of the convolutional neural network includes loading a plane of image data of a three-dimensional block of image data into the two-dimensional shift register. The executing of the convolutional neural network also includes performing a two-dimensional convolution of the plane of image data with an array of coefficient values by sequentially: concurrently multiplying within the execution lanes respective pixel and coefficient values to produce an array of partial products; concurrently summing within the execution lanes
(Continued)

the partial products with respective accumulations of partial products being kept within the two dimensional register for different stencils within the image data; and, effecting alignment of values for the two-dimensional convolution within the execution lanes by shifting content within the two-dimensional shift register array.

18 Claims, 46 Drawing Sheets

Related U.S. Application Data continuation of application No. 15/201,204, filed on Jul. 1, 2016, now Pat. No. 10,546,211.

(51) Int. Cl.
  *G06F 9/38* (2018.01)
  *G06N 3/045* (2023.01)
  *G06N 3/063* (2023.01)
  *G06T 1/60* (2006.01)
  *G06T 5/20* (2006.01)

(52) U.S. Cl.
  CPC .......... *G06F 9/3885* (2013.01); *G06F 9/3887* (2013.01); *G06N 3/045* (2023.01); *G06N 3/063* (2013.01); *G06T 1/60* (2013.01); *G06T 5/20* (2013.01); *G06T 2200/28* (2013.01); *G06T 2207/20084* (2013.01)

(58) Field of Classification Search
  CPC ... G06F 9/3885; G06F 9/3887; G06N 3/0454; G06N 3/063; G06T 1/60; G06T 5/20; G06T 2200/28; G06T 2207/20084; G06T 1/20; G06T 2207/2008; G06V 10/36; G06V 10/40
  USPC ......................................................... 706/15
  See application file for complete search history.

(56) References Cited

U.S. PATENT DOCUMENTS

| | | | |
|---|---|---|---|
| 5,253,308 A | 10/1993 | Johnson | |
| 5,612,693 A | 3/1997 | Craft et al. | |
| 5,751,864 A | 5/1998 | Moriwake et al. | |
| 5,892,962 A | 4/1999 | Cloutier | |
| 6,049,859 A | 4/2000 | Gliese et al. | |
| 6,366,289 B1 | 4/2002 | Johns | |
| 6,587,158 B1 | 7/2003 | Dale et al. | |
| 6,728,862 B1 | 4/2004 | Wilson | |
| 6,745,319 B1 | 6/2004 | Balmer et al. | |
| 6,970,196 B1 | 11/2005 | Masatoshi et al. | |
| 7,010,177 B1 | 3/2006 | Mattison | |
| 7,167,890 B2 | 1/2007 | Lin et al. | |
| 7,200,287 B2 | 4/2007 | Fukuda et al. | |
| 7,286,717 B2 | 10/2007 | Nomizu | |
| 7,583,851 B2 | 9/2009 | Kudo et al. | |
| 7,941,634 B2 | 5/2011 | Georgi et al. | |
| 8,156,284 B2 | 4/2012 | Vorbach et al. | |
| 8,321,849 B2 | 11/2012 | Nickolls et al. | |
| 8,436,857 B2 | 5/2013 | Twilleager | |
| 8,442,927 B2 | 5/2013 | Chakradhar et al. | |
| 8,508,612 B2 | 8/2013 | Cote et al. | |
| 8,543,843 B1 | 9/2013 | Cheng et al. | |
| 8,650,384 B2 | 2/2014 | Lee et al. | |
| 8,749,667 B2 | 6/2014 | Noraz et al. | |
| 8,786,614 B2 | 7/2014 | Curry et al. | |
| 8,797,323 B2 | 8/2014 | Salvi et al. | |
| 8,823,736 B2 | 9/2014 | Barringer et al. | |
| 8,970,884 B2 | 3/2015 | Tsuji et al. | |
| 8,976,195 B1 | 3/2015 | Lindholm et al. | |
| 2005/0270412 A1 | 12/2005 | Kaman et al. | |
| 2006/0044576 A1 | 3/2006 | Tabata et al. | |
| 2007/0047828 A1 | 3/2007 | Ishii et al. | |
| 2007/0080969 A1 | 4/2007 | Yamaura | |
| 2007/0156729 A1 | 7/2007 | Shaylor | |
| 2008/0111823 A1 | 5/2008 | Fan et al. | |
| 2008/0244222 A1 | 10/2008 | Supalov et al. | |
| 2009/0002390 A1 | 1/2009 | Kuna | |
| 2009/0228677 A1 | 9/2009 | Lieqe | |
| 2009/0300621 A1 | 12/2009 | Mantor et al. | |
| 2009/0317009 A1 | 12/2009 | Ren | |
| 2010/0122105 A1 | 5/2010 | Tughrul et al. | |
| 2010/0188538 A1 | 7/2010 | Suqawa et al. | |
| 2011/0029471 A1* | 2/2011 | Chakradhar | G06N 3/063 706/25 |
| 2011/0055495 A1 | 3/2011 | Wolford et al. | |
| 2011/0087867 A1 | 4/2011 | Jacobson et al. | |
| 2011/0125768 A1 | 5/2011 | Shibao | |
| 2011/0153925 A1 | 6/2011 | Bains et al. | |
| 2012/0320070 A1 | 12/2012 | Arva | |
| 2013/0027416 A1 | 1/2013 | Vaithianathan et al. | |
| 2013/0202051 A1 | 8/2013 | Zhou | |
| 2013/0243329 A1 | 9/2013 | Oro et al. | |
| 2013/0314428 A1 | 11/2013 | Chen et al. | |
| 2013/0318544 A1 | 11/2013 | Kuroda et al. | |
| 2014/0028876 A1 | 1/2014 | Mills | |
| 2014/0122551 A1* | 5/2014 | Dogon | G06F 17/16 708/200 |
| 2014/0136816 A1 | 5/2014 | Krig | |
| 2014/0282611 A1 | 9/2014 | Campbell et al. | |
| 2015/0086134 A1* | 3/2015 | Hameed | G06T 1/20 382/279 |
| 2015/0106596 A1 | 4/2015 | Vorbach et al. | |
| 2015/0178246 A1* | 6/2015 | Herrero Abellanas | G06F 17/153 708/300 |
| 2015/0294219 A1 | 10/2015 | Krizhevsky | |
| 2016/0179434 A1* | 6/2016 | Herrero Abellanas | G06F 17/153 711/155 |
| 2016/0219225 A1 | 7/2016 | Zhu et al. | |
| 2016/0313980 A1 | 10/2016 | Meixner et al. | |
| 2016/0313984 A1 | 10/2016 | Meixner et al. | |
| 2016/0313999 A1 | 10/2016 | Meixner et al. | |
| 2016/0314555 A1 | 10/2016 | Zhu et al. | |
| 2016/0316094 A1 | 10/2016 | Meixner et al. | |
| 2016/0316107 A1 | 10/2016 | Shacham et al. | |
| 2016/0316157 A1 | 10/2016 | Desai et al. | |
| 2017/0103311 A1* | 4/2017 | Henry | G06F 15/82 |

FOREIGN PATENT DOCUMENTS

| | | |
|---|---|---|
| EP | 3035204 | 6/2016 |
| JP | 2013-090070 | 5/2013 |
| WO | WO 1994/09595 | 4/1994 |
| WO | WO 2007/071883 | 6/2007 |
| WO | WO 2008/124061 | 10/2008 |
| WO | WO 2010/064728 | 6/2010 |

OTHER PUBLICATIONS

Chakradhar et al., "A Dynamically Configurable Coprocessor for Convolutional Neural Networks", ISCA'10, Jun. 19-23, 2010, Saint-Malo, France. (Previously supplied). (Year: 2010).*

Yang et al., "A Systematic Approach to Blocking Convolutional Neural Networks", Jun. 14, 2016. (Previously supplied). (Year: 2016).*

"ChimeraTM: The NVIDIA Computational Photography Architecture" Whitepaper, NVIDIA Corporation 2013, 15 pages.

"Multioutput Scaler Reference Design" Altera Corporation, Application Note AN-648-1.0, Aug. 2012, 18 pages.

Adams, et al. "The Frankencamera: An Experimental Platform for Computational Photography", ACM Transactions on Graphics, vol. 29, No. 4, Article 29, Publication Jul. 2010, 12 pages.

Ahn, et al., "Evaluating the Image Stream Architecture." In ACM SIGARCH Computer Architecture News, vol. 32, No. 2, IEEE Computer Society, Jun. 2004, 14 pages.

(56) References Cited

OTHER PUBLICATIONS

Arasan "Silicon Hive Announces New Image Signal Processor", Eindhoven, the Netherlands, May 16, 2006, http://www.design-reuse.com/new/13362/silicon-hive-image-signal-processor.html, 3 pages.

Balfour, et al., "An Energy-Efficient Processor Architecture For Embedded Systems" IEEE Computer Architecture Letters 7, No. 1 p. 29-32, May 2008.

Barry, et al., "Always-On Vision Processing Unit For Mobile Applications", IEEE Micro, Mar./Apr. 2015, pp. 56-66.

Bolotoff, Paul V., "Alpha-The History in Facts and Comments" http://alasir.com/articles/alpha_history/alpha_21164_21164pc.html. Last modification date Apr. 22, 2007, 5 pages.

Brunhaver, John S. "Design and Optimization of a Stencil Engine", Stanford University, Jun. 2015, 133 pages.

Bushey, et al., "Flexible Function-Level Acceleration of Embedded Vision Applications Using the Pipelined Vision Processor." In Signals, Systems and Computers, 2013 Asilomar Conference, pp. 1447-1452, IEEE, 2013.

Cardells-Tormo et al., "Area-efficient 2-D Shift-variant Convolvers for FPGA-based Digital Image Processing," IEEE Workshop on Signal Processing Systems Design and Implementation, Nov. 2, 2005, 5 pages.

CEVA-MM3101: An Imaging—Optimized DSP Core Swings for an Embedded Vision Home Run, http://www.bdti.com/InsideDSP/2012/01/24/CEVA, Jan. 19, 2012, 3 pages.

Chakradhar et al., "A Dynamically Configurable Coprocessor for Convolutional Neural Networks", ISCA'10, Jun. 19-23, 2010, Saint-Malo, France. (Year: 2010).

Chao et al., "Pyramid Architecture for 3840 x 2160 Quad Full High Definition 30 Frames/s Video Acquisition," IEEE Transactions on Circuits and Systems for Video Technology, Nov. 1, 2010, 10 pages.

Chen et al., "CRISP: Coarse-Grained Reconfigurable Image Stream Processor for Digital Still Cameras and Camcorders," IEEE Transactions on Circuits and Systems for Video Technology, Sep. 2008, 14 pages.

Chen, et al., "DaDianNao: A Machine-Learning Supercomputer." 47m Annual IEEE/ACM International Symposium, pp. 609-622, IEEE, Dec. 2014.

Chenyun, et al., "A Paradigm Shift in Local Interconnect Technology Design in the Era of Nanoscale Multigate and Gate-All-Around Devices," IEEE Electron Device Letters, vol. 36, No. 3, pp. 274-26, Mar. 2015.

Clearspeed Whitepaper: CSX Processor Architecture, www.clearspeed.com, 2007, 16 pages.

CN Office Action in Chinese Appln. No. 201710532146.4, dated Mar. 5, 2020, 32 pages (with English translation).

Codrescu, et al., "Hexagon DSP: An Architecture Optimized For Mobile Multimedia and Communications." IEEE Micro vol. 34, Issue 2, pp. 34-43, Mar. 2014.

Dally, William J., "Computer architecture is all about interconnect." Proceedings of 8th International Symposium High-Perf. Comp. Architecture, Feb. 2002, 11 pages.

de Dinechin, et al., "A Clustered Manycore Processor Architecture for Embedded and Accelerated Applications." In High Performance Extreme Computing Conference (HPEC), IEEE, pp. 1-6, Sep. 2013.

De Vito, et al., "Terra: A Multi-Stage Language for High-Performance Computing", PLDI'13, Jun. 16-22, 2013, Seattle, Washington, 11 pages.

De Vito, et al., "First-class Runtime Generation of High-Performance Types using Exotypes", PLDI'14, Jun. 9-11, ACM, 12 pages.

Dykes et al., "Communication and Computation Patterns of Large Scale Image Convolutions on Parallel Architectures," Parallel Processing Symposium, Jan. 1, 1994, 6 pages.

Eichenberger, et al., "Optimizing Compiler for the Cell Processor" PACT, Tuesday, Sep. 20, 2005, Part 1, pp. 1-16.

Eichenberger, et al., "Optimizing Compiler for the Cell Processor" PACT, Tuesday, Sep. 20, 2005, Part 2, pp. 17-32.

EyeQ2TM, "Vision System On A Chip", Mobileye, Sep. 2007, 4 pages.

Farabet, et al., "Hardware Accelerated Convolutional Neural Networks For Synthetic Vision Systems." Proceedings of 2010 IEEE International Symposium, pp. 257-260, Jun. 2010.

Farabet, et al., "Neuflow: A Runtime Reconfigurable Dataflow Processor For Vision." IEEE Computer Society Conference, pp. 109-116, Jun. 2011.

Galal, et al., "FPU Generator for Design Space Exploration." 21st IEEE Symposium on Computer Arithmetic (ARITH), Apr. 2013, 10 pages.

GB Search and Examination Report issued in British Application No. GB 1814094.7, mailed on Nov. 1, 2018, 4 pages.

GB Search and Examination Report issued in British Application No. GB 1907743.7, dated Oct. 22, 2019, 4 pages.

Gentile, et al., "Image Processing Chain for Digital Still Cameras Based on SIMPil Architecture." ICCP International Conference Workshops, pp. 215-222, IEEE, Jun. 2005.

Goldstein, et al., "PipeRench: A Coprocessor for Streaming Multimedia Acceleration", Carnegie Mellon University, Research Showcase @CMU, Appears in the 26th Annual International Symposium on Computer Architecture, May 1999, Atlanta, Georgia, 14 paqes.

Gupta, et al., "A VLSI Architecture for Updating Raster-Scan Displays", Computer Graphics, vol. 15, No. 3, Aug. 1981, pp. 71-78.

Hameed, et al., "Understanding Sources of Inefficiency in General-Purpose Chips." ACM SIGARCH Computer Architecture News, vol. 38, No. 3, pp. 37-47, 2010.

Hanrahan, Pat, "Domain-Specific Languages for Heterogeneous GPU Computing", NVIDIA Technology Conference, Oct. 2, 2009, 30 pages.

Hegarty, et al., "Darkroom: Compiling High-Level Image Processing Code into Hardware Pipelines", Proceedings of ACM SIGGRAPH, Jul. 2014, 11 pages.

Henretty, et al., "A Stencil Compiler for Short-Vector SIMD Architectures", ACM, ICS'13, Jun. 10-14, 2013, Eugene, Oregon, pp. 13-24.

Horowitz, Mark, "Computing's Energy Problem: (and what we can do about it)", IEEE, International Solid-State Circuits Conference 2014, 46 pages.

International Search Report and Written Opinion issued in International Application No. PCT/US2017/036441, mailed on Oct. 4, 2017, 17 pages.

Kapasi, et al. "The Imagine Stream Processor", IEEE, International Conference on Computer Design: VLSI in Computers and Processors (ICCD'02), 2002, 17 pages.

Khailany, et al., "A Programmable 512 GOPS Stream Processor for Signal, Image, and Video Processing", IEEE Journal of Solid-State Circuits, vol. 43, No. 1, pp. 202-213, Jan. 2008.

Khawam, et al., "The Reconfigurable Instruction Cell Array", IEEE Transactions on Very Large Scale Integration (VLSI) Systems, vol. 16, No. 1, Jan. 2008, pp. 75-85.

Khronos, SPIR 2.0 "Provisional Specification to Enable Compiler Innovation on Diverse Parallel Architectures", Aug. 11, 2014, 2 pages.

Levinthal, "Parallel Computers for Graphics Applications", ACM, 1987, pp. 193-198.

Levinthal, et al., "Chap-A SIMD Graphics Processor", Computer Graphics, vol. 18, No. 3, Jul. 1984, pp. 77-82.

M.J. Duff, "CLIP 4: A Large Scale Integrated Circuit Array Parallel Processor," Proc. IEEE Int'l Joint Conf. Pattern Recognition, Jan. 2004, pp. 728-733.

Mandal, et al., "An Embedded Vision Engine (EVE) for Automotive Vision Processing." In Circuits and Systems (ISCAS), 2014 IEEE Symposium, pp. 49-52, IEEE, 2014.

Mcintosh-Smith, "A Next-Generation Many-Core Processor With Reliability, Fault Tolerance and Adaptive Power Management Features Optimized For Embedded and High Performance Computing Applications" in Proceedings of the High Performance Embedded Computing Conference (HPEC) 2008, pp. 1-2, 5.

Mody, et al., "High Performance and Flexible Imaging Sub-System." In Advances in Computing, Communications and Informatics (ICACCI), 2014 International Conference, pp. 545-548. IEEE, 2014.

(56) References Cited

OTHER PUBLICATIONS

Molnar, et al., "PixelFlow: High-Speed Rendering Using Image Composition" proceedings of Siggraph 92, Computer Graphics, 26, Jul. 2, 1992, 10 pages.
Moloney, David, "1 TOPS/W Software Programmable Media Processor." Hot Chips 23 Symposium (HCS), IEEE, Aug. 2011, 24 pages.
Moloney, et al., "Myriad 2: Eye of the Computational Vision Storm", Hot Chips 26 Symposium (HCS), IEEE, Aug. 2014, 18 pages.
MPPA—MANYCORE, Product Family Overview http://www.kalray.eu/IMG/pdf/FLYER_MPPA_MANYCORE-4.pdf, Feb. 2014, 2 pages.
Nightingale, Edmund B., et al., "Helios: Heterogeneous Multiprocessing with Satellite Kernels," SOSP '09, Oct. 11-14, 2009, Big Sky, Montana, U.S.A., (Oct. 11, 2009), 14 paqes.
NVIDIA-NVIDIA's Next Generation CUDA™ Compute Architecture: Kepler™, GK110/210, 2014, 23 pages, http://international.download.nvidia.com/pdf/kepler/NVIDIA-Kepler-GK110-GK210-Architecture-Whitepaper.pdf.
NVIDIA Tegra K1—A New Era in Mobile Computing—Whitepapers—Jan. 2014, 26 pages.
NVIDIA Tegra X1—NVIDIA'S New Mobile Superchip—Whitepapers—Jan. 2015, 41 pages.
NVIDIA, "PTX:Parallel Thread Execution ISA Version 1.4", Aug. 23, 2010, 135 pages.
Olofsson, et al., "A 25 GFLOPS/Watt Software Programmable Floating Point Accelerator" High Performance Embedded Computing Conference, 2010, 2 pages.
Oosterhout, Optimized Pixel Template Image Correlator, Master Thesis, Aug. 19, 1992, 74 pages.
Parker, Richard, "Embedding Computer Vision in Electronic Devices: How New Hardware and Software Choices Have Changed the Designer's Approach", Future Technology Magazine, pp. 22-23, Feb. 2013.
PCT International Preliminary Report on Patentability issued in International Application No. PCT/uS2017036441, mailed on Jan. 10, 2019, 10 pages.
PCT Written Opinion issued in International Application No. PCTUS2017036441, mailed on Jun. 21, 2018, 5 pages.
Peennen et al., "Memory-Centric Accelerator Design for Convolutional Neural Networks", IEEE 2013. (Year: 2013).
Pelc, Oscar, "Multimedia Support in the i.MX31 and i.MX31 L Applications Processors", Freescale Semiconductor, Inc., Feb. 2006, http://cache.freescale.com/files/32bit/doc/white_paper/IMX31MULTIWP.pdf, 12 pages.
Pham, et al., "NeuFlow: Dataflow Vision Processing System-On-A-Chip." IEEE 55th International Midwest Symposium, Aug. 2012, 4 pages.
Qadeer et al. "Convolution engine," Communications of the ACM, Association for Computing Machinery, vol. 58(4) Mar. 23, 2015, 9 pages.
Qadeer, et al., "Convolution Engine: Balancing Efficiency & Flexibility in Specialized Computing", ISCA '13 Tel-Aviv, Israel, ACM 2013, pp. 24-35.
Ragan-Kelley et al., "Halide: A Language and Compiler for Optimizing Parallelism, Locality, and Recomputation in Image Processing Pipelines," Jun. 16, 2013, 12 pages.
S.F. Reddaway, "DAP—A Distributed Processor Array", ISCA '73 Proceedings of the First Ann. Symposium on Computer Architecture, pp. 61-65.
SCP2200: Image Cognition Processors Family [Product Brief]*, https://www.element14.com/community/docs/DOC-50990, Oct. 26, 2012, 2 pages.
SCP2200: Image Cognition Processors*, https://www.element14.com/community/docs/DOC-50984/I/scp2200-image-cognition-processors, Oct. 25, 2012, 2 pages.
Sedaghati, et al., "SIVEC: A Vector Instruction Extension for High Performance Stencil Computation," Parallel Architectures and Compilation Techniques, Oct. 10, 2011, 12 pages.

SemiWiki.com—New CEVA-ZM4 Vision IP Does Point clouds and More: Published Feb. 27, 2015, https://www.semiwiki.com/forum/content/4354-new-ceva-xm4-vision-ip-does-point-clouds-more.html.
Shacham, et al. "Smart Memories Polymorphic Chip Multiprocessor", Proceedings of the 46th Design Automation Conference (OAC), San Francisco, CA, Jul. 2009.
Shacham, et al., "Rethinking Digital Design: Why Design Must Change", IEEE micro Magazine, Nov./Dec. 2010.
Shacham, Ofer, "Chip Multiprocessor Generator: Automatic Generation of Custom and Heterogeneous Complete Platforms" Dissertation—Stanford University, May 2011, 190 pages. PART 1.
Shacham, Ofer, "Chip Multiprocessor Generator: Automatic Generation of Custom and Heterogeneous Complete Platforms" Dissertation—Stanford University, May 2011, 190 pages. PART 2.
Silicon Hive: "Silicon System Design of Media and Communications Applications", Jun. 13, 2007, 22 pages.
Spampinato, et al., "A Basic Linear Algebra Compiler", ACM, CG0'14, Feb. 15-19, 2014, Orlando Fl, pp. 23-32.
SPIR, The SPIR Specification, Version 2.0, Revision Date Jun. 5, 2014, 40 pages.
Stein, et al., "A Computer Vision System on a Chip: A Case Study From The Automotive Domain." IEEE Computer Society Conference, p. 130, 2005.
Stojanov, et al., "Abstracting Vector Architectures in Library Generators: Case Study Convolution Filters", ARRAY 14, ACM, Jun. 11, 2014, UK, pp. 14-19.
Stream Processors, Inc. Announces Storm-1 Family of Data-Parallel Digital Signal Processors, ISSCC 2007, Feb. 12, 2007, 3 pages. http://www.businesswire.com/news/home/20070212005230/en/Stream-Processors-Announces-Storm-1-Family-Data-Parallel-Digital.
Stream Processors, Inc., Company History—Foundational Work in Stream Processing initiated in 1995, https://en.wikipedia.org/wiki/Stream_Processors, inc, 5 pages.
Taiwan Office Action in Taiwanese Appln. No. 106121712, dated Aug. 28, 2019, 13 pages (with English translation).
Tanabe, et al., "Visconti: multi-VLIW image Recognition Processor Based on Configurable Processor [obstacle detection applications]", Custom Integrated Circuits Conference, IEEE, 2003, http://ieeexplore.ieee.org/document/1249387/?arnumber=1249387&tag=1.
Van der Wal, et al., "The Acadia Vision Processor", IEEE proceedings of International Workshop on Computer Applications for Machine Perception, Sep. 2000, http://citeseerz.ist.psu.edu/viewdoc/download?doi=10.1.1.32.3830&rep=rep1&type=pdf, 10 pages.
Wahib et al., "Scalable Kernel Fusion for Memory-Bound GPU Applications," SC14: International Conference for High Performance Computing, Networking, Storage and Analysis, Nov. 16, 2014, 12 pages.
Yang et al., "A Systematic Approach to Blocking Convolutional Neural Networks", Jun. 14, 2016. (Year: 2016).
Yu et al., "Optimizing Data Intensive Window-based Image Processing on reconfigurable Hardware Boards," Proc. IEEE Workshop on Signal Processing System Design and Implementation, Nov. 2, 2005, 6 pages.
Zhou, Minhua, et al., "Parallel Tools in HEVC for High-Throughput Processing," Applications of Digital Processing, XXXV, Proc. of SPI, vol. 8499, (Jan. 1, 2012), pp. 1-13.
CN Office Action in Chinese Application No. 201710532146.4, dated Sep. 30, 2020, 10 pages (with English translation).
KR Office Action in Korean Application No. 10-2019-7000838, dated Nov. 2, 2020, 9 pages (with English translation).
IN Office Action in Indian Application No. 201847050005, dated Feb. 3, 2021, 7 pages (with English translation).
Office Action in European Appln. No. 17740501.6, dated Jul. 22, 2021, 5 pages.
Notice of Allowance in British Appln. No. GB1907743.7, mailed on May 7, 2020, 2 pages.
Notice of Allowance in Chinese Appln. No. 201710532146.4, mailed on Mar. 3, 2021, 4 pages (with English translation).
Notice of Allowance in German Appln. No. 102017113733.5, mailed on Mar. 21, 2022, 6 pages.

(56) References Cited

OTHER PUBLICATIONS

Notice of Allowance in Japanese Appln. No. 2018-567935, mailed on Aug. 18, 2020, 5 pages (with English translation).
Notice of Allowance in Korean Appln. No. 10-2019-7000838, mailed on Feb. 18, 2021, 4 pages (with English translation).
Office Action in German Appln. No. 102017113733.5, mailed on Sep. 23, 2021, 8 pages.
Wikipedia.org [online], "Convolutional neural network" Jun. 2016, retrieved on Sep. 22, 2021, retrieved from URL <https://en.wikipedia.org/w/index.php?title=Convolutional_neural_network&oldid=725801598>, 19 pages.
Notice of Allowance in European Appln. No. 17740501.6, dated May 19, 2023, 9 pages.

* cited by examiner

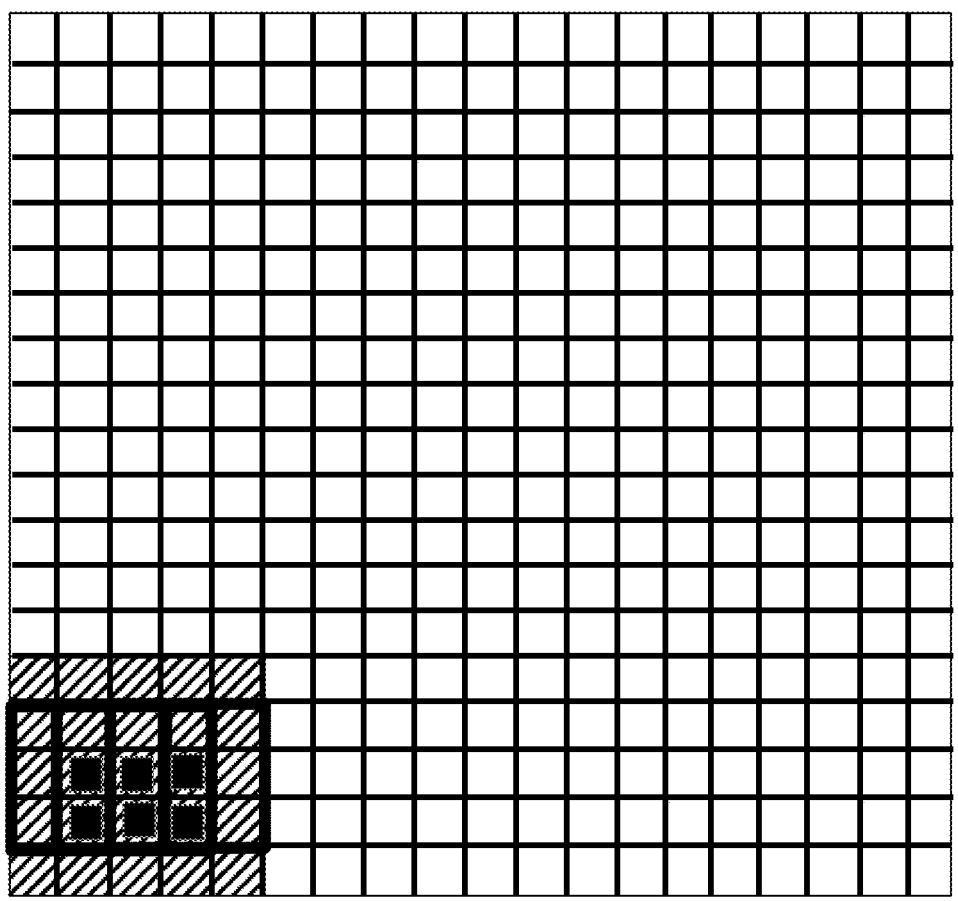

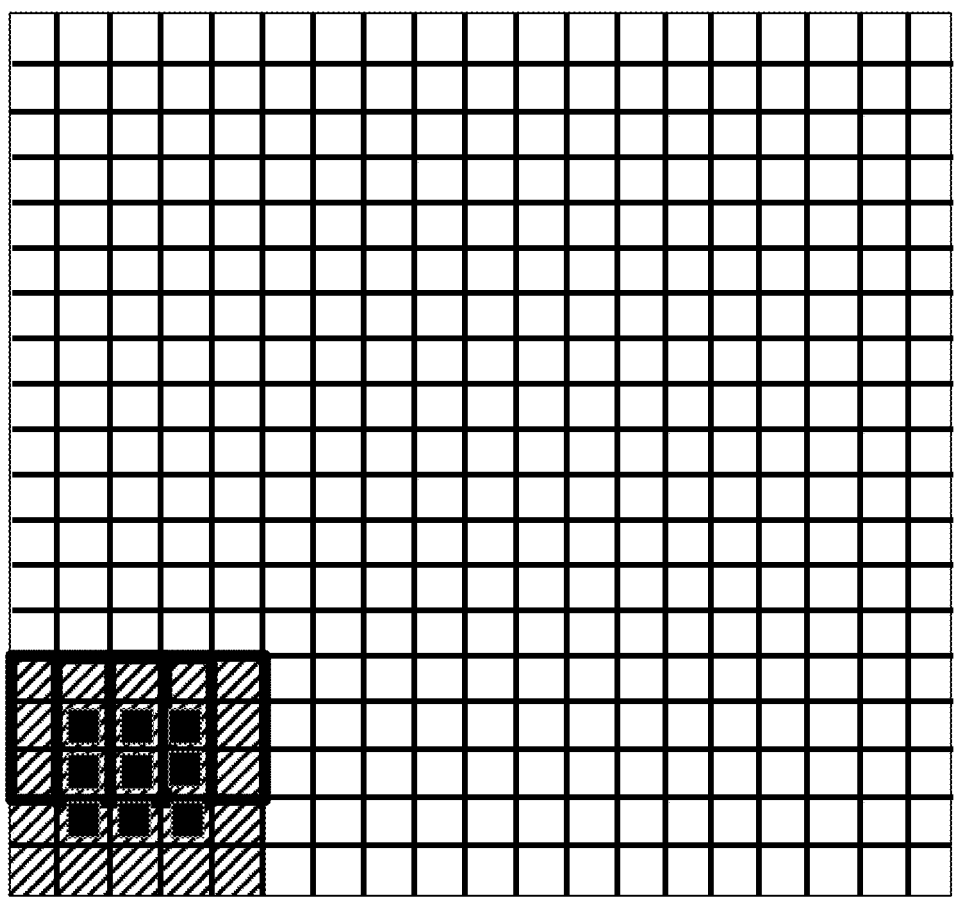

| Scalar instruction 351 | 2D ALU Instruction 352 | Memory Access Instruction 353 | Immediate Operand 354 |

Fig. 3b

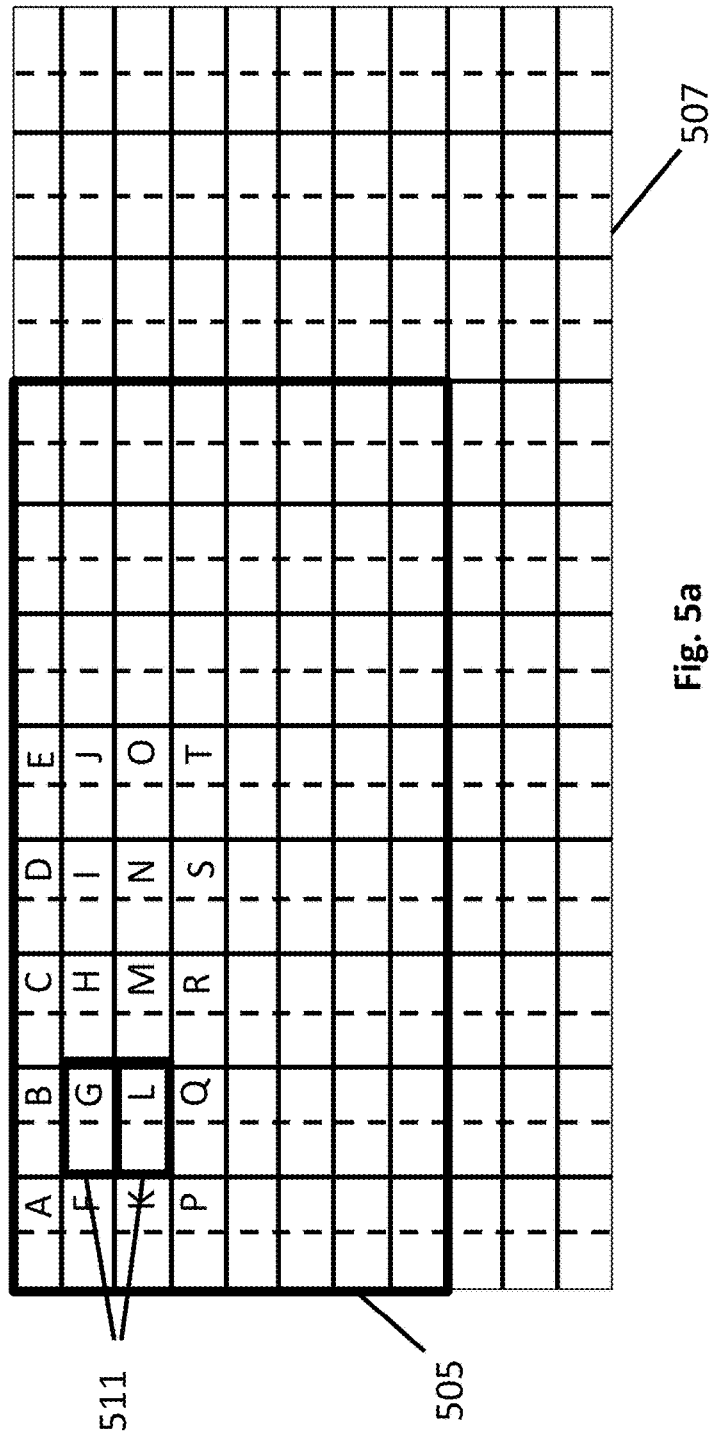
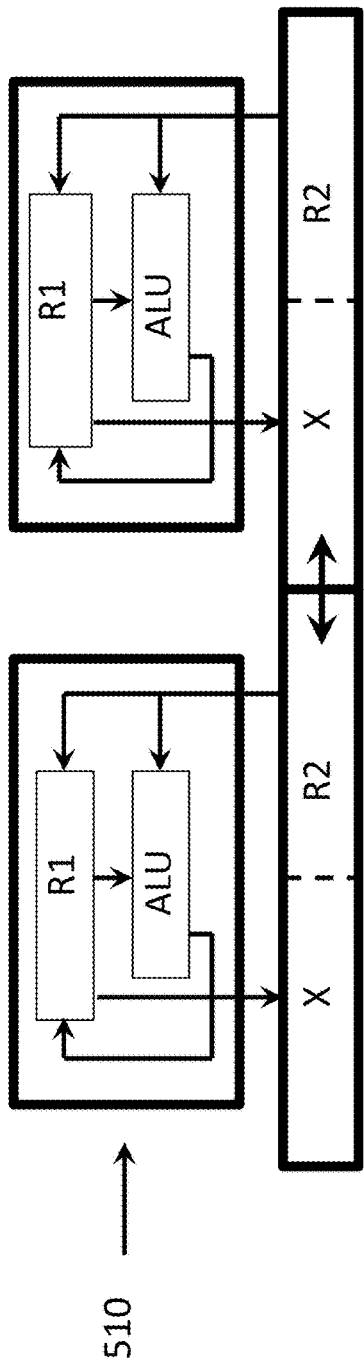
Fig. 5a

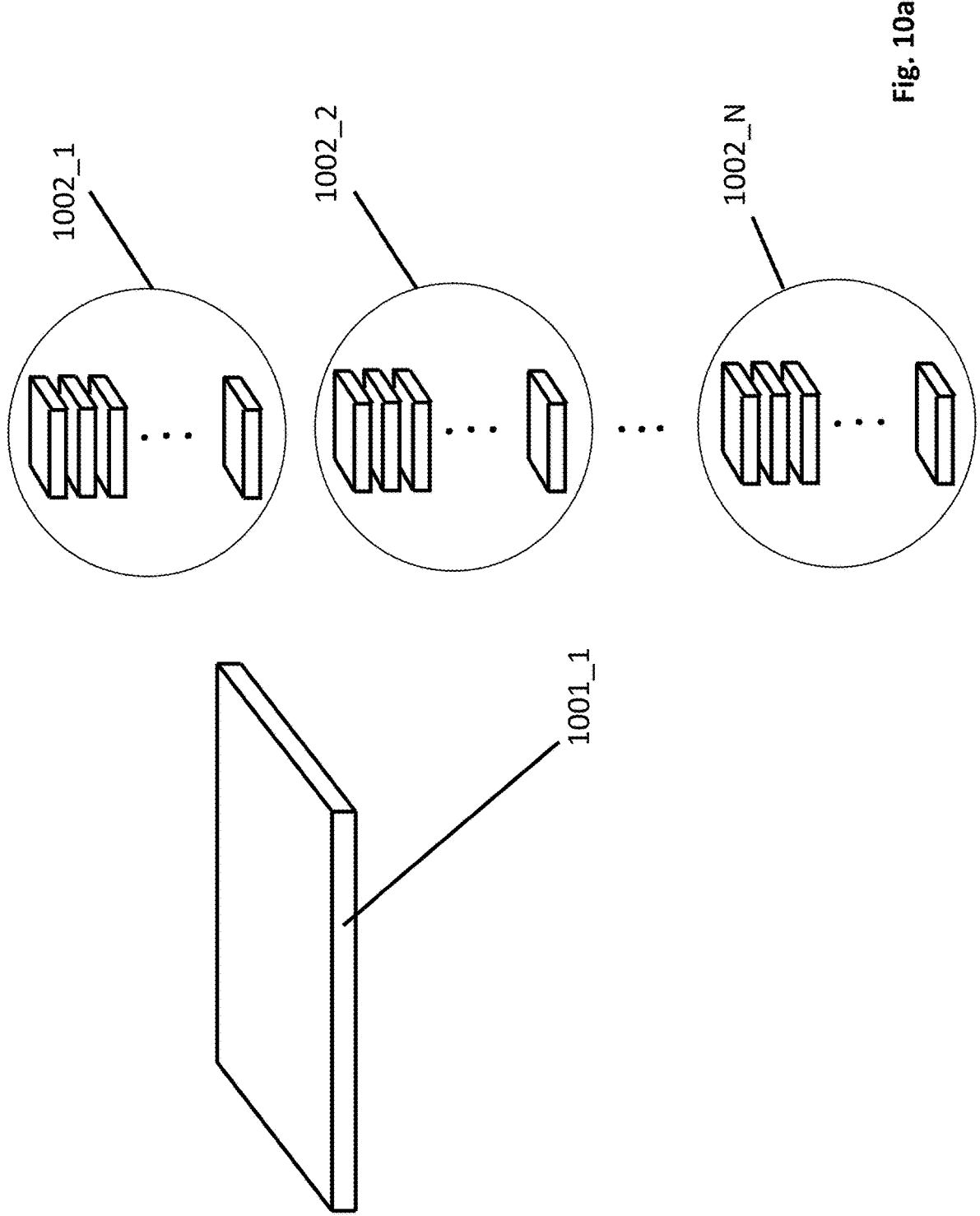

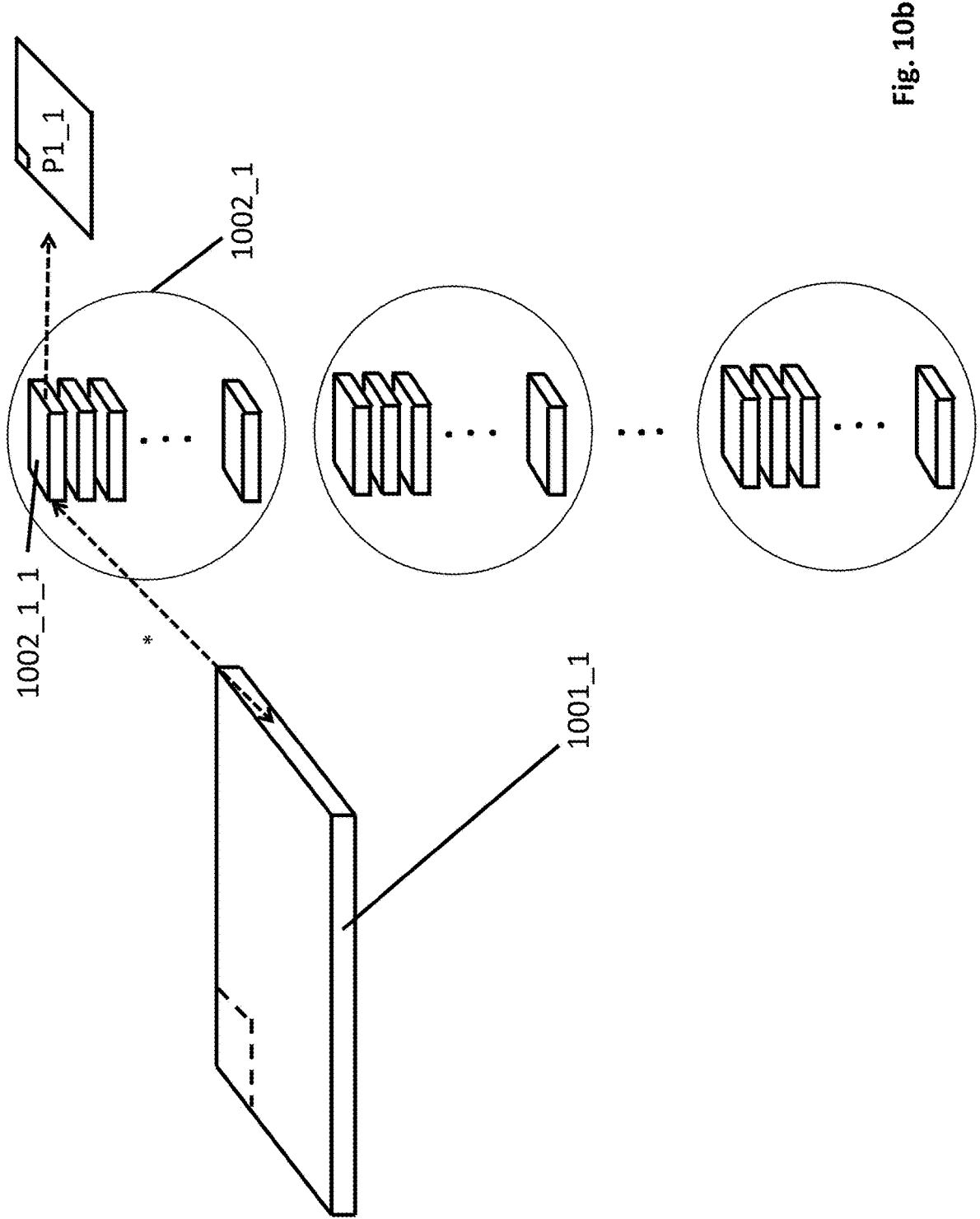

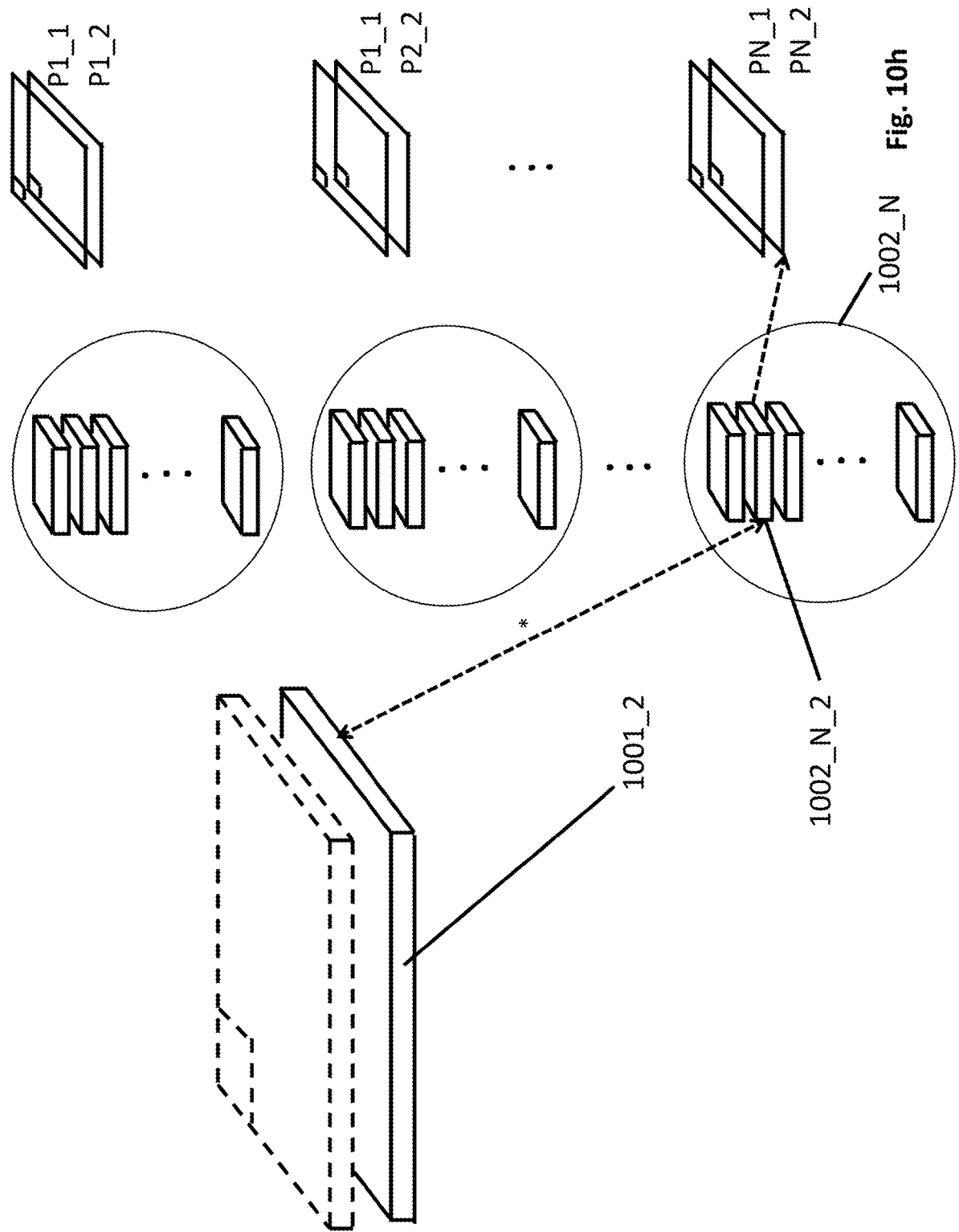

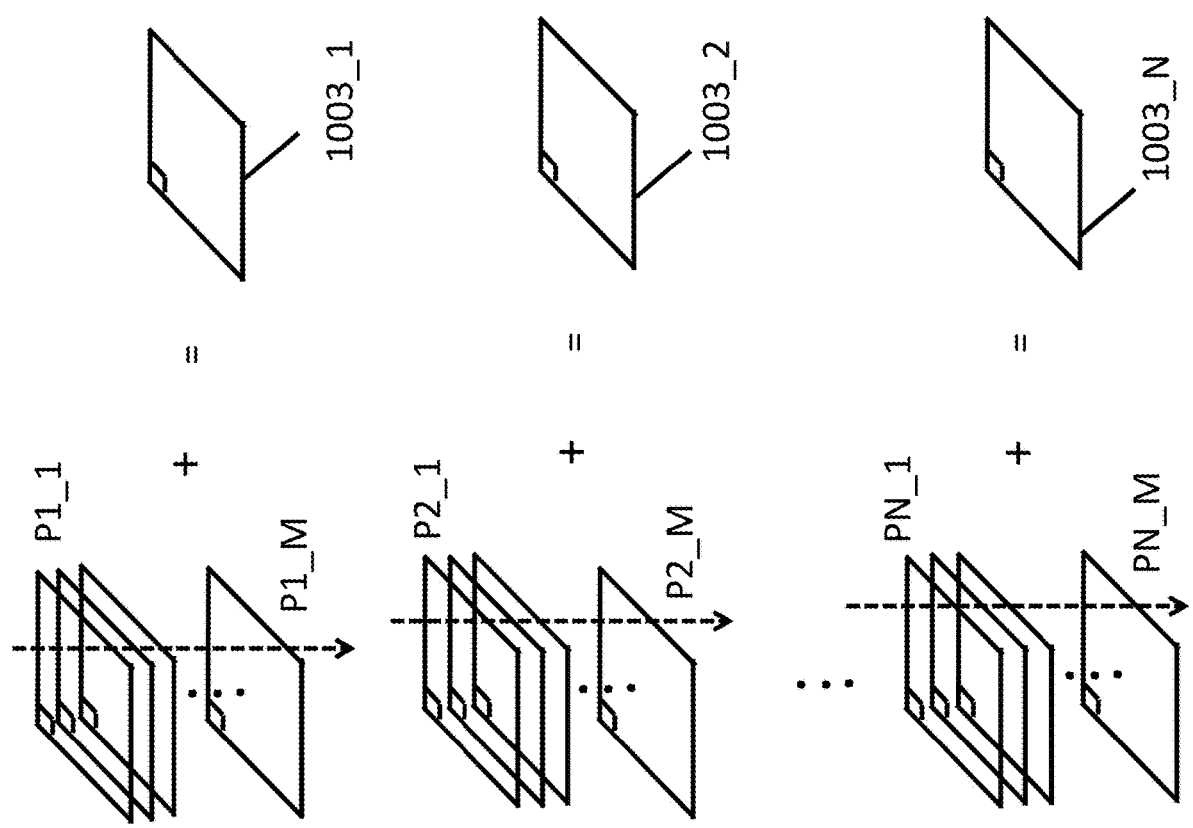

Fig. 11a

| a3 | a6 | a9 |
|---|---|---|
| a2 | a5 | a8 |
| a1 | a4 | a7 |

$(a5 \times H) = S\_H$
$(a5 \times K) = S\_K$

| A | B | C | D | E | F |
|---|---|---|---|---|---|
| G | H | I | J | K | L |
| M | N | O | P | Q | R |

1101 / 1102

| A | B | C | D | E | F |
|---|---|---|---|---|---|
| G | H | I | J | K | L |
| M | N | O | P | Q | R |

1101 / 1102, 1121 (H), 1122 (K)

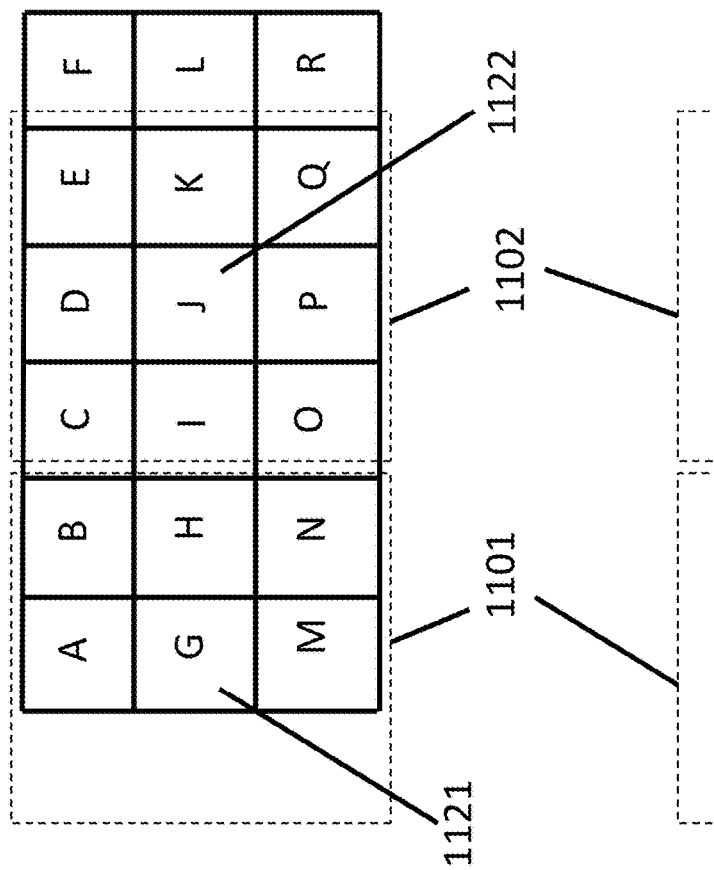

Fig.11e

$(a5 \times H) + (a4 \times G) + (a1 \times A) + (a2 \times B) = S\_H$ $(a5 \times K) + (a4 \times J) + (a1 \times D) + (a2 \times E) = S\_K$

| A | B | C | D | E | F |
|---|---|---|---|---|---|
| G | H | I | J | K | L |
| M | N | O | P | Q | R |

Fig.11f

$(a5 \times H) + (a4 \times G) + (a1 \times A) + (a2 \times B)$
$+ (a3 \times C) = S\_H$ $(a5 \times K) + (a4 \times J) + (a1 \times D) + (a2 \times E)$
$+ (a3 \times F) = S\_K$

| A | B | C | D | E | F |
|---|---|---|---|---|---|
| G | H | I | J | K | L |
| M | N | O | P | Q | R |

| A | B | C | D | E | F |
|---|---|---|---|---|---|
| G | H | I | J | K | L |
| M | N | O | P | Q | R |

| A | B | C | D | E | F |
|---|---|---|---|---|---|
| G | H | I | J | K | L |
| M | N | O | P | Q | R |

Fig.11i

| A | B | C | D | E | F |
|---|---|---|---|---|---|
| G | H | I | J | K | L |
| M | N | O | P | Q | R |

| A | B | C | D | E | F |
|---|---|---|---|---|---|
| G | H | I | J | K | L |
| M | N | O | P | Q | R |

(a5xH) + (a4xG) + (a1xA) + (a2xB) + (a3xC)
+ (a6xI) + (a9xO) + (a8xN) + (a7xM) = S_H (a5xK) + (a4 x J) + (a1xD) + (a2xE) + (a3xF)
+ (a6xL) + (a9xR) + (a8xQ) + (a7xP) = S_K

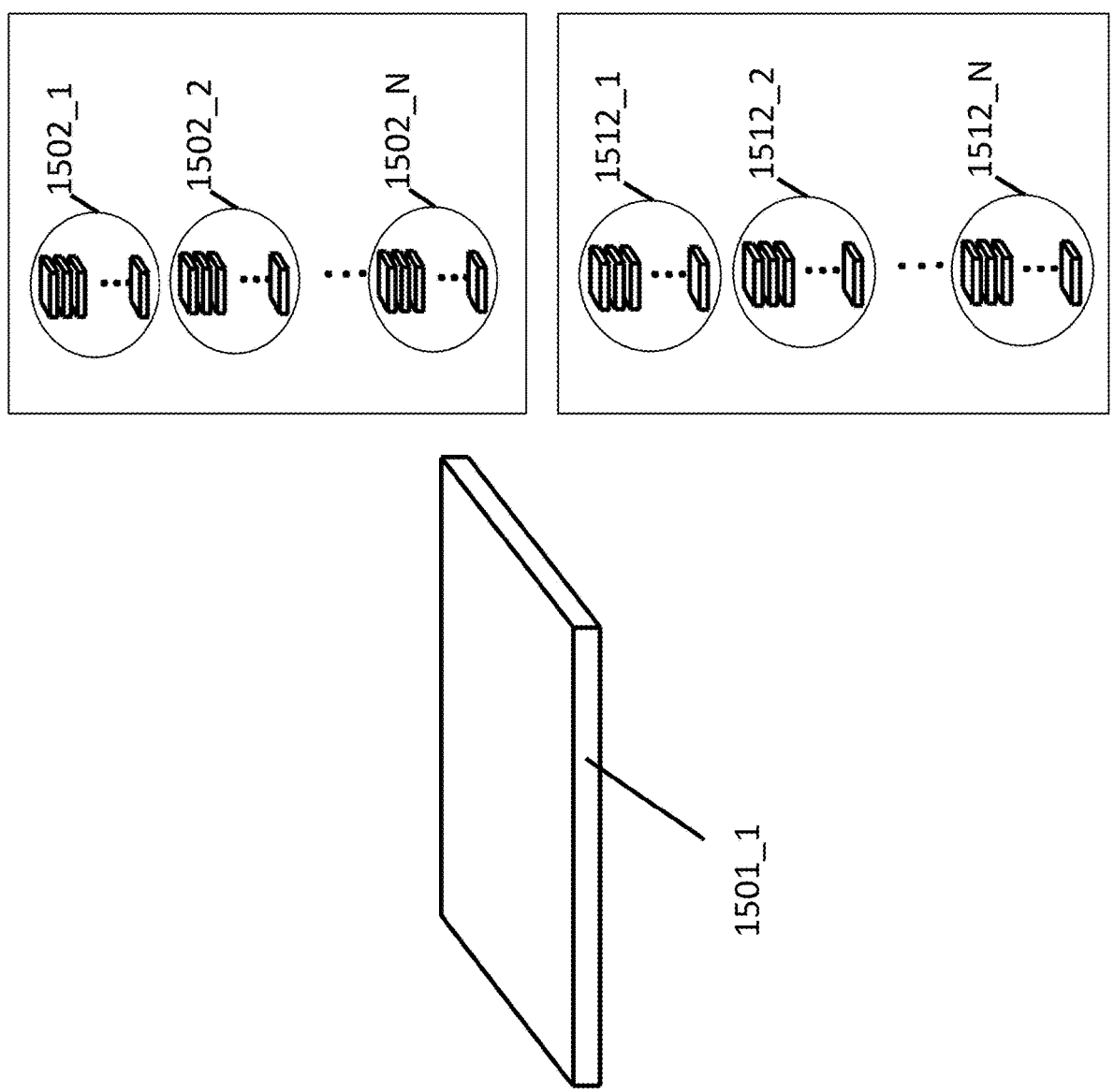

executing a convolutional neural network layer on an image processor having an array of execution lanes and a two-dimensional shift register
1601 loading a plane of image data of a three-dimensional block of image data into the two-dimensional shift register
1602 performing a two-dimensional convolution of the plane of image data with an array of coefficient values by sequentially:
  concurrently multiplying within the execution lanes respective pixel and coefficient values to produce an array of partial products;
  concurrently summing within the execution lanes the partial products with respective accumulations of partial products being kept within the two dimensional register for different stencils within the image data; and,
  effecting alignment of values for the two-dimensional convolution within the execution lanes by shifting content within the two-dimensional shift register array
1603

Fig. 16

CONVOLUTIONAL NEURAL NETWORK ON PROGRAMMABLE TWO DIMENSIONAL IMAGE PROCESSOR

CROSS-REFERENCE TO RELATED APPLICATION

This application is a continuation application of U.S. application Ser. No. 15/631,906, filed Jun. 23, 2017, which is a continuation of U.S. application Ser. No. 15/201,204, filed on Jul. 1, 2016. The contents of each are incorporated by reference herein.

FIELD

The description generally pertains to image processing, and, more specifically, to a convolutional neural network on a two dimensional image processor.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors)). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

A method is described that includes executing a convolutional neural network layer on an image processor having an array of execution lanes and a two-dimensional shift register. The two-dimensional shift register provides local respective register space for the execution lanes. The executing of the convolutional neural network includes loading a plane of image data of a three-dimensional block of image data into the two-dimensional shift register. The executing of the convolutional neural network also includes performing a two-dimensional convolution of the plane of image data with an array of coefficient values by sequentially: concurrently multiplying within the execution lanes respective pixel and coefficient values to produce an array of partial products; concurrently summing within the execution lanes the partial products with respective accumulations of partial products being kept within the two dimensional register for different stencils within the image data; and, effecting alignment of values for the two-dimensional convolution within the execution lanes by shifting content within the two-dimensional shift register array.

An apparatus is also described having means for executing a convolutional neural network layer on an image processor having an array of execution lanes and a two-dimensional shift register. The two-dimensional shift register provides local respective register space for the execution lanes. The means for executing of the convolutional neural network includes means for loading a plane of image data of a three-dimensional block of image data into the two-dimensional shift register. The means for executing the convolutional neural network also includes means for performing a two-dimensional convolution of the plane of image data with an array of coefficient values by sequentially: concurrently multiplying within the execution lanes respective pixel and coefficient values to produce an array of partial products; concurrently summing within the execution lanes the partial products with respective accumulations of partial products being kept within the two dimensional register for different stencils within the image data; and, effecting alignment of values for the two-dimensional convolution within the execution lanes by shifting content within the two-dimensional shift register array.

LIST OF FIGURES

The following description and accompanying drawings are used to illustrate various embodiments. In the drawings:

FIGS. 2a, 2b, 2c, 2d and 2e depict the parsing of image data into a line group, the parsing of a line group into a sheet and the operation performed on a sheet with overlapping stencils;

FIG. 3b shows an embodiment of an instruction format;

FIGS. 5a, 5b, 5c, 5d, 5e, 5f, 5g, 5h, 5i, 5j and 5k depict an example of the use of a two-dimensional shift array and an execution lane array to determine a pair of neighboring output pixel values with overlapping stencils;

FIGS. 11a, 11b, 11c, 11d, 11e, 11f, 11g, 11h, 11i, 11j depict a two dimensional convolution for two 3×3 stencils with an image processor having a two dimensional shift register;

Figure 17:
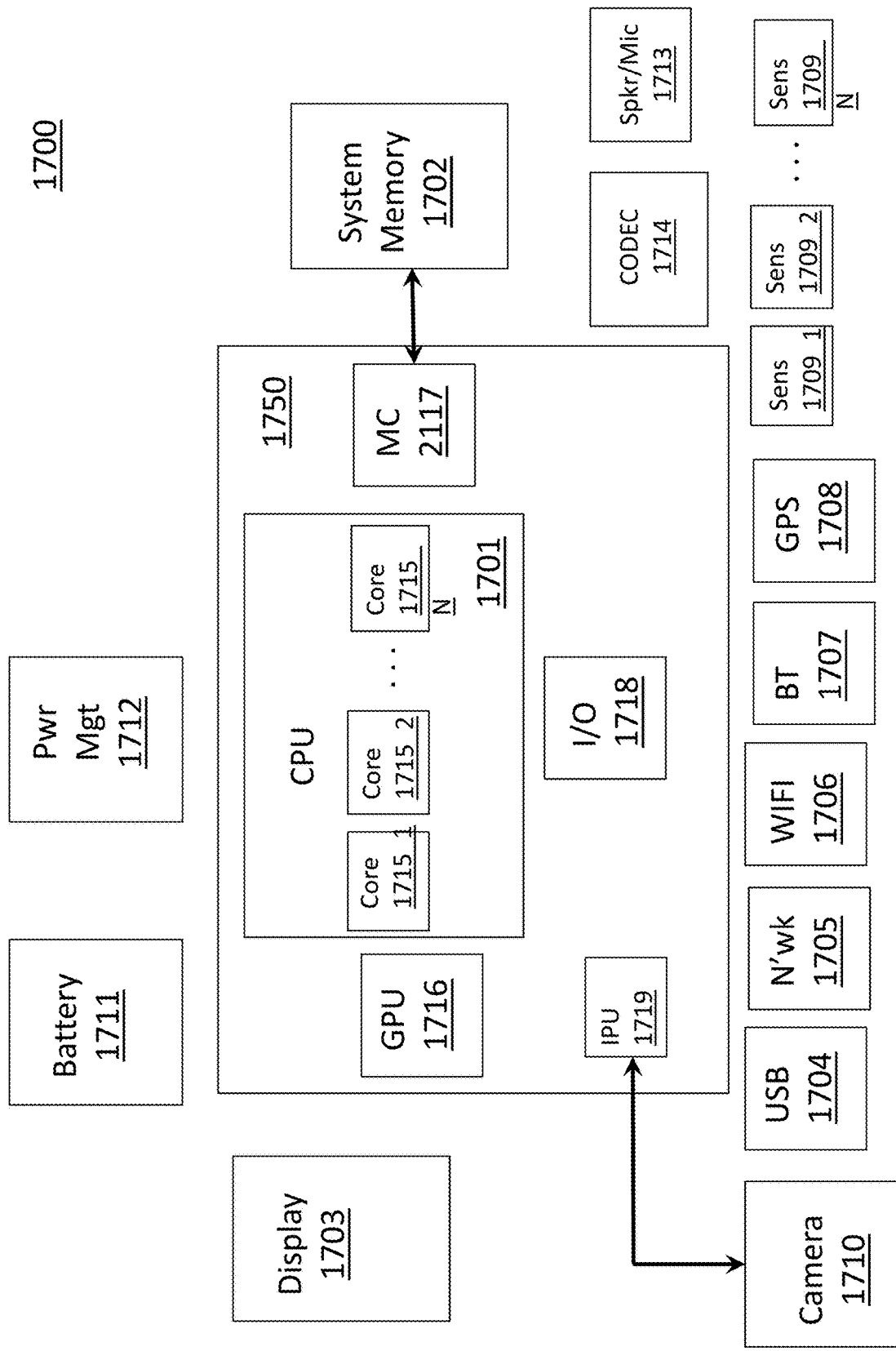

FIG. 15 pertains to multiplexing multiple CNN layers on an image processor;

FIG. 16 shows a method of performing a CNN layer on an image processor;

FIG. 17 shows a computing system.

DETAILED DESCRIPTION a. Image Processor Hardware Architecture and Operation

Figure 1:
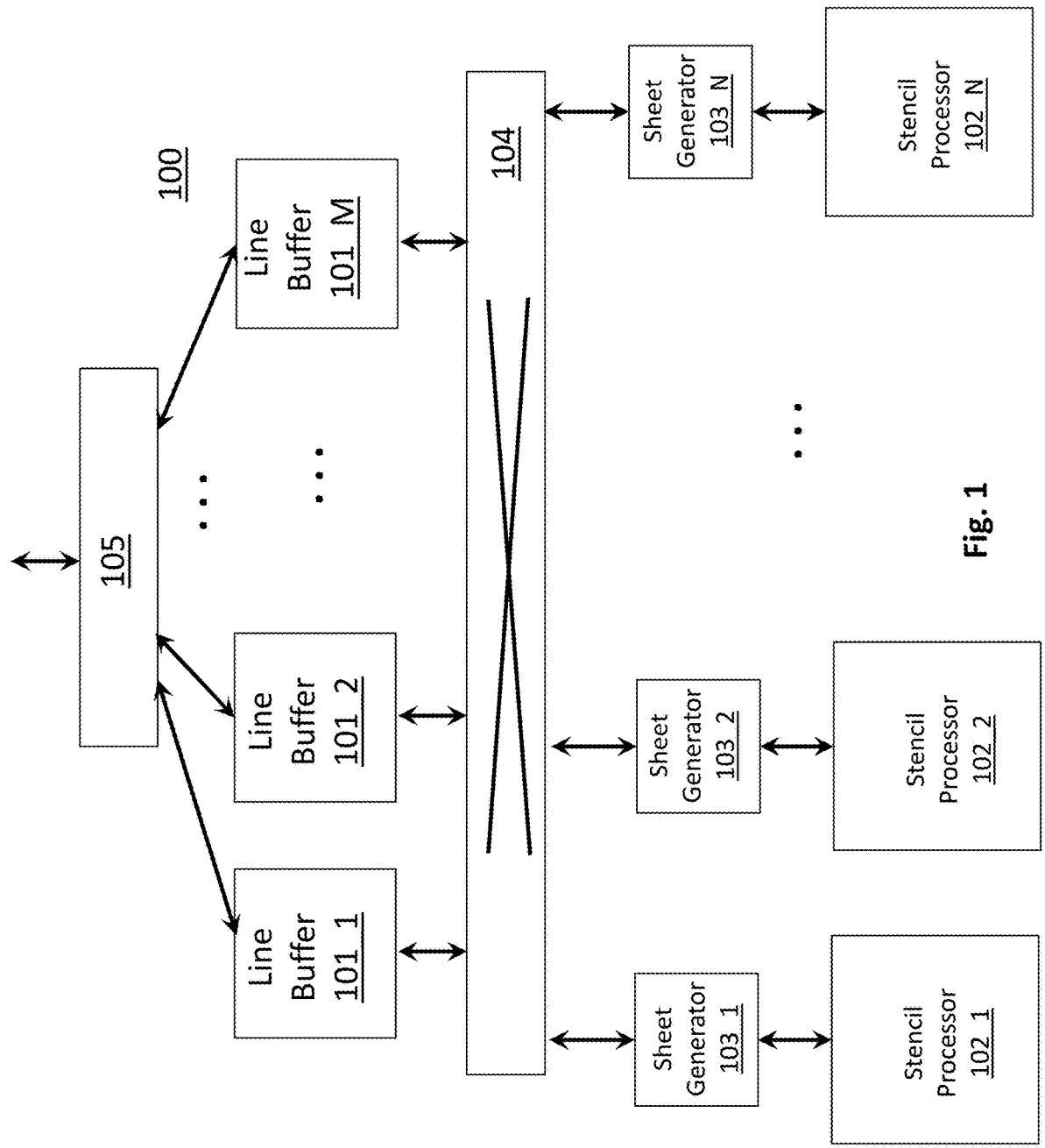
FIG. 1 shows an embodiment of an image processor hardware architecture.

FIG. 1 shows an embodiment of an architecture 100 for an image processor implemented in hardware. The image processor may be targeted, for example, by a compiler that converts program code written for a virtual processor within a simulated environment into program code that is actually executed by the hardware processor. As observed in FIG. 1, the architecture 100 includes a plurality of line buffer units 101_1 through 101_M (hereinafter "line buffers", "line buffer units" or the like) interconnected to a plurality of stencil processor units 102_1 through 102_N (hereinafter "stencil processors", "stencil processor units" or the like) and corresponding sheet generator units 103_1 through 103_N (hereinafter "sheet generators", "sheet generator units" or the like) through a network 104 (e.g., a network on chip (NOC) including an on chip switch network, an on chip ring network, or other kind of network). In an embodiment, any line buffer unit may connect to any sheet generator and corresponding stencil processor through the network 104.

In an embodiment, program code is compiled and loaded onto a corresponding stencil processor 102 to perform the image processing operations earlier defined by a software developer (program code may also be loaded onto the stencil processor's associated sheet generator 103, e.g., depending on design and implementation). In at least some instances an image processing pipeline may be realized by loading a first kernel program for a first pipeline stage into a first stencil processor 102_1, loading a second kernel program for a second pipeline stage into a second stencil processor 102_2, etc., where the first kernel performs the functions of the first stage of the pipeline, the second kernel performs the functions of the second stage of the pipeline, etc., and additional control flow methods are installed to pass output image data from one stage of the pipeline to the next stage of the pipeline.

In other configurations, the image processor may be realized as a parallel machine having two or more stencil processors 102_1, 102_2 operating the same kernel program code. For example, a highly dense and high data rate stream of image data may be processed by spreading frames across multiple stencil processors each of which perform the same function.

In yet other configurations, essentially any directed acyclic graph (DAG) of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 105 and passed to one or more of the line buffer units 101 on a frame by frame basis. A particular line buffer unit parses its frame of image data into a smaller region of image data, referred to as a "line group", and then passes the line group through the network 104 to a particular sheet generator. A complete or "full" singular line group may be composed, for example, with the data of multiple contiguous complete rows or columns of a frame (for brevity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 101_1 which parses the image data into line groups and directs the line groups to the sheet generator 103_1 whose corresponding stencil processor 102_1 is executing the code of the first kernel in the pipeline/DAG. Upon completion of operations by the stencil processor 102_1 on the line groups it processes, the sheet generator 103_1 sends output line groups to a "downstream" line buffer unit 101_2 (in some use cases the output line group may be sent back to the same line buffer unit 101_1 that earlier had sent the input line groups).

One or more "consumer" kernels that represent the next stage/operation in the pipeline/DAG executing on their own respective other sheet generator and stencil processor (e.g., sheet generator 103_2 and stencil processor 102_2) then receive from the downstream line buffer unit 101_2 the image data generated by the first stencil processor 102_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

A stencil processor 102 is designed to simultaneously operate on multiple overlapping stencils of image data. The multiple overlapping stencils and internal hardware processing capacity of the stencil processor effectively determines the size of a sheet. Here, within a stencil processor 102, arrays of execution lanes operate in unison to simultaneously process the image data surface area covered by the multiple overlapping stencils.

As will be described in more detail below, in various embodiments, sheets of image data are loaded into a two-dimensional register array structure within the stencil processor units 102. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable.

FIGS. 2a through 2e illustrate at a high level embodiments of both the parsing activity of a line buffer unit 101, the finer grained parsing activity of a sheet generator unit 103, as well as the stencil processing activity of the stencil processor 102 that is coupled to the sheet generator unit 103.

Figure 2A:
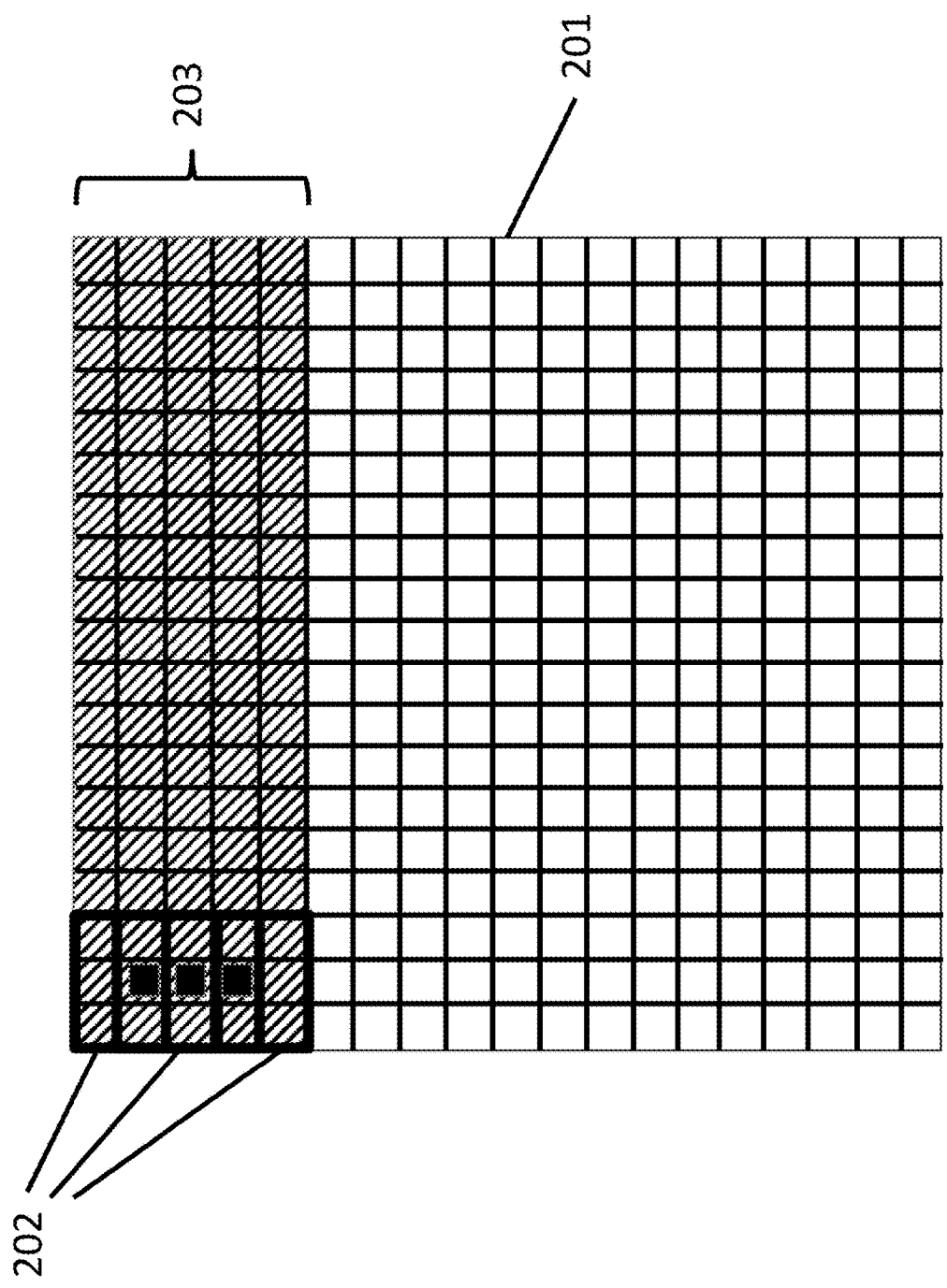

FIG. 2a depicts an embodiment of an input frame of image data 201. FIG. 2a also depicts an outline of three overlapping stencils 202 (each stencil having a dimension of 3 pixels by 3 pixels) that a stencil processor is designed to operate over. The output pixel that each stencil respectively generates output image data for is highlighted in solid black. For brevity, the three overlapping stencils 202 are depicted as overlapping only in the vertical direction. It is pertinent to recognize that in actuality a stencil processor may be designed to have overlapping stencils in both the vertical and horizontal directions.

Because of the vertical overlapping stencils 202 within the stencil processor, as observed in FIG. 2a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 101 is responsible for parsing a line group of input image data from an incoming frame that is sufficient for the stencil processors to operate over for an extended number of upcoming cycles. An exemplary depiction of a line group is illustrated as a shaded region 203. In an embodiment, the line buffer unit 101 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 203 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 2B:
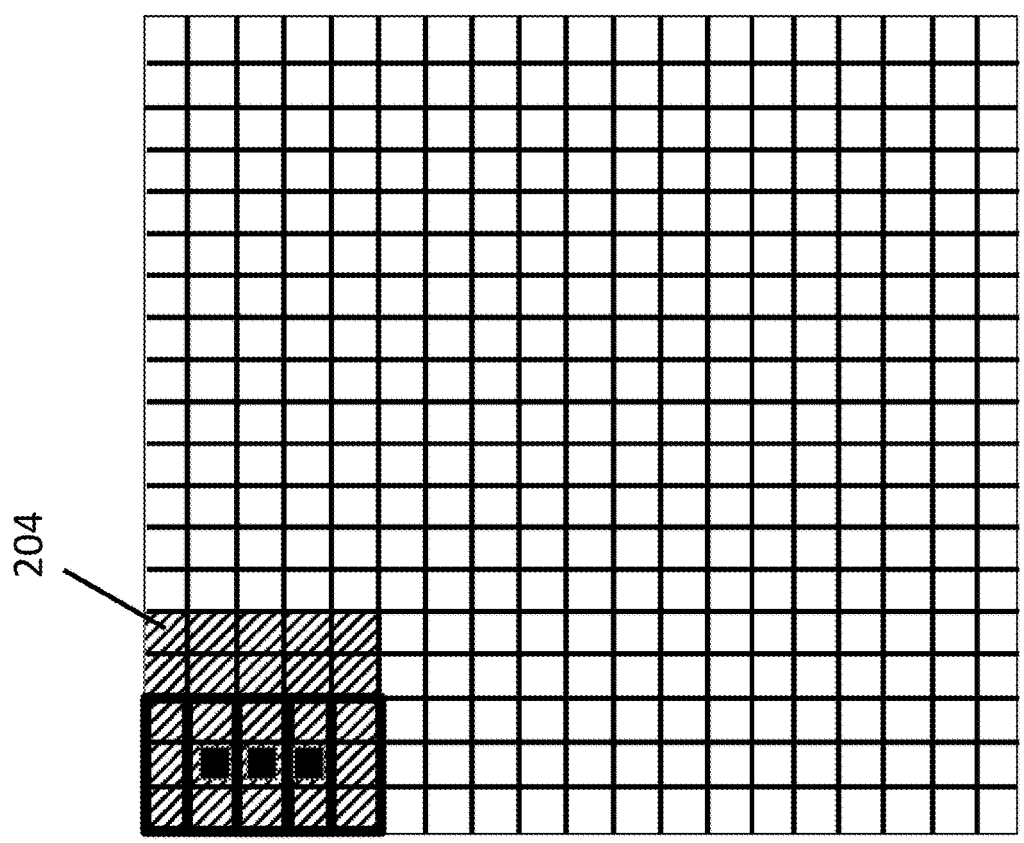

Thus, as observed in FIG. 2b, the sheet generator parses an initial sheet 204 from the line group 203 and provides it to the stencil processor (here, the sheet of data corresponds to the five by five shaded region that is generally identified by reference number 204). As observed in FIGS. 2c and 2d, the stencil processor operates on the sheet of input image data by effectively moving the overlapping stencils 202 in a left to right fashion over the sheet. As of FIG. 2d, the number of pixels for which an output value could be calculated (nine in a darkened 3 by 3 array) from the data within the sheet is exhausted (no other pixel positions can have an output value determined from the information within the sheet). For simplicity the border regions of the image have been ignored.

Figure 2E:
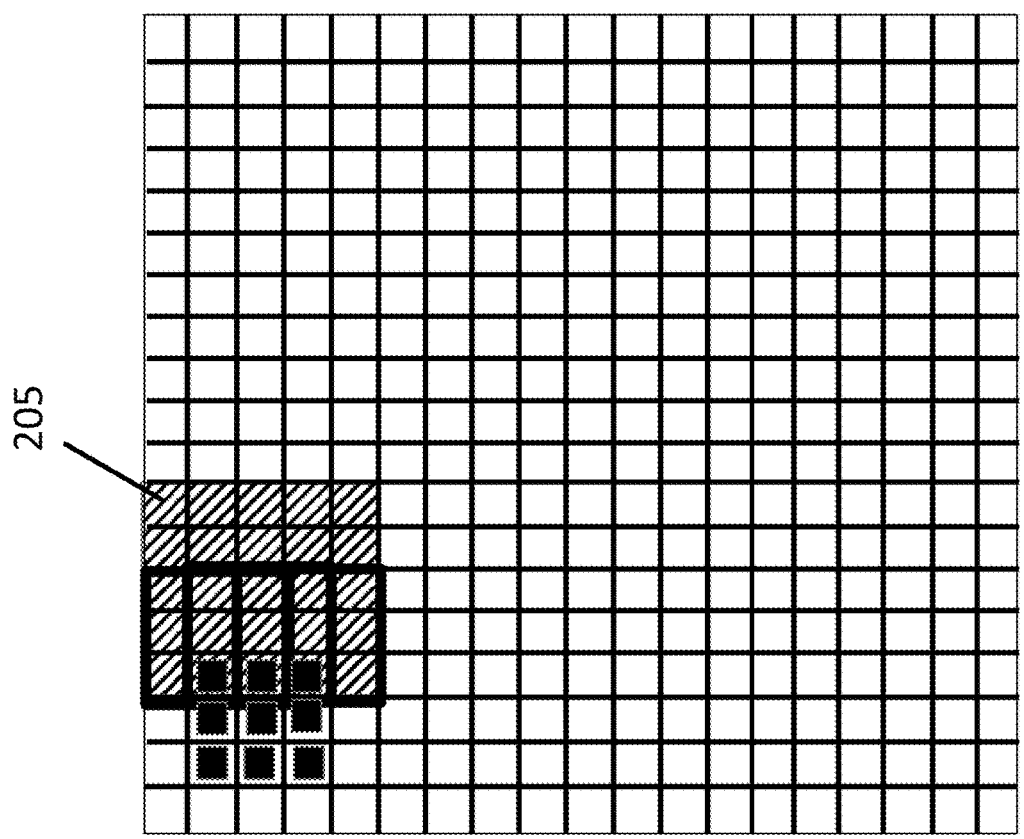

As observed in FIG. 2e the sheet generator then provides a next sheet 205 for the stencil processor to continue operations on. Note that the initial positions of the stencils as they begin operation on the next sheet is the next progression to the right from the point of exhaustion on the first sheet (as depicted previously in FIG. 2d). With the new sheet 205, the stencils will simply continue moving to the right as the stencil processor operates on the new sheet in the same manner as with the processing of the first sheet.

Note that there is some overlap between the data of the first sheet 204 and the data of the second sheet 205 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

b. Stencil Processor Design and Operation

Figure 3A:
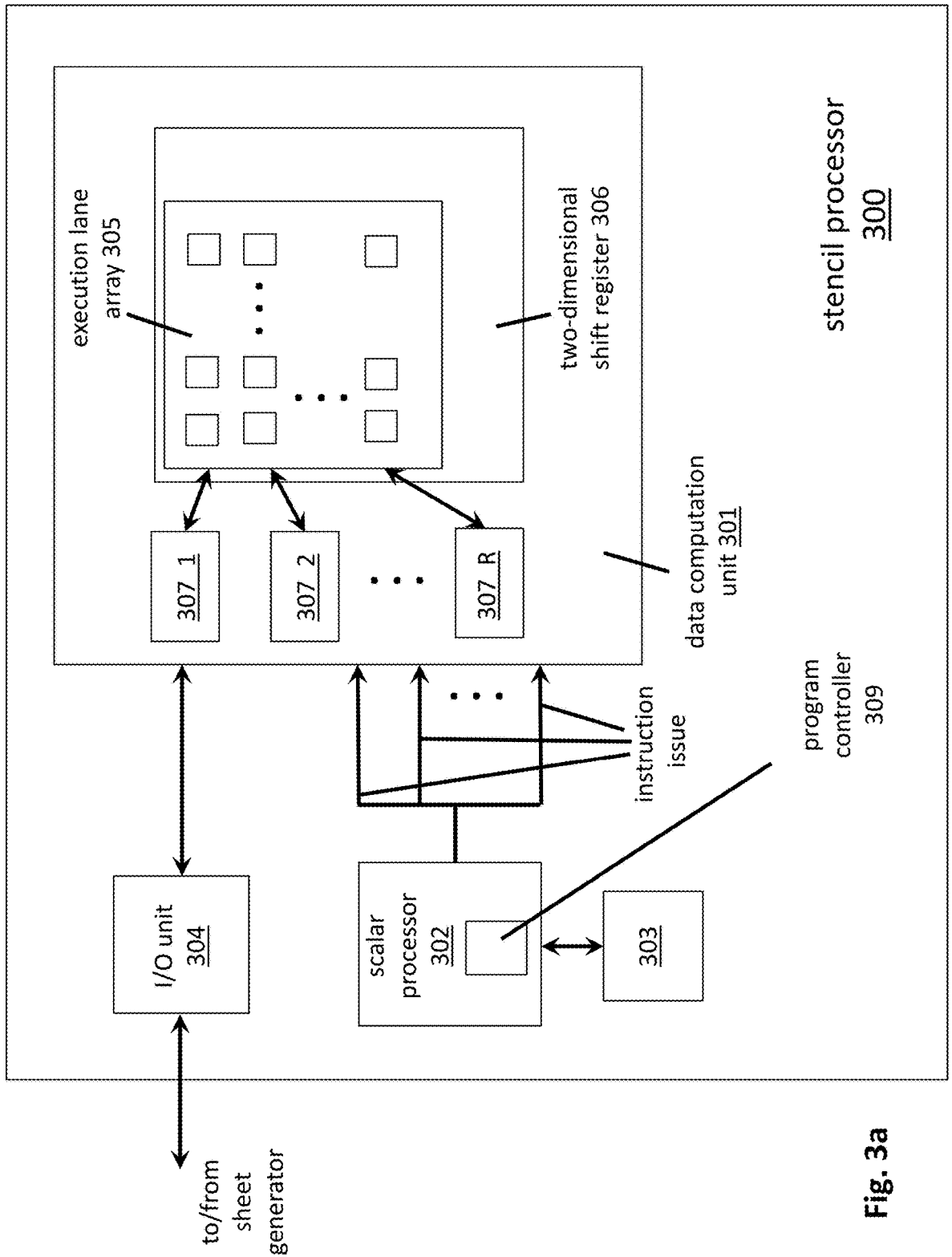
FIG. 3a shows an embodiment of a stencil processor.

FIG. 3a shows an embodiment of a stencil processor unit architecture 300. As observed in FIG. 3a, the stencil processor includes a data computation unit 301, a scalar processor 302 and associated memory 303, and an I/O unit 304. The data computation unit 301 includes an array of execution lanes 305, a two-dimensional shift array structure 306, and separate respective random access memories 307 associated with specific rows or columns of the array.

The I/O unit 304 is responsible for loading "input" sheets of data received from the sheet generator into the data computation unit 301 and storing "output" sheets of data from the stencil processor into the sheet generator. In an embodiment the loading of sheet data into the data computation unit 301 entails parsing a received sheet into rows/columns of image data and loading the rows/columns of image data into the two dimensional shift register structure 306 or respective random access memories 307 of the rows/columns of the execution lane array (described in more detail below). If the sheet is initially loaded into memories 307, the individual execution lanes within the execution lane array 305 may then load sheet data into the two-dimensional shift register structure 306 from the random access memories 307 when appropriate (e.g., as a load instruction just prior to operation on the sheet's data). Upon completion of the loading of a sheet of data into the register structure 306 (whether directly from a sheet generator or from memories 307), the execution lanes of the execution lane array 305 operate on the data and eventually "write back" finished data as a sheet directly back to the sheet generator, or, into the random access memories 307. If the execution lanes write back to random access memories 907, the I/O unit 304 fetches the data from the random access memories 307 to form an output sheet which is then forwarded to the sheet generator.

The scalar processor 302 includes a program controller 309 that reads the instructions of the stencil processor's program code from scalar memory 303 and issues the instructions to the execution lanes in the execution lane array 305. In an embodiment, a single same instruction is broadcast to all execution lanes within the array 305 to effect a single instruction multiple data (SIMD)-like behavior from the data computation unit 301. In an embodiment, the instruction format of the instructions read from scalar memory 303 and issued to the execution lanes of the execution lane array 305 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more multiple instruction multiple data (MIMD)-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 305).

The combination of an execution lane array 305, program controller 309, and two dimensional shift register structure 306, provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 305, the random access memories 307 may also keep one or more look-up tables. In various embodiments one or more scalar look-up tables may also be instantiated within the scalar memory 303.

A scalar look-up involves passing the same data value from the same look-up table from the same index to each of the execution lanes within the execution lane array 305. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look up from a scalar look-up table within scalar memory essentially involves broadcasting the same data value to all execution lanes within the execution lane array 305 during the same clock cycle. Additional details concerning use and operation of look-up tables is provided further below.

FIG. 3b summarizes the VLIW instruction word embodiment(s) discussed above. As observed in FIG. 3b, the VLIW instruction word format includes fields for three separate instructions: 1) a scalar instruction 351 that is executed by the scalar processor; 2) an ALU instruction 352 that is broadcasted and executed in SIMD fashion by the respective ALUs within the execution lane array; and, 3) a memory instruction 353 that is broadcasted and executed in a partial SIMD fashion (e.g., if execution lanes along a same row in the execution lane array share a same random access memory, then one execution lane from each of the different rows actually executes the instruction (the format of the memory instruction 353 may include an operand that identifies which execution lane from each row executes the instruction).

A field 354 for one or more immediate operands is also included. Which of the instructions 351, 352, 353 use which immediate operand information may be identified in the instruction format. Each of instructions 351, 352, 353 also includes its own respective input operand and resultant information (e.g., local registers for ALU operations and a local register and a memory address for memory access instructions). In an embodiment, the scalar instruction 351 is executed by the scalar processor before the execution lanes within the execution lane array execute either of the other two instructions 352, 353. That is, the execution of the VLIW word includes a first cycle upon which the scalar instruction 351 is executed followed by a second cycle upon with the other instructions 352, 353 may be executed (note that in various embodiments instructions 352 and 353 may be executed in parallel).

In an embodiment, the scalar instructions executed by the scalar processor 302 include commands issued to the sheet generator 103 to load/store sheets from/into the memories or 2D shift register 306 of the data computation unit 301. Here, the sheet generator's operation can be dependent on the operation of the line buffer unit 101 or other variables that prevent pre-runtime comprehension of the number of cycles it will take the sheet generator 103 to complete any command issued by the scalar processor 302. As such, in an embodiment, any VLIW word whose scalar instruction 351 corresponds to or otherwise causes a command to be issued to the sheet generator 103 also includes no-operation (NOOP) instructions in the other two instruction fields 352, 353. The program code then enters a loop of NOOP instructions for instruction fields 352, 353 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 4:
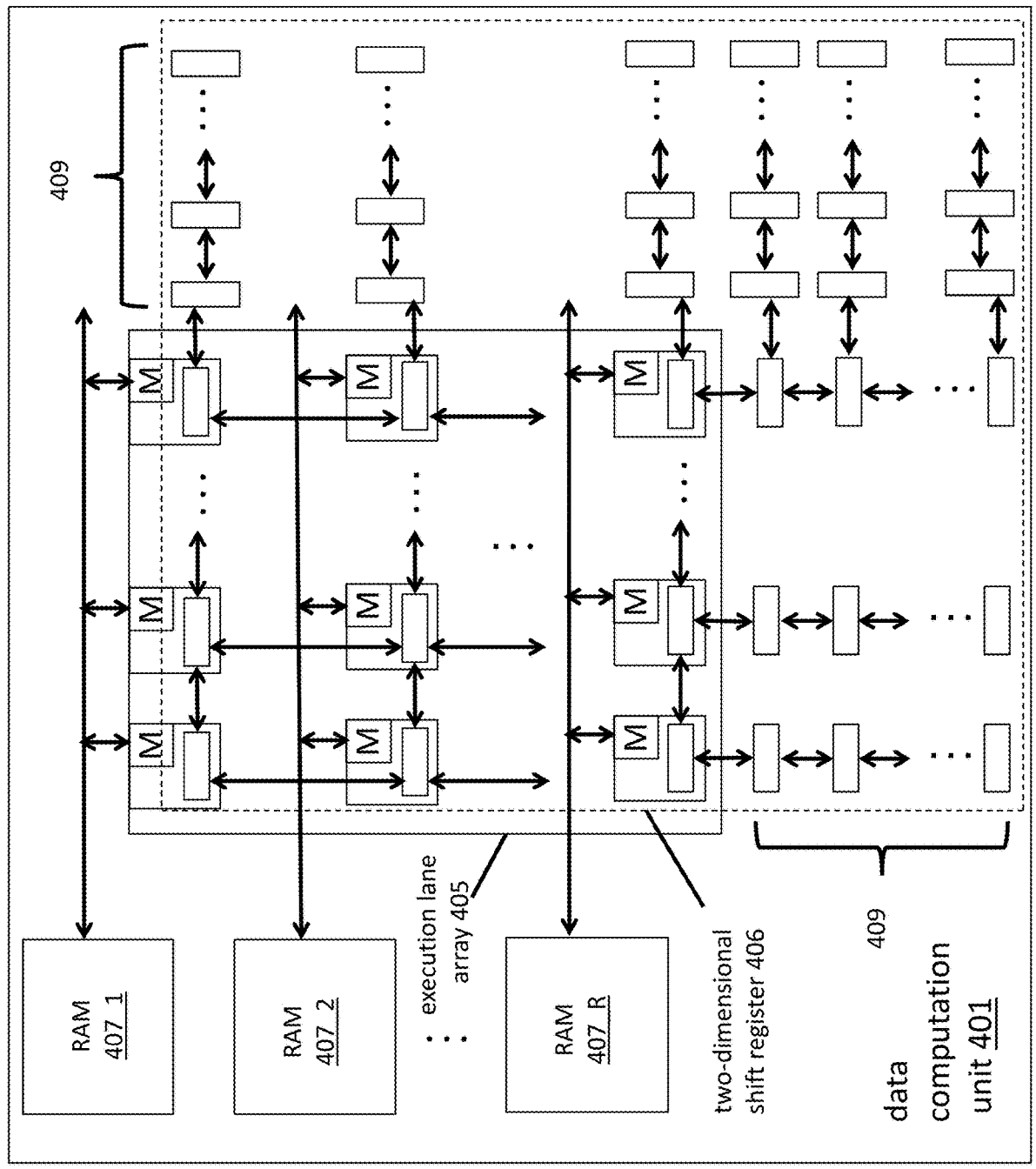
FIG. 4 shows an embodiment of a data computation unit within a stencil processor.

FIG. 4 shows an embodiment of a data computation unit 401. As observed in FIG. 4, the data computation unit 401 includes an array of execution lanes 405 that are logically positioned "above" a two-dimensional shift register array structure 406. As discussed above, in various embodiments, a sheet of image data provided by a sheet generator is loaded into the two-dimensional shift register 406. The execution lanes then operate on the sheet data from the register structure 406.

The execution lane array 405 and shift register structure 406 are fixed in position relative to one another. However, the data within the shift register array 406 shifts in a strategic and coordinated fashion to cause each execution lane in the execution lane array to process a different stencil within the data. As such, each execution lane determines the output image value for a different pixel in the output sheet being generated. From the architecture of FIG. 4 it should be clear that overlapping stencils are not only arranged vertically but also horizontally as the execution lane array 405 includes vertically adjacent execution lanes as well as horizontally adjacent execution lanes.

Some notable architectural features of the data computation unit 401 include the shift register structure 406 having wider dimensions than the execution lane array 405. That is, there is a "halo" of registers 409 outside the execution lane array 405. Although the halo 409 is shown to exist on two sides of the execution lane array, depending on implementation, the halo may exist on less (one) or more (three or four) sides of the execution lane array 405. The halo 405 serves to provide "spill-over" space for data that spills outside the bounds of the execution lane array 405 as the data is shifting "beneath" the execution lanes 405. As a simple case, a 5×5 stencil centered on the right edge of the execution lane array 405 will need four halo register locations further to the right when the stencil's leftmost pixels are processed. For ease of drawing, FIG. 4 shows the registers of the right side of the halo as only having horizontal shift connections and registers of the bottom side of the halo as only having vertical shift connections when, in a nominal embodiment, registers on either side (right, bottom) would have both horizontal and vertical connections.

Additional spill-over room is provided by random access memories 407 that are coupled to each row and/or each column in the array, or portions thereof (e.g., a random access memory may be assigned to a "region" of the execution lane array that spans 4 execution lanes row wise and 2 execution lanes column wise. For simplicity the remainder of the application will refer mainly to row and/or column based allocation schemes). Here, if an execution lane's kernel operations require it to process pixel values outside of the two-dimensional shift register array 406 (which some image processing routines may require) the plane of image data is able to further spill-over, e.g., from the halo region 409 into random access memory 407. For example, consider a 6×6 stencil where the hardware includes a halo region of only four storage elements to the right of an execution lane on the right edge of the execution lane array. In this case, the data would need to be shifted further to the right off the right edge of the halo 409 to fully process the stencil. Data that is shifted outside the halo region 409 would then spill-over to random access memory 407. Other applications of the random access memories 407 and the stencil processor of FIG. 3 are provided further below.

FIGS. 5a through 5k demonstrate a working example of the manner in which image data is shifted within the two dimensional shift register array "beneath" the execution lane array as alluded to above. As observed in FIG. 5a, the data contents of the two dimensional shift array are depicted in a first array 507 and the execution lane array is depicted by a frame 505. Also, two neighboring execution lanes 510 within the execution lane array are simplistically depicted. In this simplistic depiction 510, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 5a through 5k depict one of these deeper register locations as being used to store the resultant X from the respective execution lanes. For illustrative ease the deeper resultant register is drawn alongside rather than beneath its counterpart register R2.

FIGS. 5a through 5k focus on the calculation of two stencils whose central position is aligned with the pair of execution lane positions 511 depicted within the execution lane array 505. For ease of illustration, the pair of execution lanes 510 are drawn as horizontal neighbors when in fact, according to the following example, they are vertical neighbors.

Figure 5B:
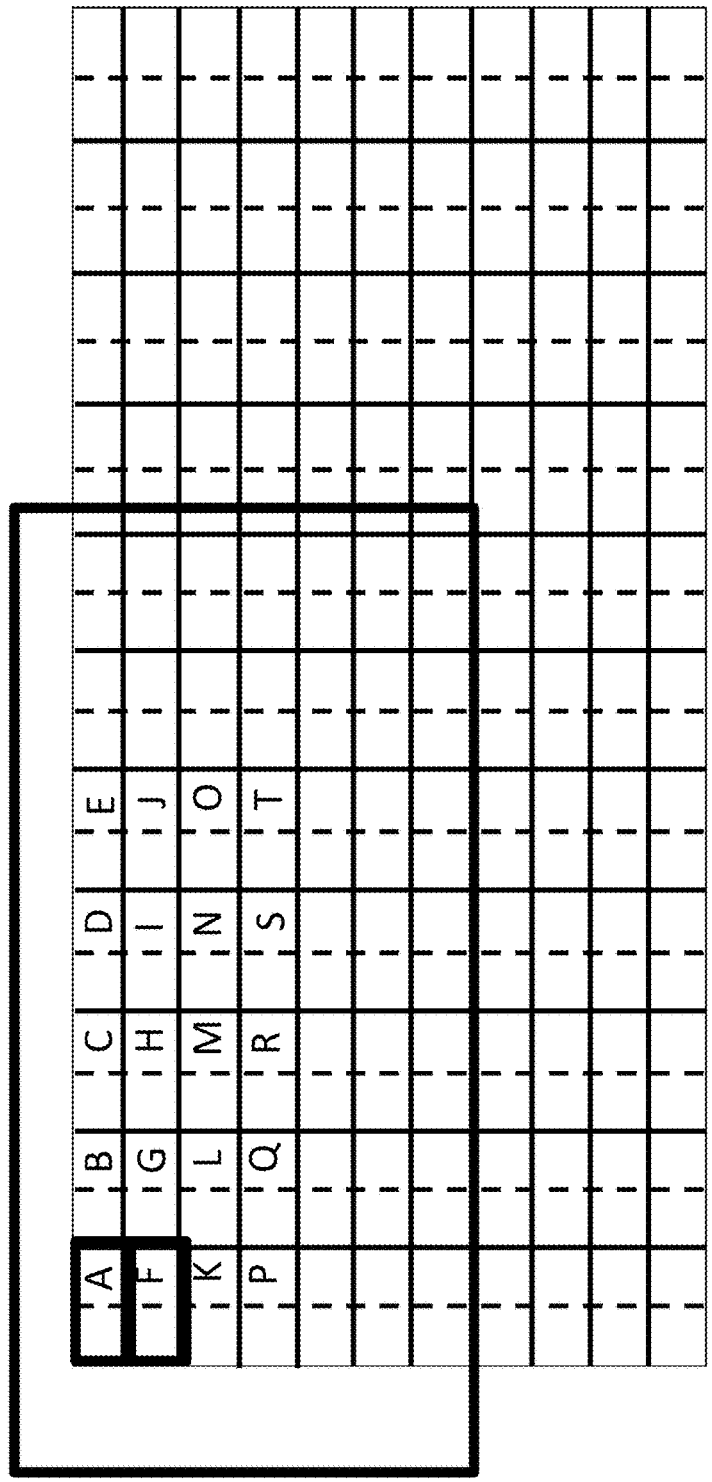

As observed initially in FIG. 5a, the execution lanes 511 are centered on their central stencil locations. FIG. 5b shows the object code executed by both execution lanes 511. As observed in FIG. 5b the program code of both execution lanes 511 causes the data within the shift register array 507 to shift down one position and shift right one position. This aligns both execution lanes 511 to the upper left hand corner of their respective stencils. The program code then causes the data that is located (in R2) in their respective locations to be loaded into R1.

Figure 5C:
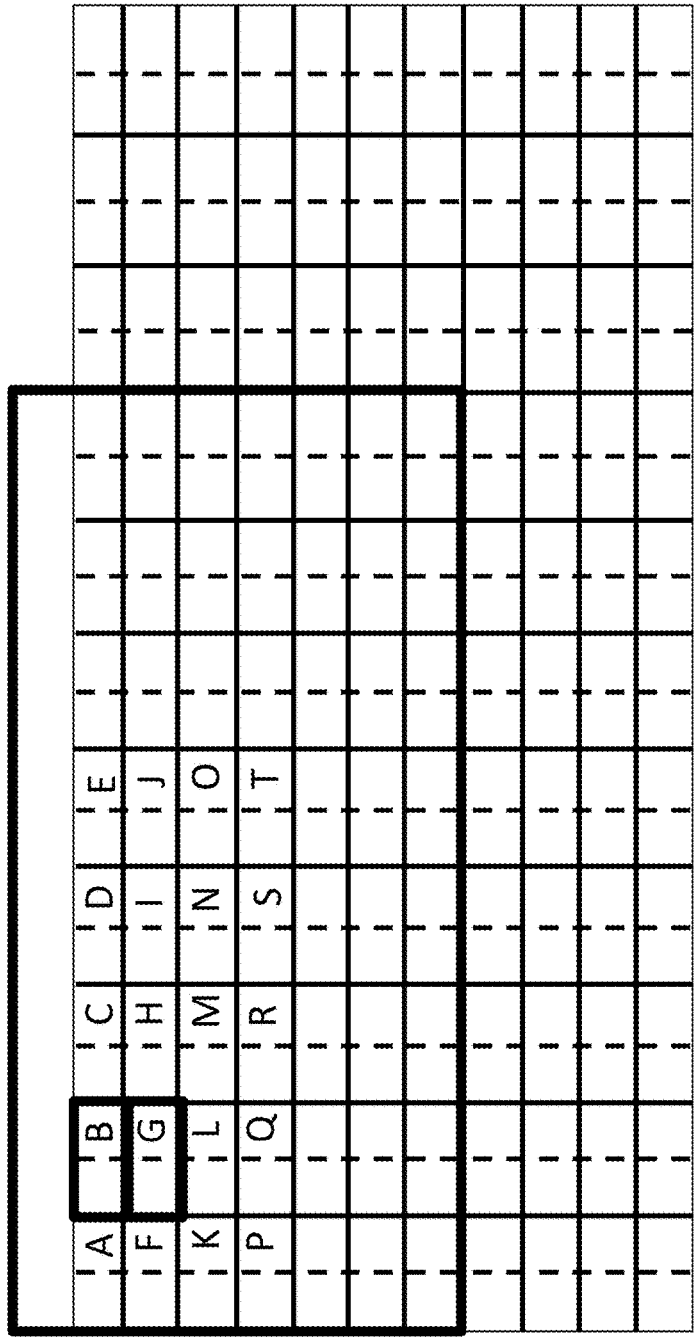
Figure 5D:
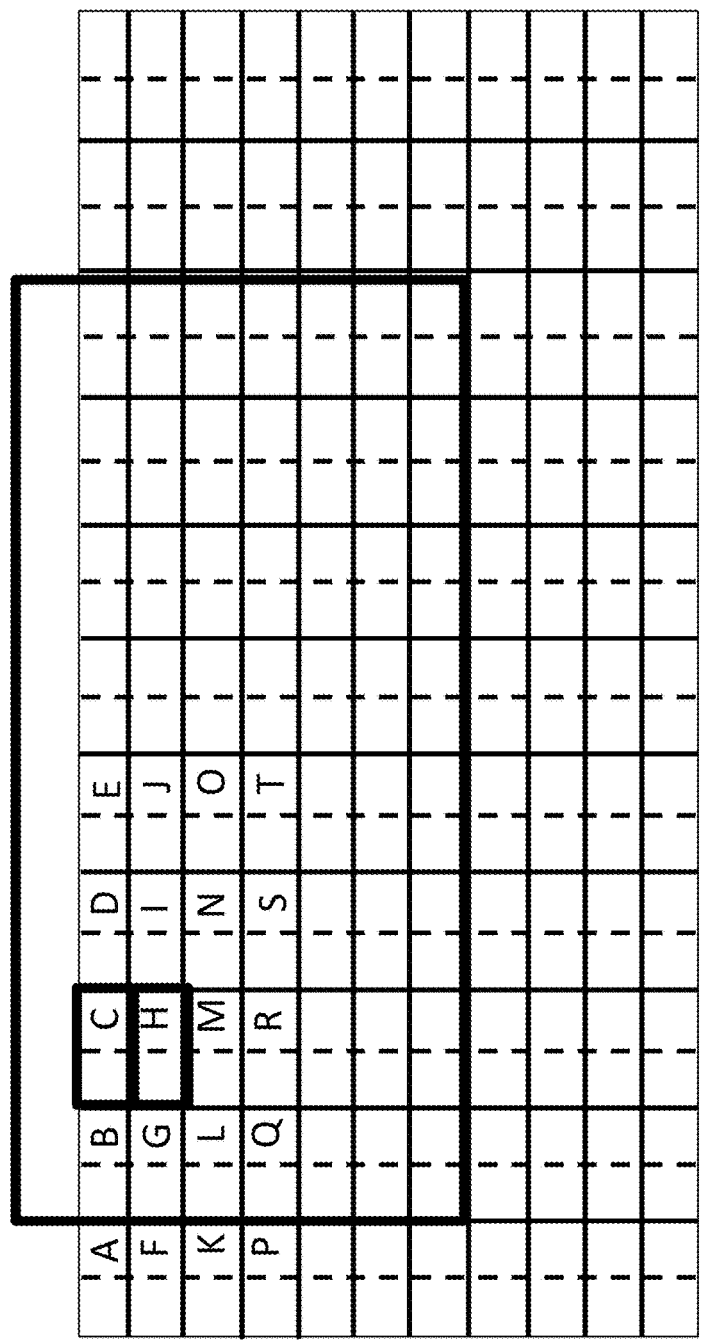

As observed in FIG. 5c the program code next causes the pair of execution lanes 511 to shift the data within the shift register array 507 one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 5d the same process as described above for FIG. 5c is repeated which causes the resultant R1 to now include the value A+B+C in the upper execution lane and F+G+H in the lower execution lane. At this point both execution lanes 511 have processed the upper row of their respective stencils. Note the spill-over into a halo region on the left side of the execution lane array 505 (if one exists on the left hand side) or into random access memory if a halo region does not exist on the left hand side of the execution lane array 505.

Figure 5E:
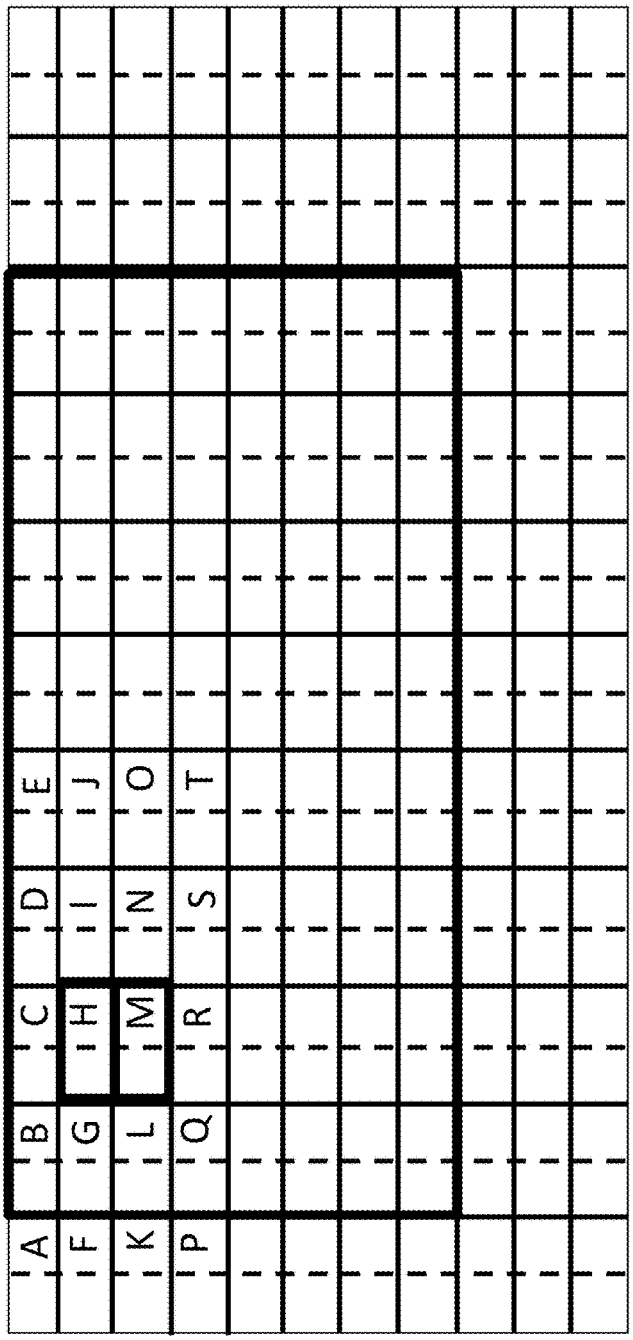
Figure 5F:
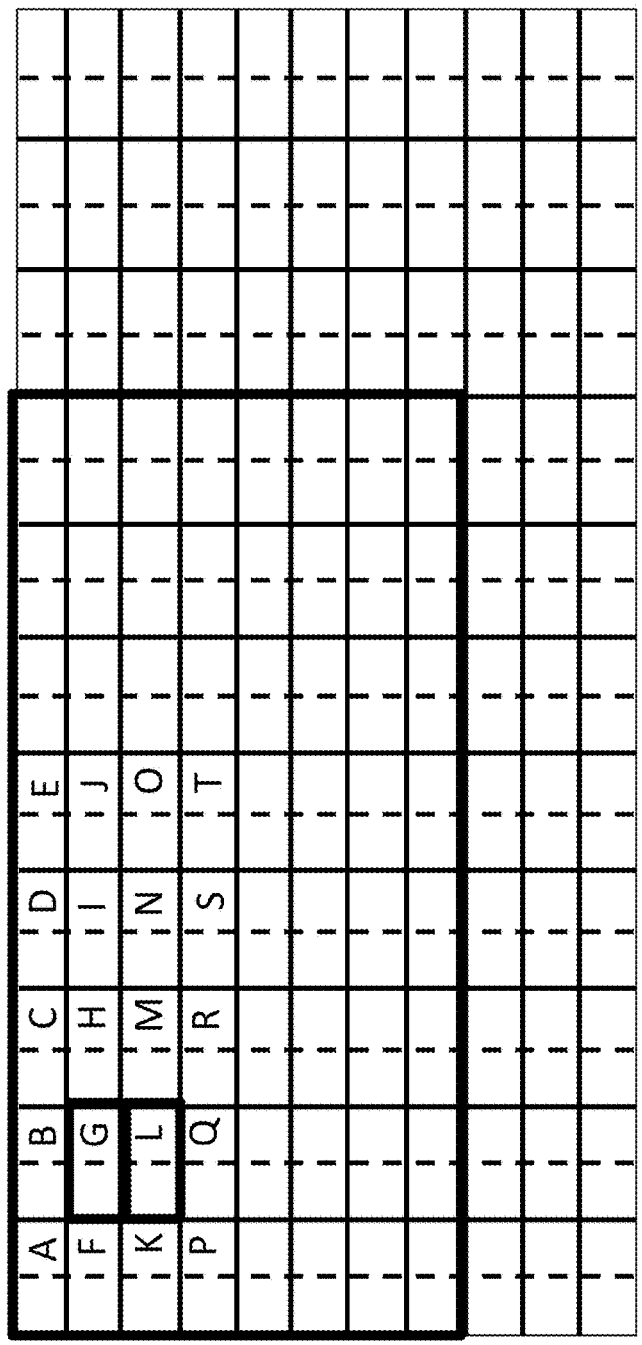
Figure 5G:
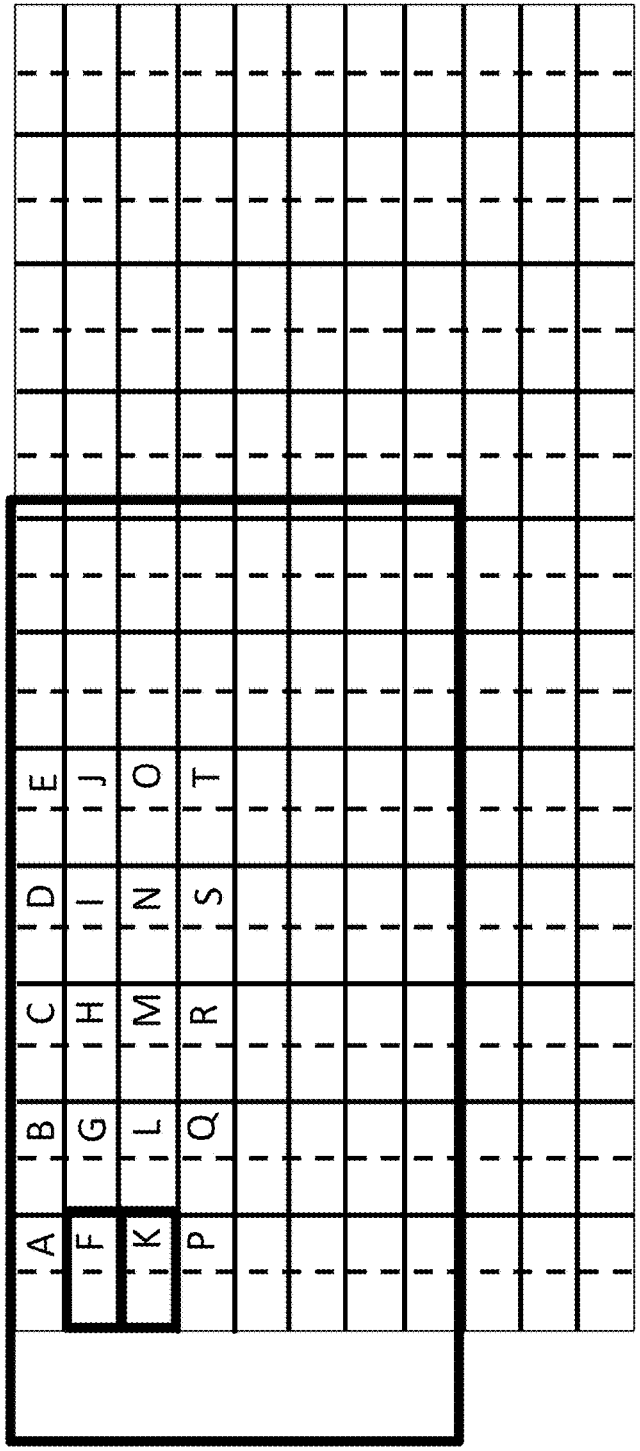

As observed in FIG. 5e, the program code next causes the data within the shift register array to shift one unit up which causes both execution lanes 511 to be aligned with the right edge of the middle row of their respective stencils. Register R1 of both execution lanes 511 currently includes the summation of the stencil's top row and the middle row's rightmost value. FIGS. 5f and 5g demonstrate continued progress moving leftwise across the middle row of both execution lane's stencils. The accumulative addition continues such that at the end of processing of FIG. 5g both execution lanes 511 include the summation of the values of the top row and the middle row of their respective stencils.

Figure 5H:
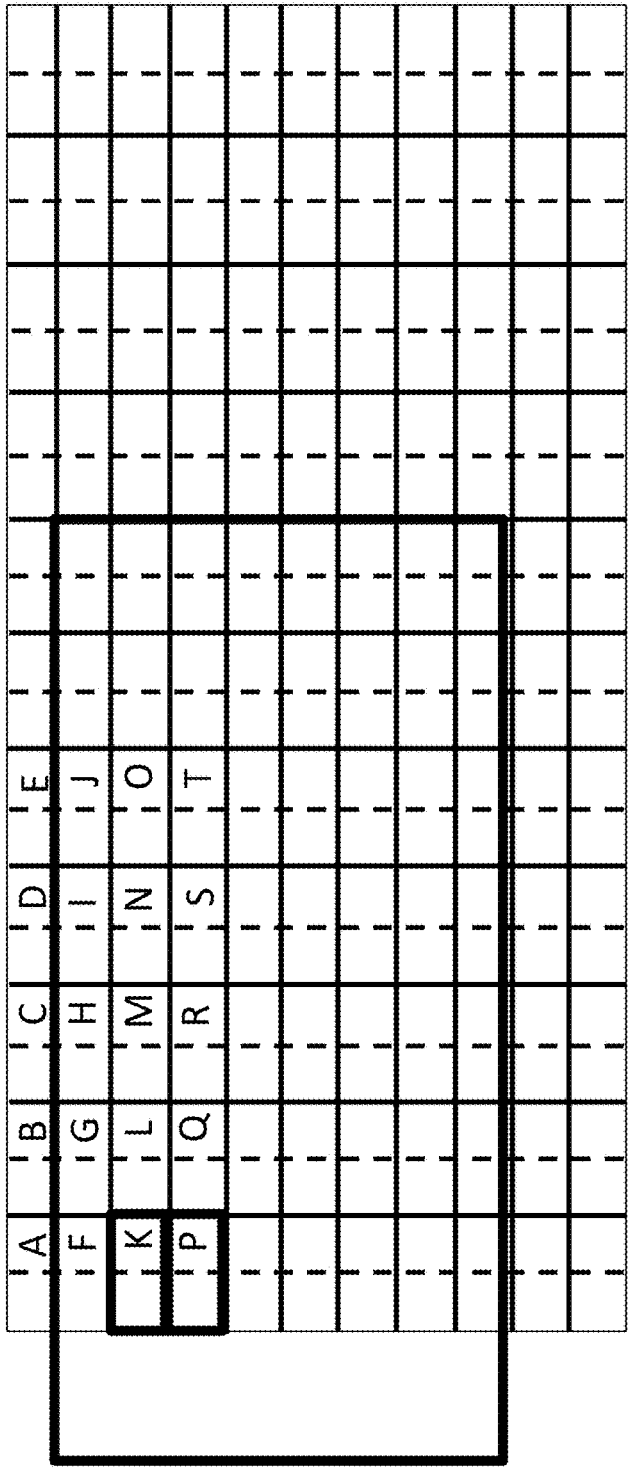
Figure 5I:
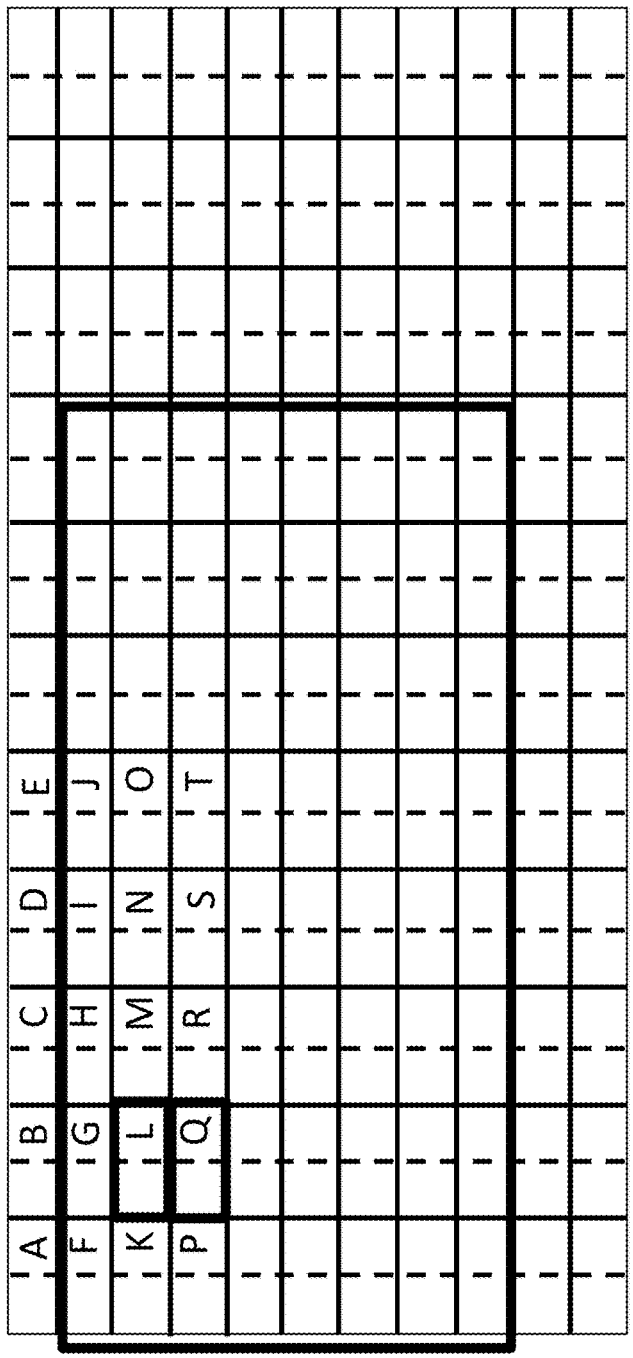
Figure 5J:
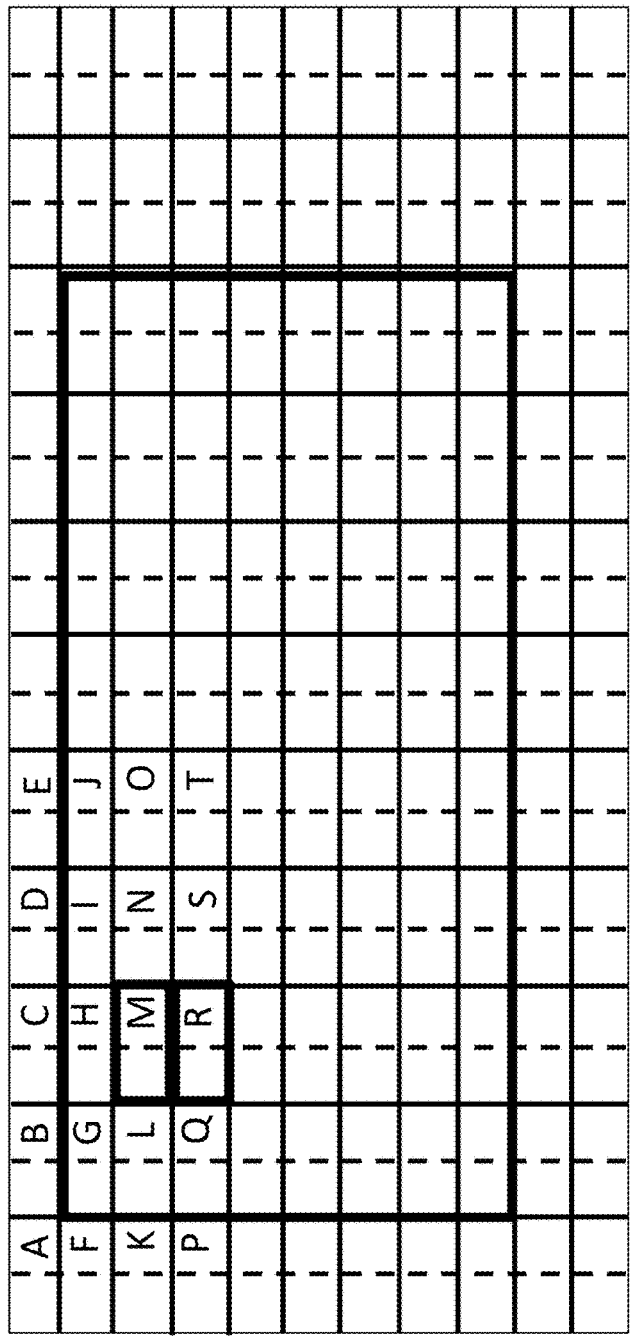
Figure 5K:
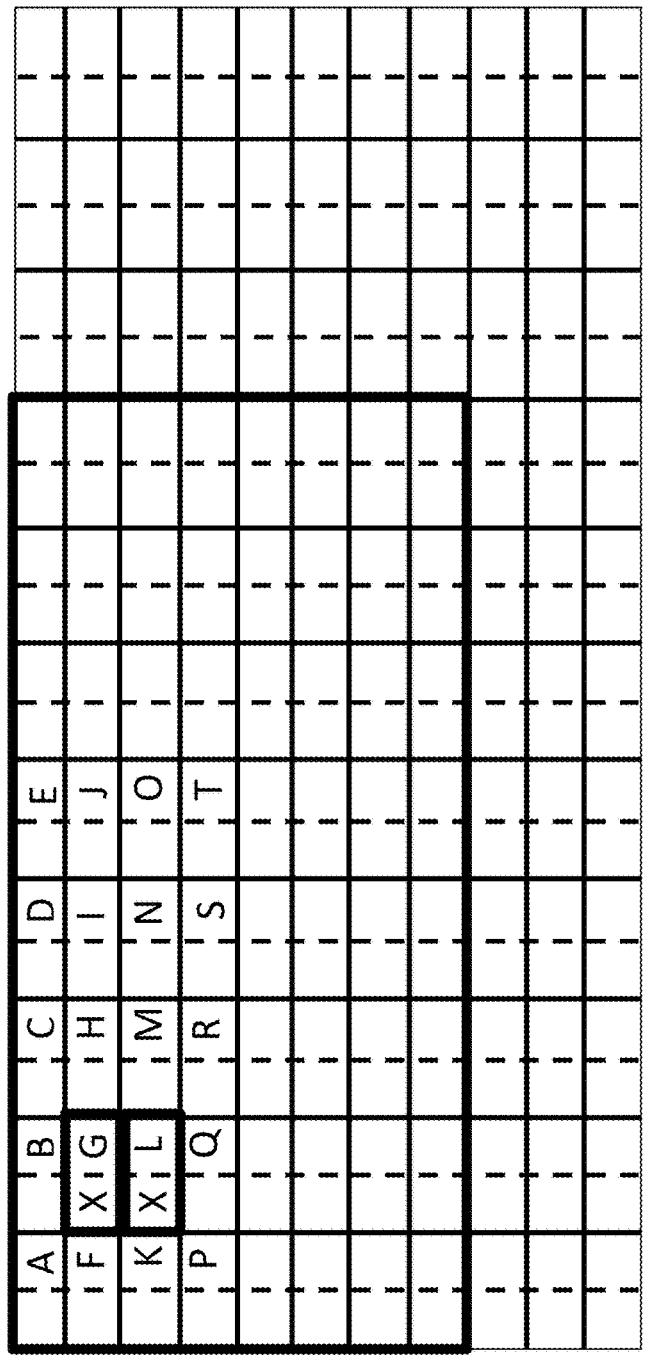

FIG. 5h shows another shift to align each execution lane with its corresponding stencil's lowest row. FIGS. 5i and 5j show continued shifting to complete processing over the course of both execution lanes' stencils. FIG. 5k shows additional shifting to align each execution lane with its correct position in the data array and write the resultant thereto.

In the example of FIGS. 5a-5k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

Figure 6:
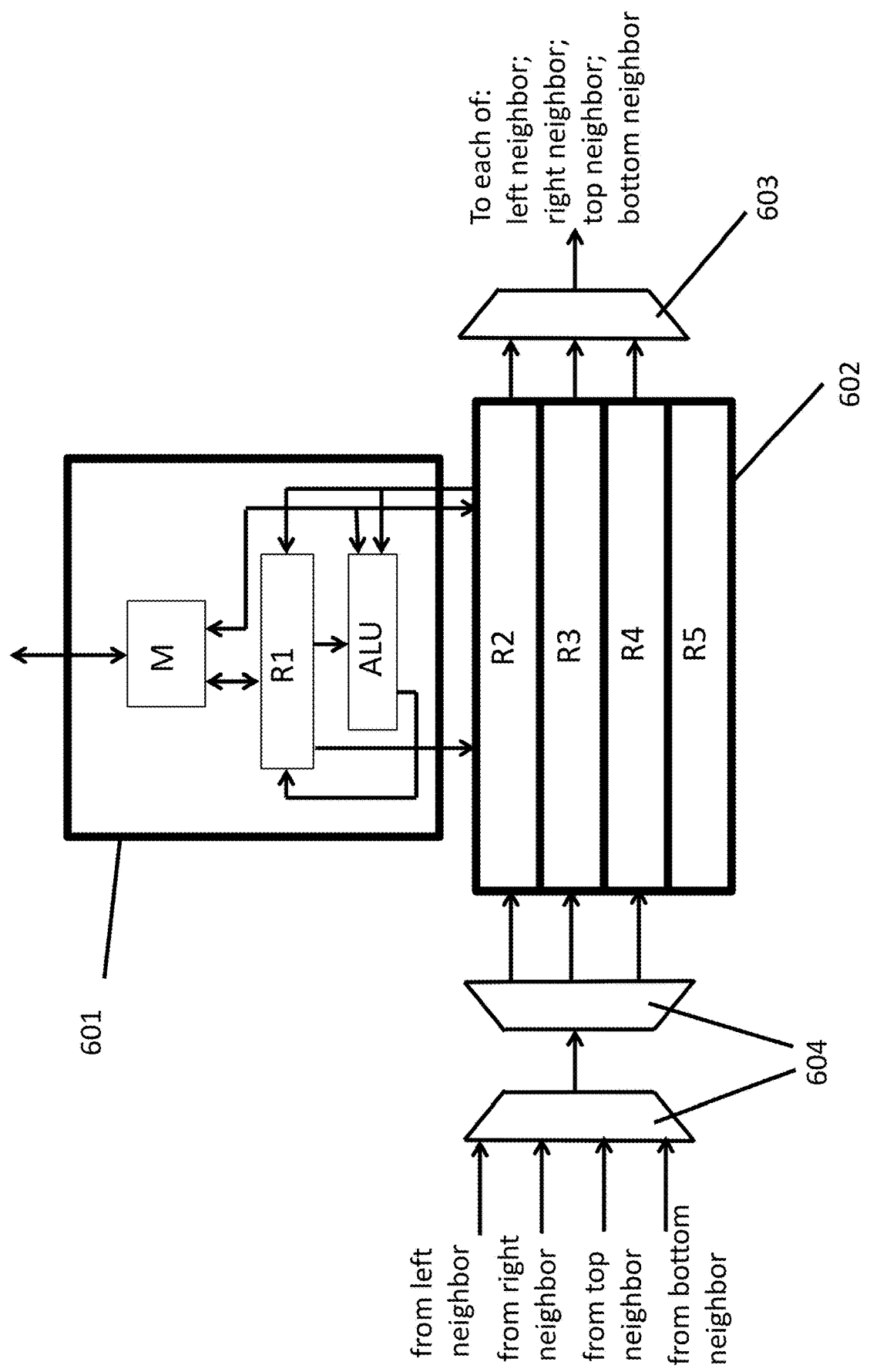
FIG. 6 shows an embodiment of a unit cell for an integrated execution lane array and two-dimensional shift array.

FIG. 6a shows another, more detailed depiction of the unit cell for the array execution lane and shift register structure (registers in the halo region do not include a corresponding execution lane). The execution lane and the register space that is associated with each location in the execution lane array are, in an embodiment, implemented by instantiating the circuitry observed in FIG. 6a at each node of the execution lane array. As observed in FIG. 6a, the unit cell includes an execution lane 601 coupled to a register file 602 consisting of four registers R2 through R5. During any cycle, the execution lane 601 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 603, and, having the contents of any of (only) one of registers R2 through R4 replaced with content that is shifted "in" from a corresponding one if its neighbors through input multiplexers 604 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 603, 604 permits for different shift source and shift target registers within a same register file during a same cycle.

As depicted in FIG. 6a, note that during a shift sequence an execution lane will shift content out from its register file 602 to each of its left, right, top, and bottom neighbors. In conjunction with the same shift sequence, the execution lane will also shift content into its register file from a particular one of its left, right, top, and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 603, 604 observed in FIG. 6a is incorporated into the design of FIG. 6a. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of an execution lane's register files are shifted out during a shift sequence, note that the content of the non shifted out registers of each execution lane remain in place (do not shift). As such, any non-shifted content that is not replaced with shifted-in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 601, in various embodiments, the mathematical opcodes supported by the hardware ALU are integrally tied with (e.g., substantially the same as) the mathematical opcodes supported by a virtual execution lane (e.g., ADD, SUB, MOV, MUL, MAD, ABS, DIV, SHL, SHR, MIN/MAX, SEL, AND, OR, XOR, NOT). As described just above, memory access instructions can be executed by the execution lane 601 to fetch/store data from/to their associated random access memory. Additionally the hardware execution lane 601 supports shift operation instructions (right, left, up, down) to shift data within the two-dimensional shift register structure. As described above, program control instructions are largely executed by the scalar processor of the stencil processor.

c. Implementation of Convolutional Neural Network (CNN) on Image Processor

Figure 7:
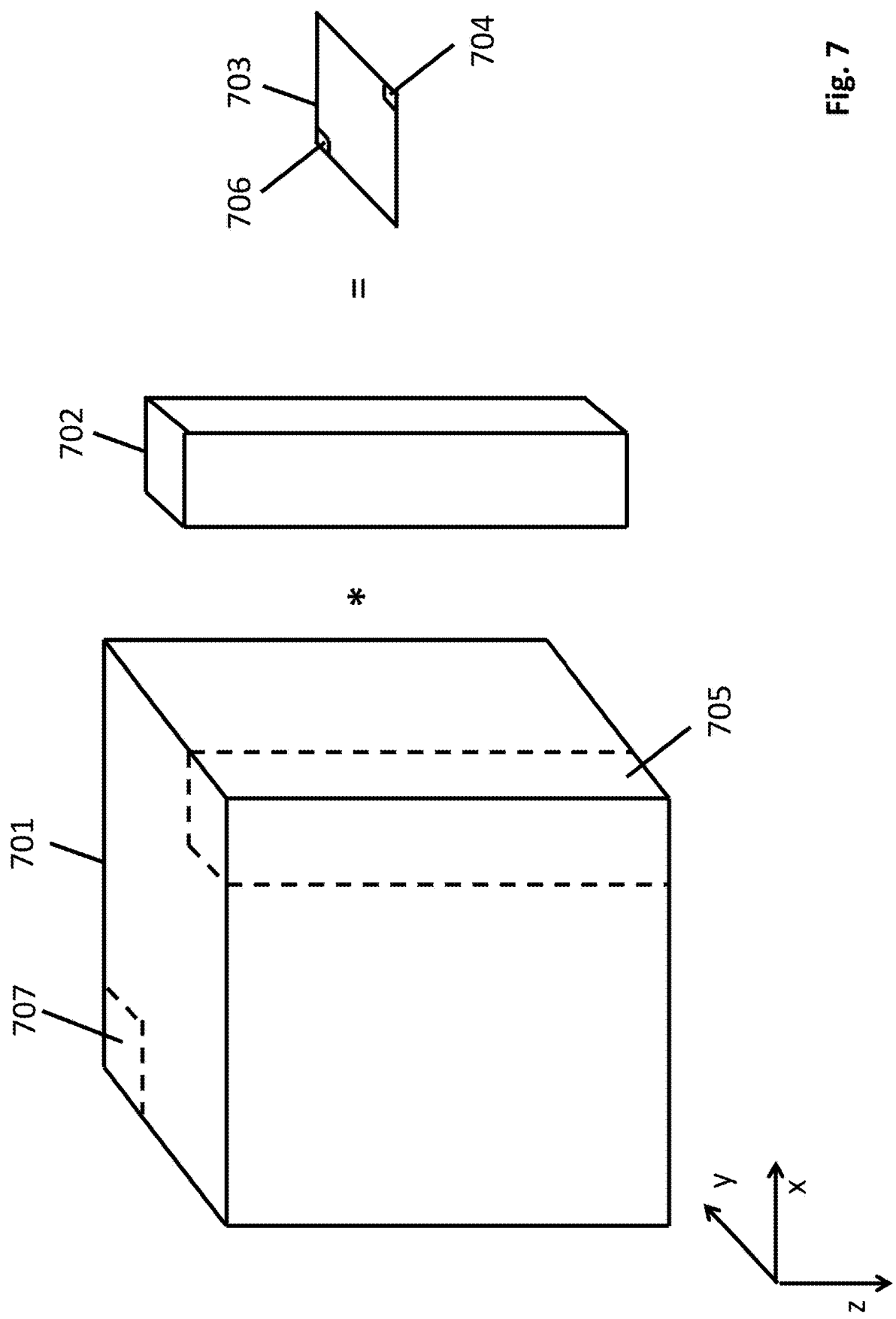
FIG. 7 depicts a 3D convolution.

FIG. 7 shows a graphical depiction of a three-dimensional (3D) convolution. A 3D convolution, as is known in the art, can be used to implement a convolutional neural network (CNN) for, e.g., an image processing application, a machine vision application, an object recognition application, and/or a machine learning application. As observed in FIG. 7, the three-dimensional convolution "convolves" a three-dimensional block of image data 701 and a three-dimensional block of coefficients 702. Here, the three-dimensional block of coefficients 702 are convolved over same sized blocks within the image data 701 to produce a resultant surface area 703.

In practice, the image data 701 and coefficient data 702 are implemented as three dimensional matrices of information. That is, the image data 701 may be implemented as a three dimensional matrix of pixel data and the coefficient data 702 may be implemented as a three dimensional matrix of coefficient values. To perform the 3D convolution, a three dimensional dot product is calculated whereby pixels in a smaller three-dimensional portion of the image data 701 having same dimensions as the coefficients (such as smaller portion 705) are respectively multiplied by same positioned coefficients within the three dimensional matrix of coefficients 702.

The partial products from each of the individual multiplications are then added to produce a single value (a scalar) that corresponds to the resultant of the dot product. The scalar resultant is located in the resultant array 703 at a location that corresponds to the location of the smaller region within the image data 701 that was convolved. For instance, the convolution of smaller portion 705 with coefficients 702 generates a scalar located at position 704 within the resultant surface 703. Similarly, the convolution of smaller portion 707 (of which only the top surface is visible for ease of drawing) with coefficients 702 generates a scalar value that is positioned at location 706 within the resultant area 703.

As such, a different scalar value will be generated for each different smaller portion of image data that is multiplied by the coefficients 702, and, each of the different scalars have a respective position within the resultant surface area 703.

Details on various embodiments of 3D convolution implementation are described in more detail further below.

Figure 8:
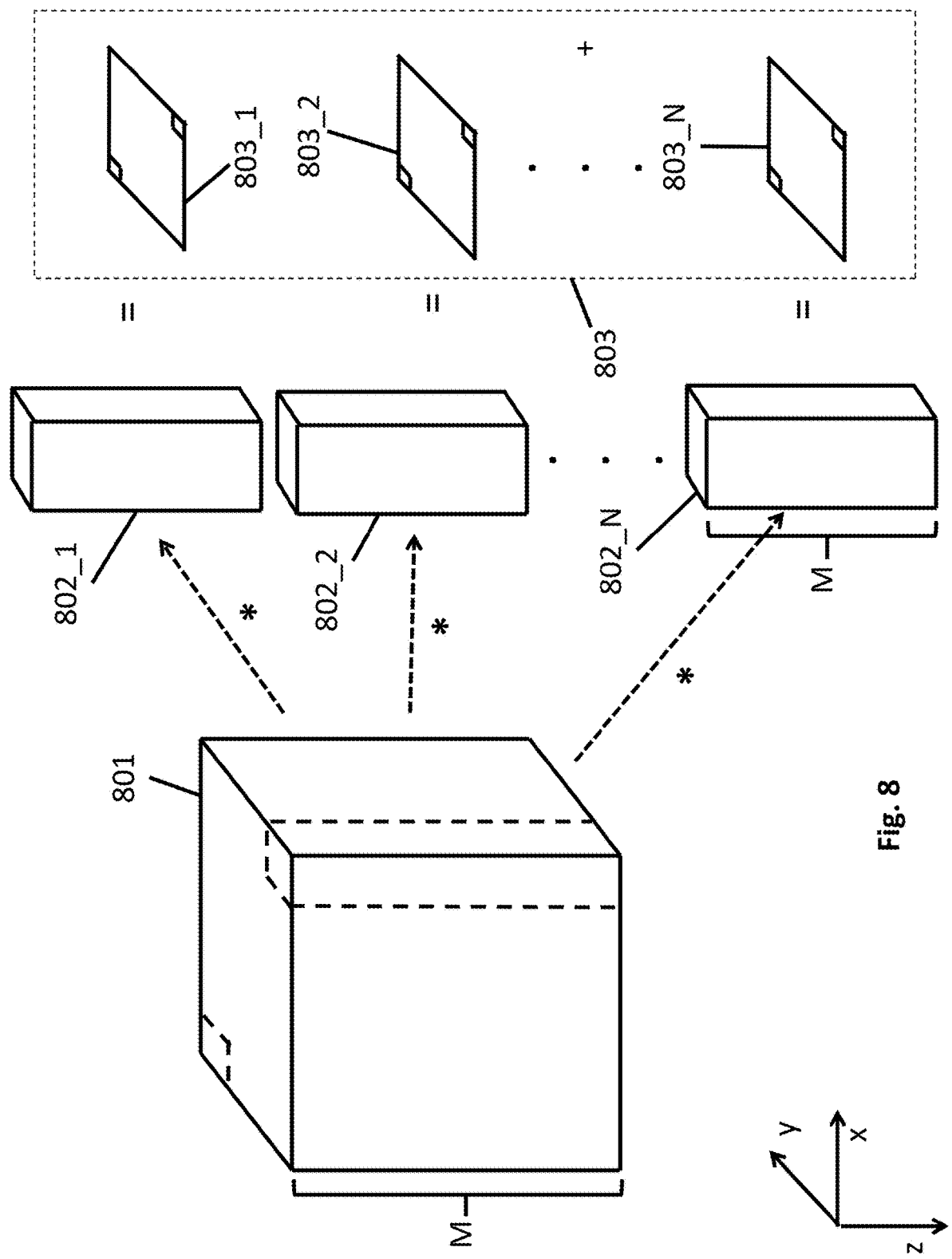
FIG. 8 depicts a CNN layer.

A CNN layer typically includes multiple 3D convolutions per block of image data. More specifically, a CNN layer typically includes multiple blocks of coefficients that are convolved with a single block of image data. FIG. 8 shows an example of such a CNN layer. Here, the same block of image data 801 is convolved with multiple blocks of coefficients 802_1 through 802_N to produce N resultant surface areas 803_1 through 803_N. Thus, the overall resultant 803 can be viewed as a three dimensional block 803 having N resultant planes. In various processing applications, the three dimensional resultant block 803 is used as the input image block for a next CNN computation. The processing of FIG. 8 corresponds to the processing of a single CNN layer. A complete CNN may be computed from the execution of multiple such CNN layers.

Figure 9A:
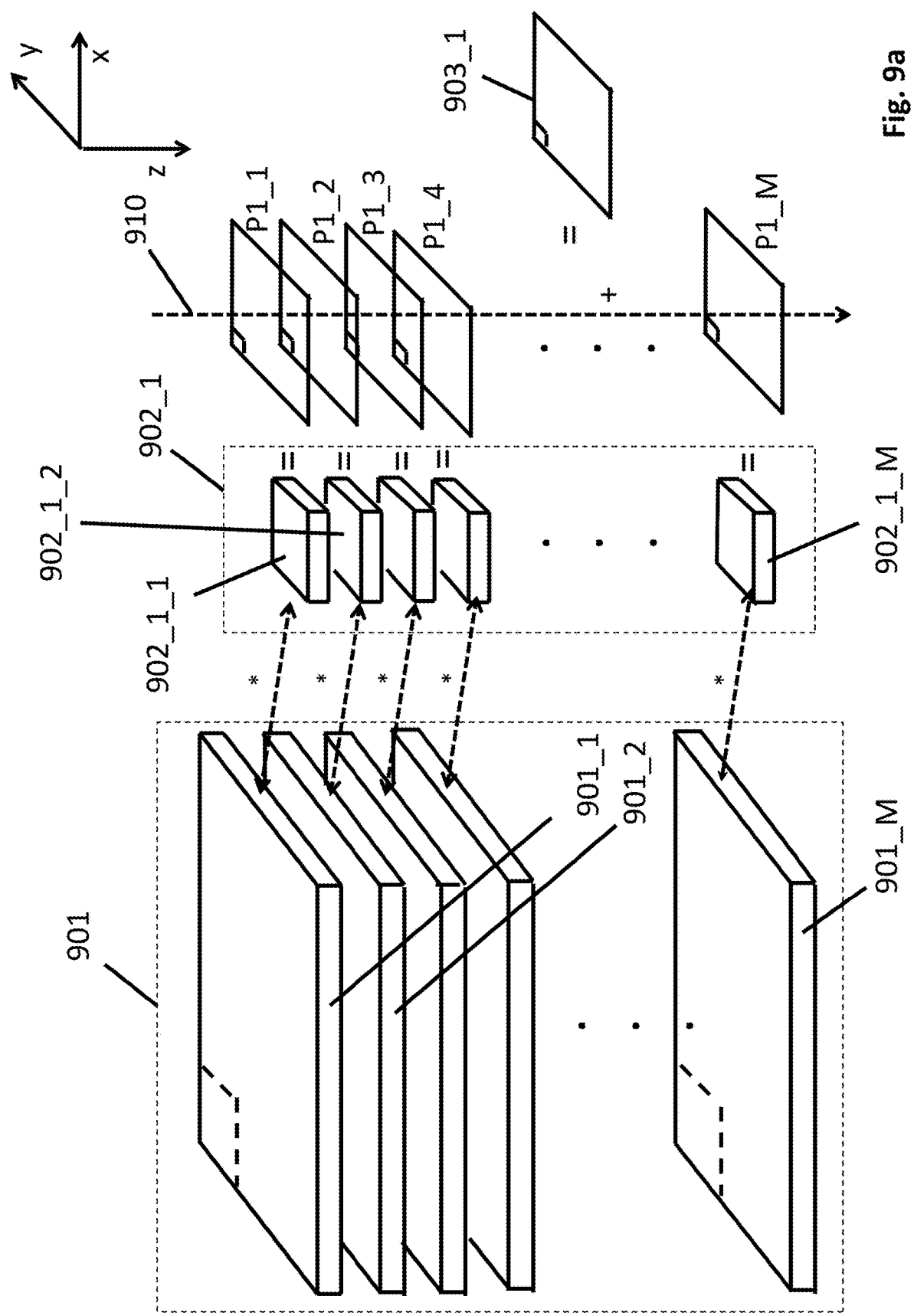
FIG. 9a depicts a 3D convolution with image a coefficient planes.
Figure 9B:
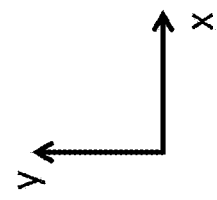
FIG. 9b depicts a 2D convolution of two 3×3 stencils worth of image data with a corresponding set of coefficients.

FIGS. 9a and 9b depict an embodiment of a 3D convolution. Referring to FIG. 9a, the block of image data 901 (which corresponds to block of image data 801 in FIG. 8) can be viewed as being composed of multiple planes of image data. That is, the block of image data 901 can be viewed as being composed of a first plane 901_1 at a first depth position along the z axis, a second plane 901_2 at a second depth position along the z axis, etc., . . . and an Mth plane 901_M at an Mth depth position along the z axis. In practice, each level or depth along the z axis may correspond to a different "channel" of the image data. For example, if M=3, the first planar level 901_1 may correspond to red (R) data, the second planar level 901_2 correspond to green (G) data, and the third planar level 901_3 may correspond to blue (B) data.

Likewise, the block of coefficients 902_1 (which corresponds to the first block of coefficients 802_1 in FIG. 8), can also be viewed as being composed of M planes of coefficient data along M "depth" z axis positions. The 3D convolution is calculated as the summation of M two-dimensional (2D) convolutions. Here, image data and coefficients that reside along a same depth level are convolved in a 2D convolution operation to generate an intermediate resultant plane for that depth level.

For example, a first 2D convolution of image data plane 901_1 and coefficient plane 902_1_1 is performed to generate a first intermediate resultant plane P1_1, a second 2D convolution of image data plane 901_2 and coefficient plane 902_1_2 is performed to generate a second intermediate resultant plane P1_2, etc., . . . and an Mth 2D convolution of image data plane 901_M and coefficient plane 902_1_M is performed to generate an Mth intermediate resultant plane P1_M. Intermediate planes P1_1 through P1_M are then added 910 in an aligned fashion (scalar values in the same location of the intermediate plane arrays are added) to produce a resultant array 903_1. The resultant array 903_1 corresponds to resultant array 803_1 in FIG. 8.

FIG. 9b shows an exemplary embodiment of a 2D convolution that may be performed at each z axis depth level of the image and coefficient data. FIG. 9b shows 12 adjacent pixels of data (A through L) which correspond to a smaller portion of the image data within a same plane. The plane of coefficients (a1 through a9) that reside at the same planar level as the image data are also depicted. Operation 940, which is performed when the coefficient data is aligned with stencil position 950, generate a single scalar resultant S_P1 in the intermediate plane for the planar level. By contrast, operation 941, which is performed when the coefficient data is aligned with stencil position 951, generate a single scalar resultant S_P2 in the intermediate plane for the planar level.

Note that each of operations 940 and 941 can be characterized as a large scale multiply-add operation (nine multiplies and eight adds are performed). Because the stencil positions 950, 951 are adjacent to one another, scalar resultants S_P1 and S_P2 will be located adjacent to one another within the resultant intermediate plane. Here, the stencil position "slides" over the surface area of an entire plane of image data and the corresponding "multiply-add" operations that are defined by each unique stencil position generate a unique resultant value in the intermediate plane. The positions of the resultant values with respect to one another within the intermediate plane are defined by the relative positions of the stencils that generated them.

Referring back to FIG. 9a, the M intermediate planes P1_1 through P1_M are summed over 910 to generate resultant plane 903_1. The calculations of FIG. 9a are repeated N times each time with a different coefficient set until all sets of coefficients have been calculated over. That is, as can be gleaned from FIG. 8 and FIGS. 9a and 9b, the operations of FIGS. 9a and 9b are performed N times for each of the coefficients sets 802_1 through 802_N so as to generate resultant planes 803_1 through 803_N.

FIGS. 10a through 10j pertain to the calculation of a CNN layer on an image processor having the architectural features described at length above in the preceding sections of the instant specification. Here the reader is referred not only to FIGS. 10a through 10j but also to FIG. 4. As described in the preceding sections, the stencil processor may have a two-dimensional execution lane array 405 and a corresponding two-dimensional shift register array 406. As will be evident from the following discussion, the methodology of FIGS. 10a through 10j aim to utilize the two-dimensional processing nature of the stencil processor while also minimizing the number of times image data is switched into and out of the stencil processor.

FIG. 10a shows an initial setup phase in which one or more sheets of first plane of image data 1001_1 are loaded into the stencil processor's local memory 407. For illustrative ease, FIG. 10a suggests all of the sheets of the image plane are loaded into the stencil processor's RAM, but in operation, a more piecemeal approach may be undertaken in which the sheet generator receives the full image plane 1001_1, parses the image plane into sheets and feeds sheets into the stencil processor's RAM 407 as appropriate (e.g., a next sheet is loaded into RAM at or before completion of processing on a prior sheet). Additionally, at least the first set of coefficients 1002_1, if not all sets of the coefficients 1002_1 through 1002_N, are loaded into the stencil processor RAM 407. Here, as a point of comparison, image data plane 1001_1 of FIG. 10 corresponds to image data plane 901_1 of FIG. 9, and, coefficient set 1002_1 of FIG. 10 corresponds to coefficient set 902_1 of FIG. 9. As an additional point of comparison, coefficient sets 1002_1 through 1002_N of FIG. 10 correspond to coefficient sets 802_1 through 802_N of FIG. 8.

With the first plane of image data 1001_1 and the first set of coefficients 1002_1 being loaded into stencil processor RAM 407, the system is prepared to perform a 2D convolution as described above with respect to FIG. 9b. FIG. 10b depicts the convolution with image data 1001_1 being convolved with coefficient data 1002_1_1 (which correspond to coefficient data 902_1_1 of FIG. 9a). The 2D convolution includes the loading of one or more sheets of the image data from the stencil processor RAM into the image processor's two dimensional register structure. The 2D convolution itself is then performed resulting in intermediate plane P1_1. A more thorough discussion as to how the 2D convolution may actually be performed is provided further below with respect to FIGS. 11a through 11f.

With the first image plane 1001_1 having been convolved with the first plane of coefficients 1002_1, the machine is ready to begin a next sequence of operations. Here, if the series of operations depicted in FIG. 9a were to be carried out in order, it might require the switching of image plane 901_1 out of stencil processor RAM and the switching in of image plane 901_2 into stencil processor RAM. Subsequently, referring to FIGS. 8 and 9a, note that image plane 901_1 would need to be switched back into stencil processor RAM for the 2D convolutions that are performed with any/all of coefficient sets 802_2 through 802_N. Thus, potentially, image plane 901_1 would need to be switched in and out of stencil processor RAM N times. In order to eliminate the back-and-forth switching of a same plane of image data in and out of the stencil processor, rather than follow the strict processing order suggested by FIG. 9a, instead, once a plane of image data is loaded into the stencil processor RAM it remains there until it has been used to process all coefficient sets of the CNN layer.

Figure 10C:
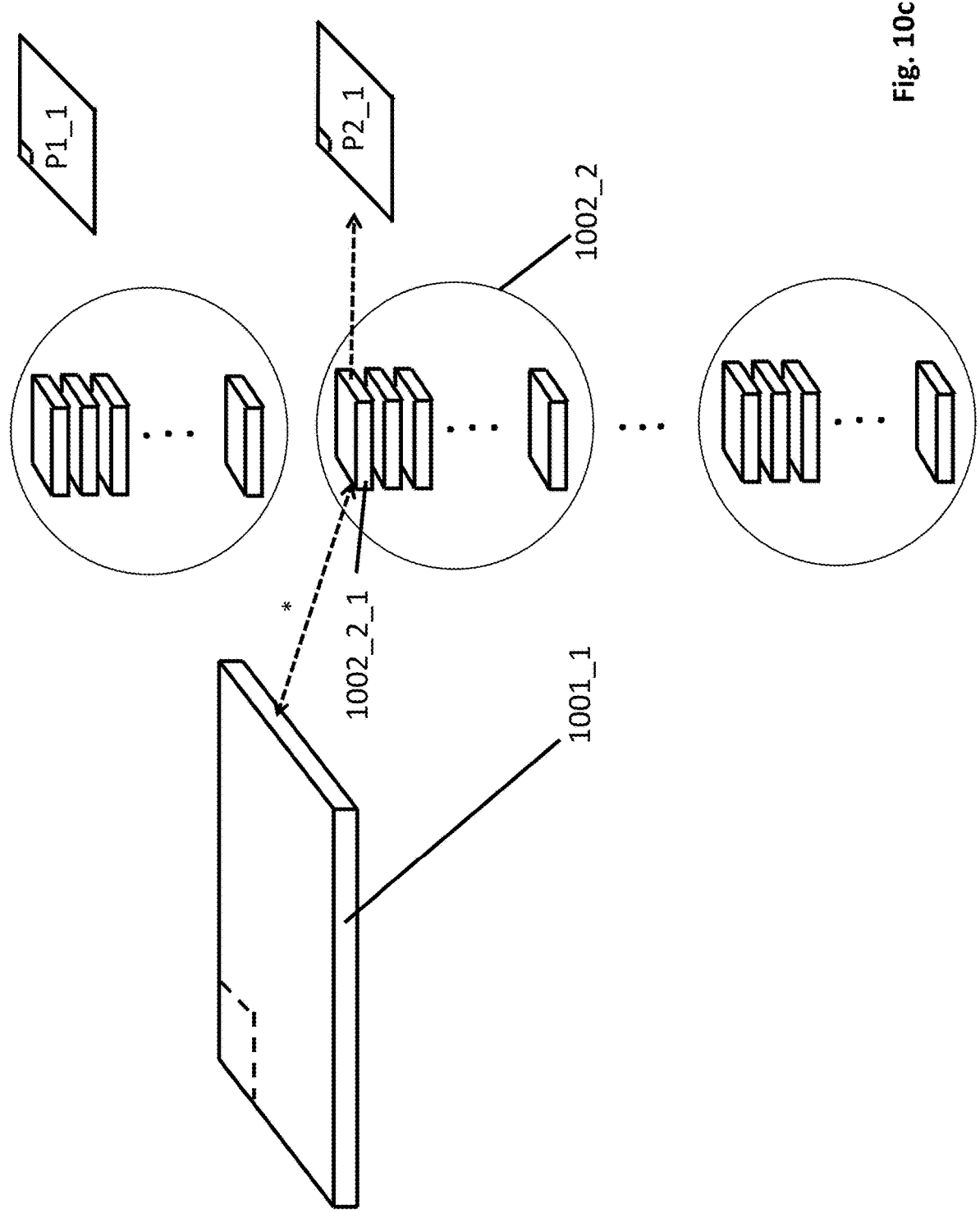
FIGS. 10a, 10b, 10c, 10d, 10e, 10l, 10g, 10h, 10i and 10j depict execution of a CNN layer with image planes and coefficient sets having planes of coefficients.
Figure 10D:
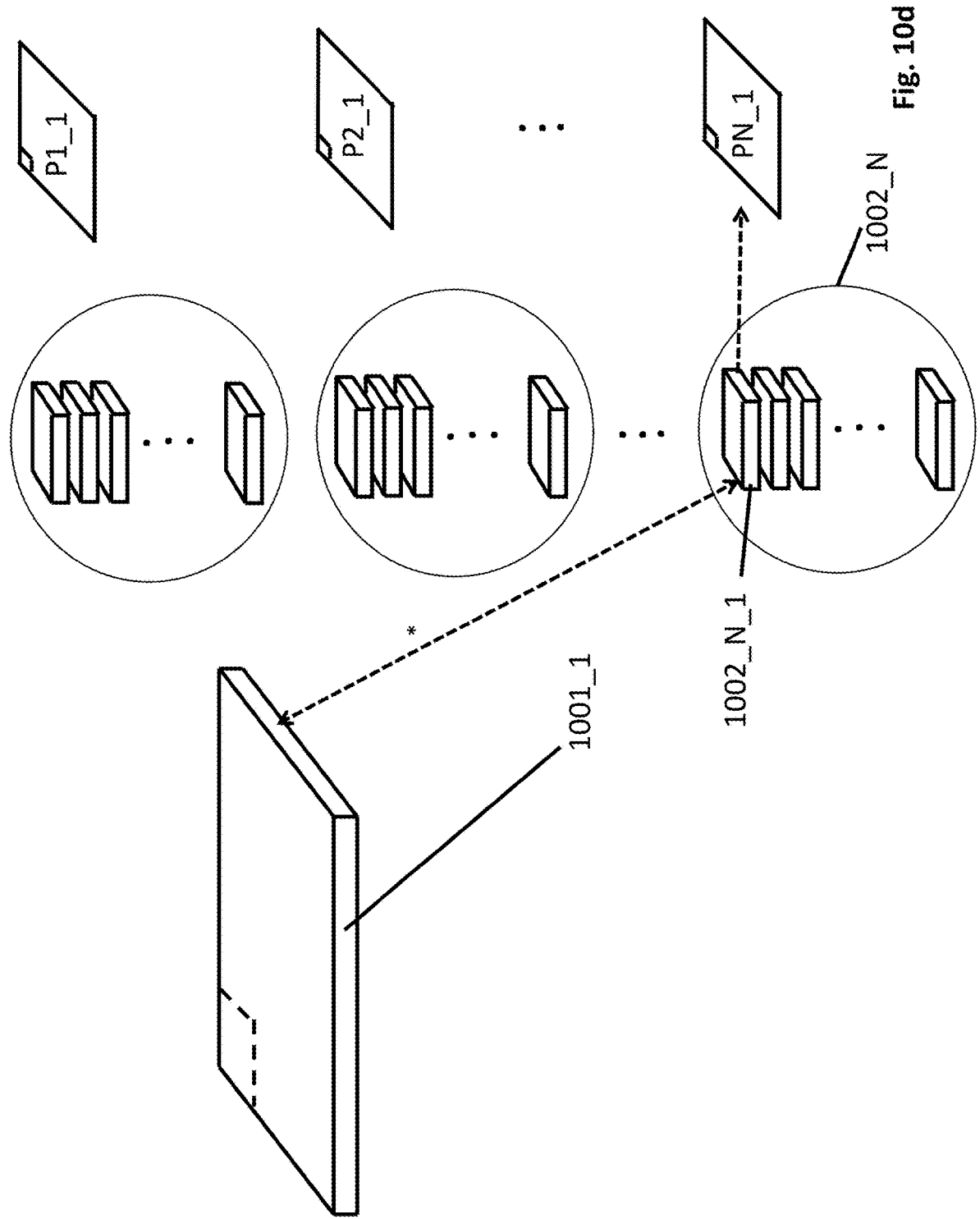

Thus, as depicted in FIG. 10c, the next sequence in the process is to convolve the same image plane 1001_1 with the first plane in the next coefficient set. As such, FIG. 10c shows a 2D convolution being performed with image plane 1001_1 and coefficient plane 1002_2_1 (the first plane in the second set of coefficients). The resultant is the first intermediate plane for the second set of coefficients P2_1. The processing sequence continues to convolve the same, initial image plane 1001_1 with the first plane of each of the coefficients. FIG. 10d shows the last 2D convolutional sequence that includes the initial image plane 1001_1. Here, the 2D convolution is performed with the top plane 1002_N_1 of the Nth coefficient set 1002_N which produces the first intermediate resultant plane for the Nth set of coefficients PN_1.

Figure 10E:
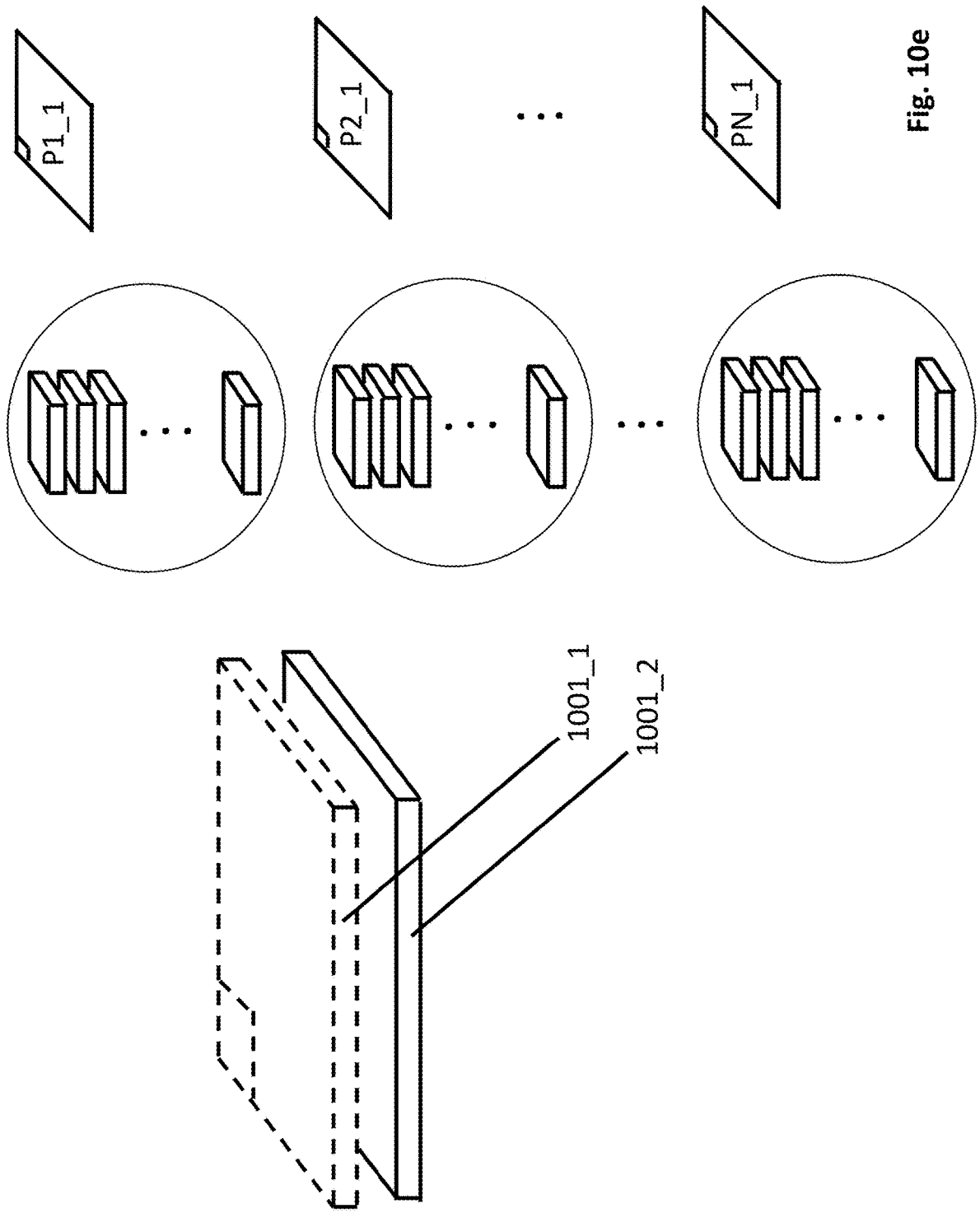

After the completion of the operations of FIG. 10d, the initial image plane 1001_1 has been exhausted and can be switched out of stencil processor RAM (or, e.g., even discarded). As such, referring briefly to FIG. 9a, a next level of image data 901_2 can now be switched into the stencil processor RAM. FIG. 10e shows the new system state with the earlier image data plane 1001_1 having been switched out of the stencil processor RAM (its outline is drawn with hatched lines to indicate it no longer resides in stencil processor RAM) and with the next image plane 1001_2 having been switched into the stencil processor RAM (its outline is drawn with solid lines to indicate it presently resides within stencil processor RAM).

Figure 10F:
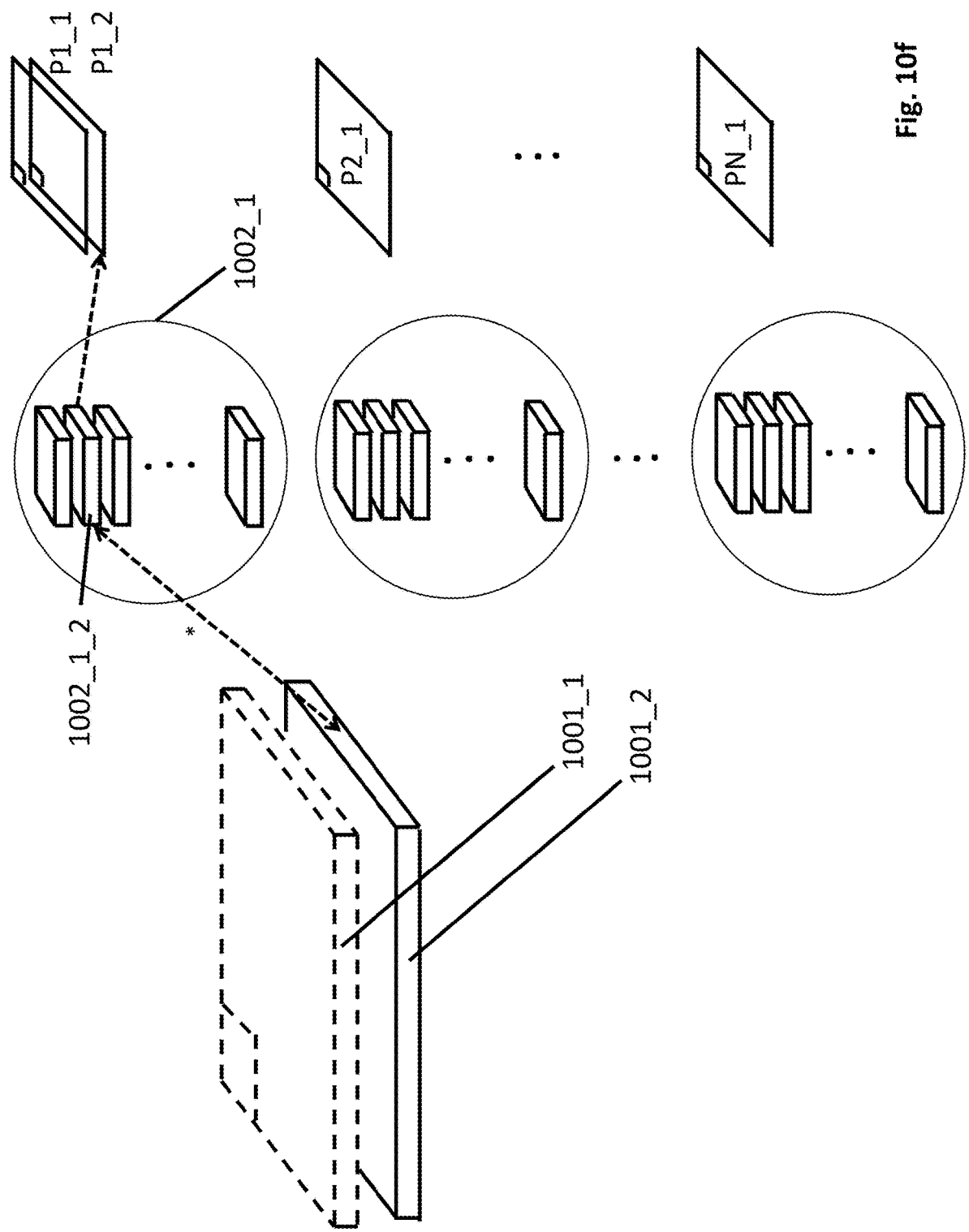
Figure 10G:
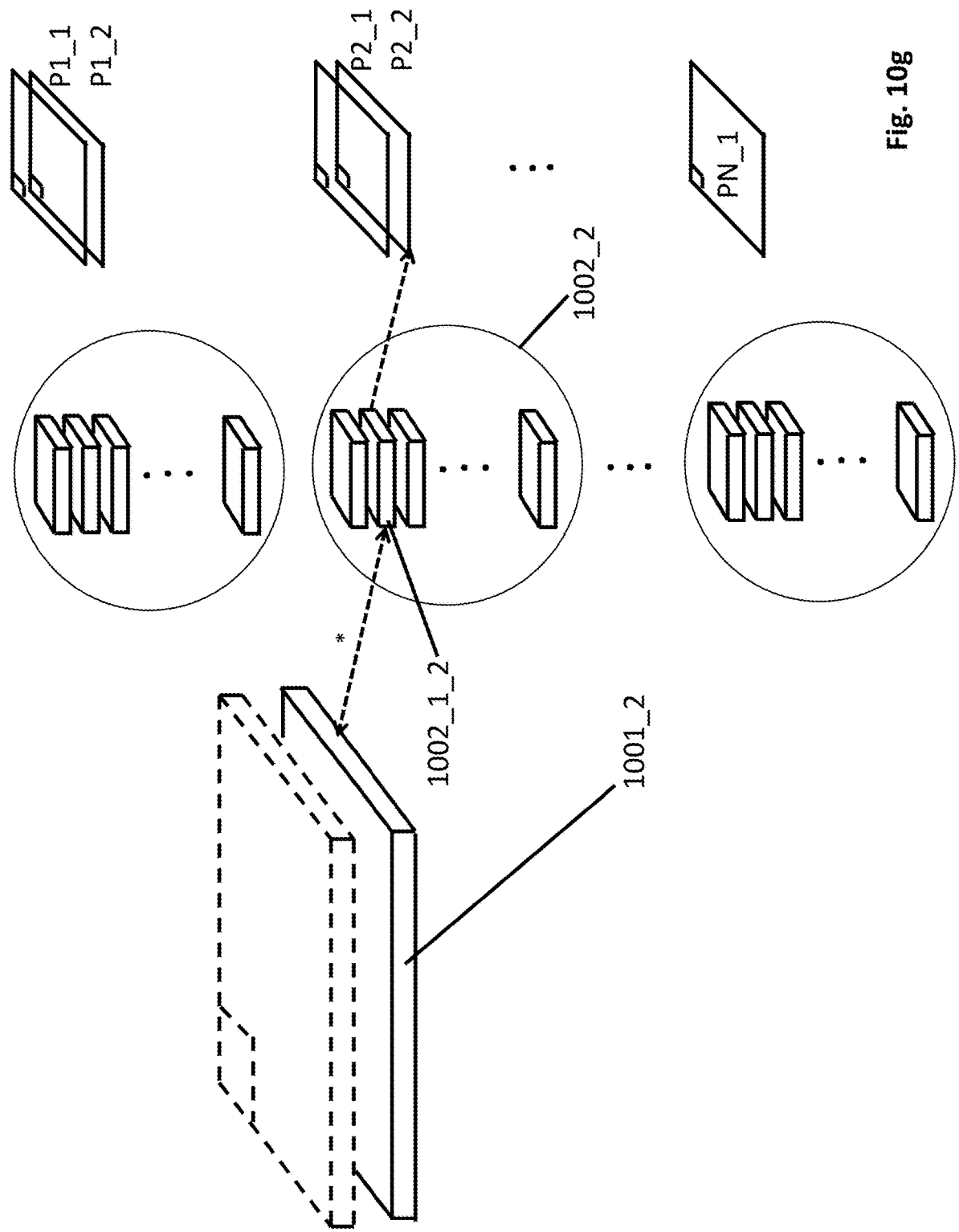

FIG. 10f shows the 2D convolution of new, second image plane 1001_2 with the second level of coefficients 1002_1_2 in the first coefficient set 1002_1. The result of the convolution is the second intermediate plane P1_2 for the first coefficient set 1002_1. FIG. 10g shows the next convolution of image plane 1001_2 with the second level of coefficients 1002_2_2 in coefficient set 1002_2 which produces the second intermediate resultant layer P2_2 for the second coefficient set 1002_2. FIG. 10h shows the last convolution for image plane 1001_2 with the second level of coefficients 1002_N_2 in coefficient set 1002_N which produces second intermediate resultant layer PN_2 for the Nth coefficient set 1002_2.

Figure 10I:
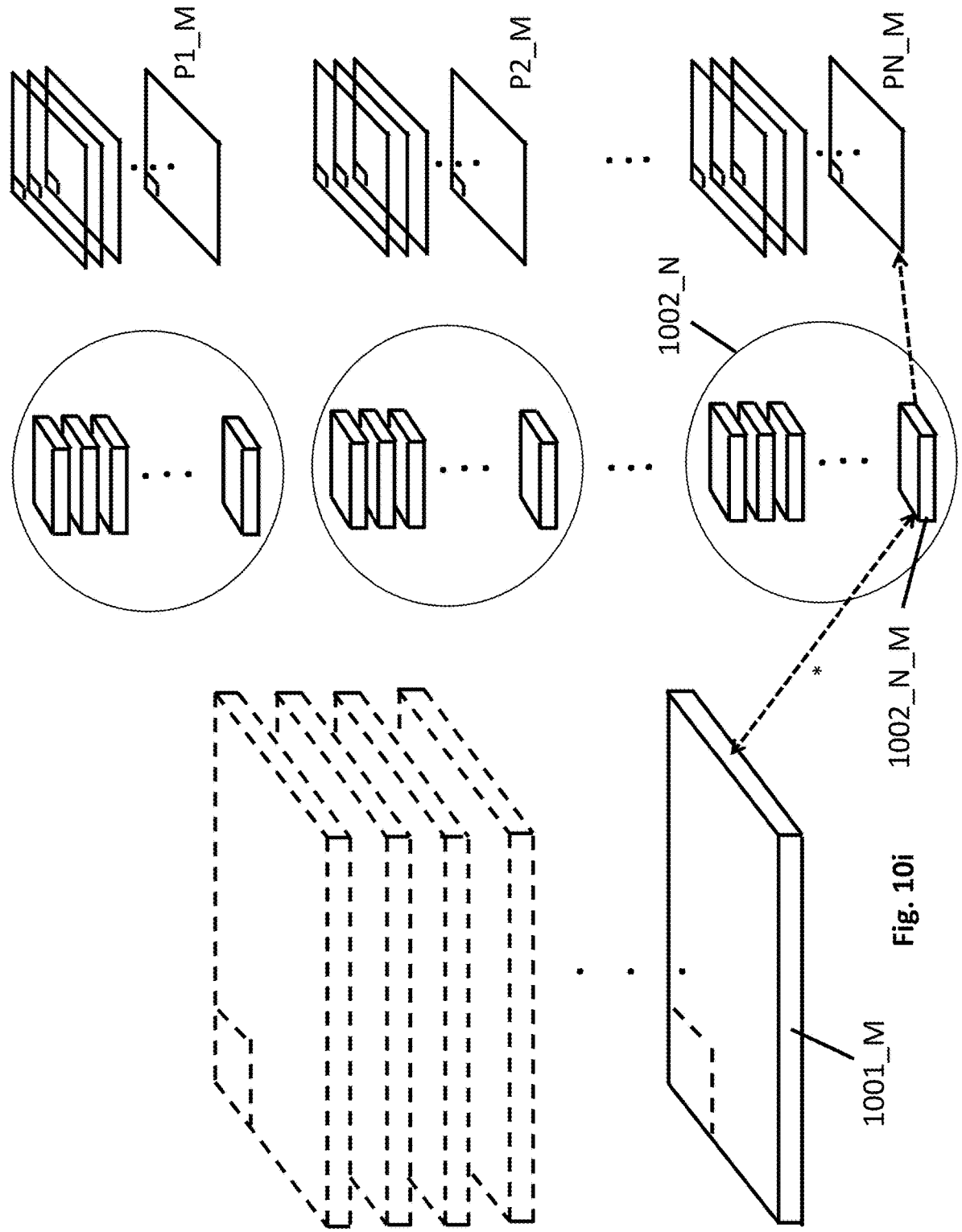

After the second image plane 1001_2 is exhausted, the third image plane is loaded and processed as described above for the first and second image planes. Each image plane is then similarly processed in succession. FIG. 10i shows the last 2D convolution for the last image plane 1001_M with the bottom level of coefficients 1002_N_M for the last coefficient set 1002_N which produces the last intermediate resultant plane PN_M. At this point all intermediate planes for all the coefficient sets have been calculated. FIG. 10j shows the summation of all intermediate planes for a particular coefficient set to produce the final resultant plane for each coefficient set, which, in turn, corresponds to the resultant of the CNN layer. That is, summation 910 of FIG. 9a is performed for each of the N sets of coefficients. Each of resultant planes 1003_1 through 1003_N therefore correspond to resultant planes 803_1 through 803_N of FIG. 8.

In an embodiment, the machine performs the additions of 10j by keeping a "running intermediate plane sum" rather than separately storing each intermediate plane and then summing over them. For instance, referring to FIGS. 10a and 10f, intermediate plane P1_2 is added to intermediate plane P1_1 just after intermediate plane P1_2 is created. The resultant summation of planes P1_1 and P1_2 is stored, e.g., internally within the stencil processor unit. When intermediate plane P1_3 is created (not shown) as the resultant of the 2D convolution of the third image plane with the third plane 1002_1_3 within the first coefficient set (also not shown), the P1_1/P1_2 summation result is subsequently recalled and added to intermediate plane P1_3. The resultant is again stored and will be recalled for addition to intermediate plane P1_4 after its creation. Similar processing is applied to the intermediate planes of the other coefficient sets. Note that if the x,y dimensions of the running sum and intermediate planes are greater than the dimensions of the two dimensional shift register array, the summations can be performed by parsing the running sum and next intermediate plane into sheets and loading the sheets into the two dimensional shift register array for processing, e.g., on a sheet by sheet basis.

FIGS. 11a through 11j describe an embodiment of performing a 2D convolution for a 3×3 stencil size. As discussed in more detail further below, other stencil sizes are possible. Referring to FIG. 11a, image data A through R is loaded into the two dimensional shift register. FIG. 11a shows two stencils 1101, 1102 worth of image data. For brevity, the discussion of FIGS. 11a through 11f will focus on the 2D convolution for stencils 1101, 1102 which generate output results in pixel locations H and K as depicted in FIG. 11a. It is important to recognize, however, that there exists a different stencil that is centered at each pixel location and the 2D convolutional process that will be described with respect to FIGS. 11a through 11j simultaneously generates a convolution result for every such pixel location.

Referring to FIG. 11a, in order to perform the 2D convolution, coefficient values 1103 need to be multiplied by a respectively located pixel within each of the image data stencils. That is, both of pixel values A and D are multiplied by coefficient a1 because both such pixel values and a1 are located in the top left stencil corner, both of pixel values C and F are multiplied by coefficient a3 because both such pixel values and coefficient are located in the top right stencil corner. The 2D convolution result is the summation of all nine partial products of pixel value and corresponding coefficient. As will be described in more detail further below, in an embodiment, the summation of partial products occurs over nine cycles.

Recall from the discussion of FIG. 3b that in various embodiments the stencil processor is able to issue scalar instructions that include an immediate operand to all execution lanes. In an embodiment, the 2D convolution is implemented by issuing a chain of scalar multiply add instructions where the coefficient is included in the instruction word as an immediate operand.

Referring to FIG. 11b, during a first cycle, a scalar instruction is issued having coefficient a5 as an intermediate operand. In executing the instruction, coefficient a5 is multiplied with every pixel value in the image data array and the resultant is stored in register space that is local to the pixel value within its corresponding execution lane. Again, referring only to the pair of stencils 1101, 1102 that are centered at pixel locations H and K, coefficient a5 is multiplied by H and by K. The partial product H×a5 is locally stored in the execution lane register space in pixel location 1121 at the center of stencil 1101 (which currently has pixel value H). The partial product K×a5 is locally stored in the execution lane register space in pixel location 1122 at the center of stencil 1102 (which currently has pixel value K). Here, note that the boundaries around stencils 1101 and 1102 and the pixel locations within them can be deemed as fixed regions of hardware that contain a dedicated ALU and local register space at each pixel location. That is, each pixel within stencils 1101 and 1102 can be viewed as a hardware execution lane each having a dedicated ALU execution unit and local dedicated register space.

Referring to FIG. 11c, during a second cycle, a first shift instruction is executed to shift the image data one unit to the right within the two-dimensional shift register array and a following scalar multiply-add instruction is issued having coefficient a4 as an intermediate operand. In executing the second instruction, coefficient a4 is multiplied with every pixel value in the image data array and the resultant is stored in register space that is local to the pixel value within its corresponding execution lane. Again, referring only to the pair of stencils 1101, 1102 that are now centered at pixel locations G and J, coefficient a4 is multiplied by G and by J. The partial product G×a4 is added to the locally stored value in the execution lane register space at the center of stencil 1101 (i.e., pixel location 1121 which contains value H×a5) and the resultant S_H is written back to the same register space. The partial product J×a4 is added to the locally stored value in the execution lane register space at the center of stencil 1102 (i.e., pixel location 1122 which currently has value K×a5) and the resultant S_K is written back to the same register space.

Referring to FIG. 11d, during a third cycle, a first shift instruction is executed to shift the image data one unit down within the two-dimensional shift register array and a following scalar multiply-add instruction is issued having coefficient a1 as an intermediate operand. In executing the second instruction, coefficient a1 is multiplied with every pixel value in the image data array and the resultant is stored in register space that is local to the pixel value within its corresponding execution lane. Again, referring only to the pair of stencils 1101, 1102 that are now centered at pixel locations A and D, coefficient a1 is multiplied by A and by D. The partial product A×a1 is added to the locally stored value in the execution lane register space at the center of stencil 1101 (which contains value S_H from FIG. 11c) and the resultant S_H is written back to the same register space. The partial product D×a1 is added to the locally stored value in the execution lane register space at the center of stencil 1102 (which contains value S_K from FIG. 11c) and the resultant S_K is written back to the same register space.

FIGS. 11e through 11j show six more such cycles each having a corresponding shift that places a new pixel value in the center of the stencils that has yet to be multiplied by a coefficient. After the last cycle of FIG. 11j is executed the resultant for the 2D convolution is resident in the local register space in the center of each stencil (value S_H for stencil 1101 and value S_K for stencil 1102).

Figure 12:
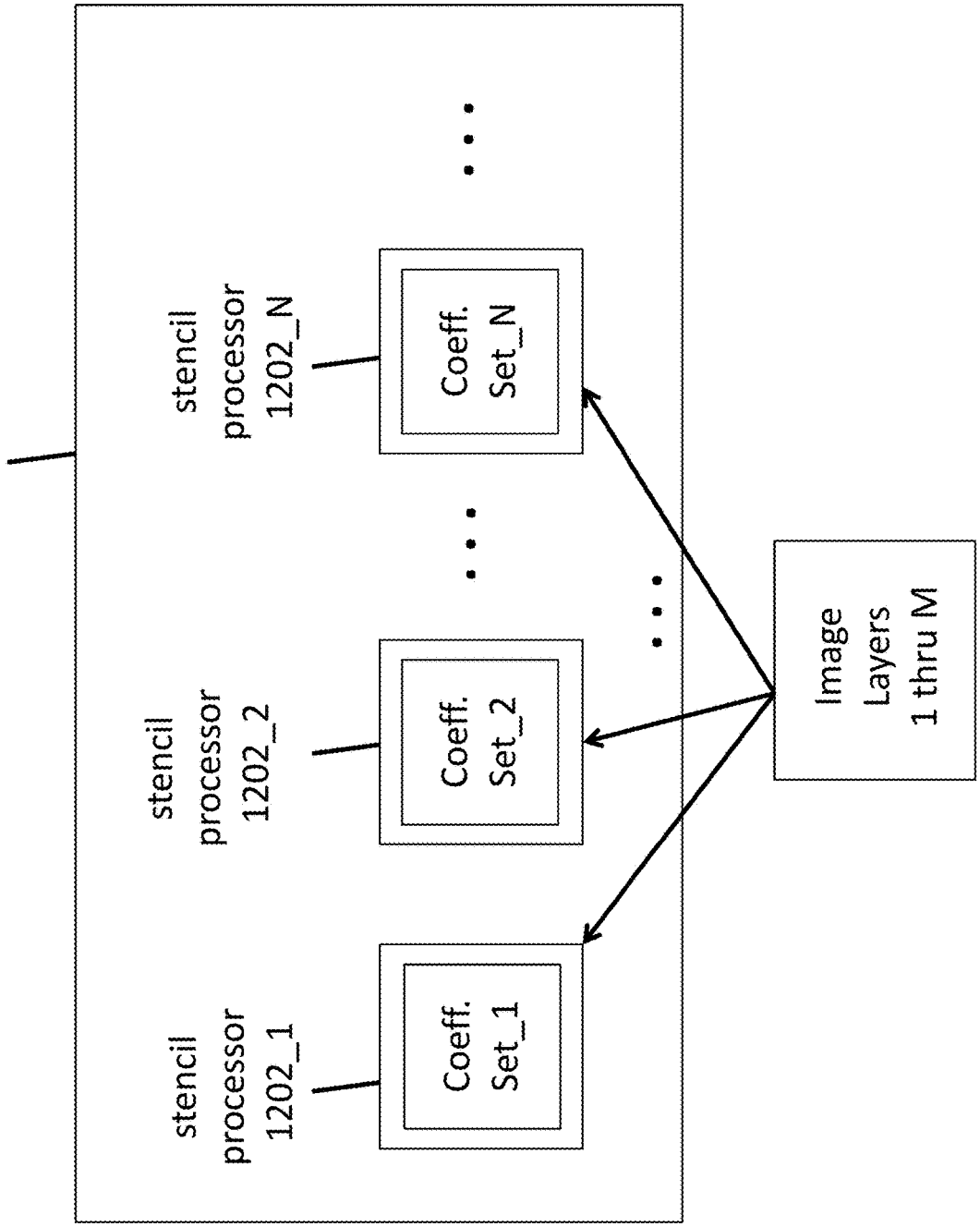
FIG. 12 shows a first image processor CNN layer configuration.

Although the above discussion was directed to an approach in which an entire CNN layer was executed on a same stencil processor, other approaches may attempt to parallelize the CNN layer execution across multiple stencil processors (recall that FIG. 8 shows an embodiment of the calculations associated with a CNN layer). For example, referring to FIGS. 8 and 12, if N is less than the number of stencil processors, each stencil processor may be assigned its own 3D convolution (i.e., each stencil processor performs a 3D convolution with its own unique coefficient set). Thus, each stencil processor receives same image data but convolves it with different coefficient sets. In this case, the ordering suggested by FIG. 9a can be followed at each stencil processor (i.e., each stencil processor convolves each plane of image data against a single coefficient set). Even if N is greater than the number of stencil processors, the execution of the CNN layer may still be distributed/parallelized by, e.g., having each stencil processor process two or more unique coefficient sets.

Figure 13:
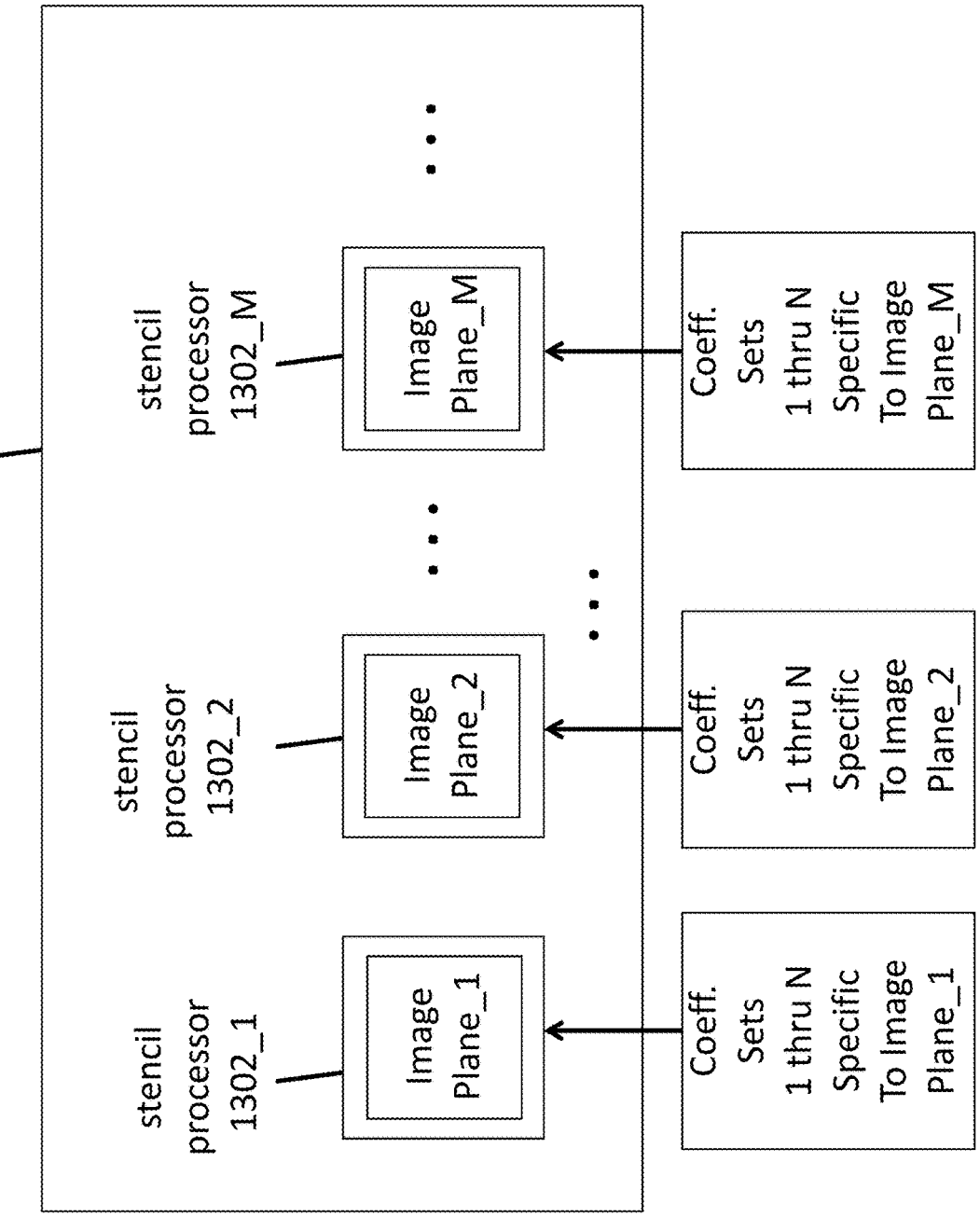
FIG. 13 shows a second image processor CNN layer configuration.

In yet another parallelizing approach, depicted in FIG. 13, different planes of the input image data are uniquely assigned to different stencil processors. Each stencil processor, e.g., is loaded with the appropriate planar level for all of the coefficient sets. For example, the stencil processor 1302_1 that is assigned to process the first (highest) image data plane receives the first (highest) plane of all N coefficient sets. The stencil processor then proceeds to perform the operations of FIGS. 10b-d, while, concurrently, another stencil processor 1302_2 that is assigned to handle the second (next lower) image plane performs the convolutions of FIGS. 10f-10h. In this approach, the intermediate sum planes for a same coefficient set will be distributed across multiple stencil processors and should subsequently be moved to a same stencil processor for aligned summation to generate the particular resultant plane for the coefficient set. Here, different stencil processors can concurrently calculate different resultant planes for different coefficient sets. In an extension of this approach, more than one plane of image data may be assigned to any particular stencil processor (e.g., if the number of image data planes exceeds the number of stencil processors).

Figure 14:
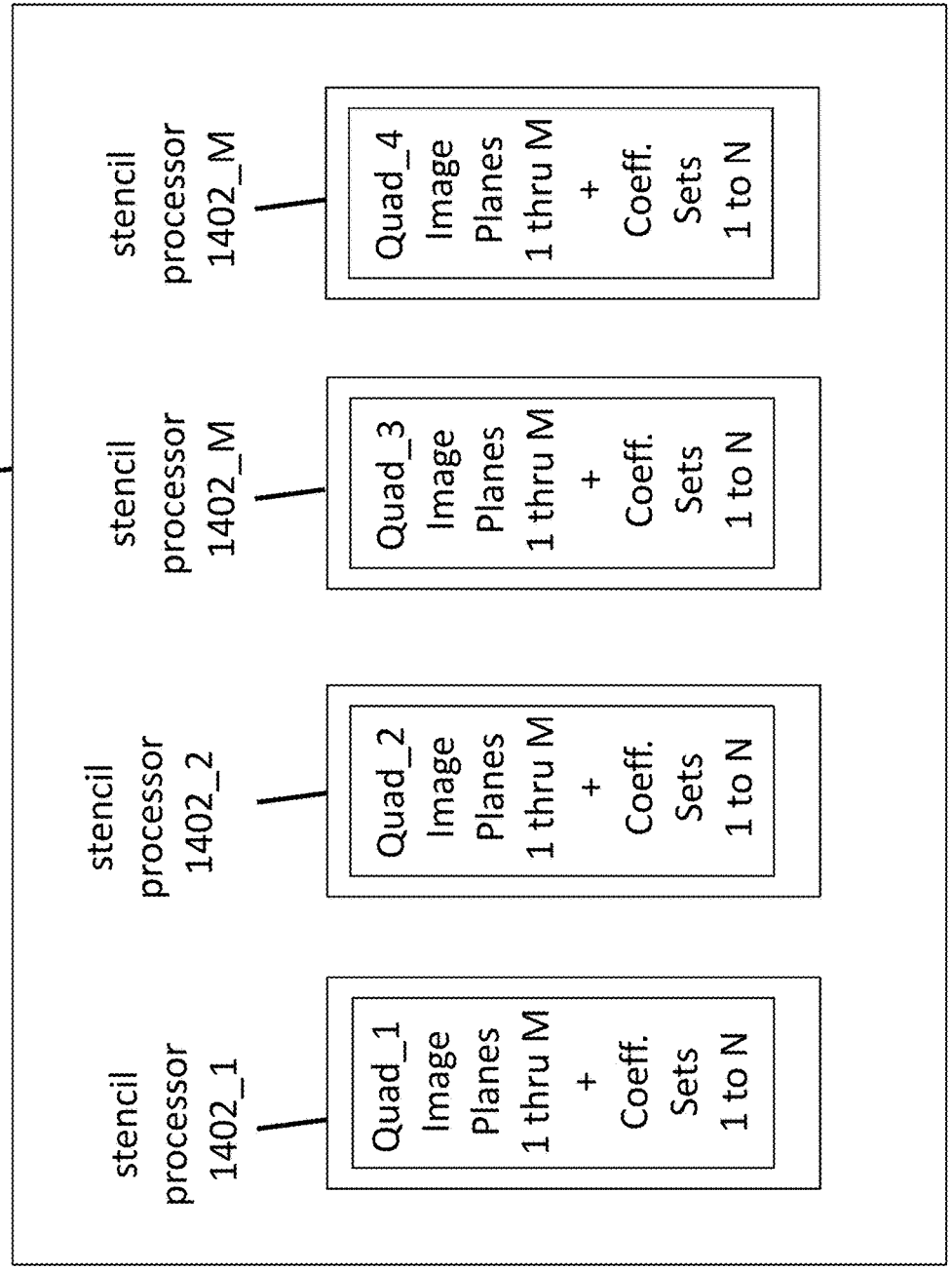
FIG. 14 shows a third image processor CNN layer configuration.

In yet another approach, depicted in FIG. 14, each stencil processor could be assigned to operate on only a particular area of the resultant plane. For example a first stencil processor 1402_1 operates on a first quadrant of the image plane surface area, a second stencil processor 1402_2 operates on a second quadrant of the image plane surface area, a third stencil processor 1402_3 operates on a third quadrant of the image plane surface area and a fourth stencil processor 1402_4 operates on a fourth quadrant of the image plane surface area. Each stencil processor executes an entire CNN layer but only on $\frac{1}{4}^{th}$ of the surface area of the overall image. The final resultant planes are realized by "fitting" the appropriate resultant planes next to one another in the correct quadrant their associated stencil processor processed over. FIG. 14 only shows one type of embodiment in which the image is broken down into four quadrants. Other configurations may have less unique surfaces (e.g. two halves) or more unique surface areas (e.g., nine, sixteen, etc.). Any overlapping inputs amongst the different image sections should be sent to more than one stencil processor.

In still yet other configurations, more than one CNN layer each having N coefficient sets may be executed on a single stencil processor. In an embodiment, executing multiple CNN layers on a single stencil processor may be performed by time multiplexing amongst the multiple CNN layers. FIG. 15 shows a simplistic example in which two different CNN layers are being multiplexed on a same stencil processor. Here, a first plane of input image data 1501_1 is loaded into the stencil processor RAM. The stencil processor then proceeds to perform 2D convolutions of the image data 1501_1 with the appropriate plane for each of the coefficient sets 1502_1 through 1502_N for the first CNN layer. The resultant intermediate planes are summed in a running sum accumulator as described above.

After the last coefficient set 1502_N for the first CNN layer has been convolved over and its intermediate plane added into the accumulator, the next CNN layer is processed. That is, image data plane 1501_1 is not switched out of the active context of the stencil processor but instead continues to be used with the appropriate respective layers of the coefficient set 1512_1 through 1512_N for the second CNN layer. Intermediate planes for the second CNN layer are accumulated in a separate accumulator than the accumulator for the first CNN layer. After the appropriate respective planes of the second set of coefficients 1512_1 through 1512_N have been processed, a next image plane for the image data is switched into the context of the stencil processor and the process repeats but with a different respective plane for both coefficient sets.

In still yet another approach, the output for a first CNN feeds directly as the input for a second CNN. For example, the summation of the intermediate planes for coefficient set 1502 produce an input image plane for a next, following CNN to be executed by the stencil processor having coefficient set 1512.

In still yet other configurations, different and independent images may be assigned to different stencil processors (so that CNNs on different images can be concurrently performed by the image processor).

Although 3×3 stencil sizes were emphasized in the preceding discussions, in one embodiment, the machine is designed to support (e.g., through configuration register space of the image processor and/or compiled program code) multiple 3D stencils (e.g., 1×1×M, 3×3×M, 5×5×M and 7×7×M).

Although the multiplication and summation operations described above may be computed in floating point notation, in other embodiments that may be computed in fixed point integer notation. Further still, the fixed integer notation may be low precision (e.g., 8 bits or less (such as 5 bits)) or higher precision. Lower precision fixed integer is understood to be more time/energy efficient without loss of image quality for many applications.

In various embodiments, the executable program code is structured to execute 2 (e.g., 8 bit) multiply-adds (MADs) on a single ALU lane in order to achieve 2 MADs per cycle. In an embodiment, the ALU lane hardware is designed to perform two 8-bit-by-8-bit multiplies (i.e., four 8 bit input operands) and then add the two 16-bit products and a 32-bit accumulator together to produce a 32-bit sum in one cycle. Here, the accumulator corresponds to a 32 bit input operand that is added to the multiply resultant with the summation resultant being written into the output "accumulator" register. Here, both multiplies are assumed to be for the same pixel in the output plane and therefore can be added together. The four 8 bit input operands consist of two inputs from the same input image plane and two coefficient values.

In an alternate embodiment, each ALU lane is designed to support dual 8 bit multiply-adds in order to achieve 2 MADs per cycle. That is, the hardware performs a first 8 bit×8 bit multiply and resultant summation with 16 bit input operand into resultant 16 bit accumulator and a second, separate 8 bit×8 bit multiply and resultant summation with separate 16 bit input operand into separate 16 bit accumulator. It is possible, however, that the 16 bit accumulators will saturate in a single cycle (e.g., with full 8 bit input multiplicands) requiring a transfer into a 32 bit accumulator on every cycle which could drop the overall rate to 1 MAD per cycle overall.

In order to avoid the saturation hit, lower resolution input multiplicand data may be used. For example, a pair of 6 bit×6 bit multiplies may be performed with respective resultants that are summed into separate, respective 16 bit accumulators with a respective different 16 bit input operand. The lower resolution input multiplicand requires multiple cycles before 16 bit accumulator saturation and corresponding transfer into a 32 bit accumulator. For example, saturation may occur every 16 cycles. In the case of saturation every 16 cycles, every $17^{th}$ cycle the dual 16 bit accumulators may be added and every $18^{th}$ cycle the resultant of the immediately preceding dual accumulator sum may be added to a running 32 bit accumulator. In an embodiment, the hardware may be designed to perform the accumulator sum and addition into 32 bit accumulator in a single cycle. In various embodiments, such a lower precision approach may be able to achieve 1.8 multiply-adds per cycle.

Higher precision applications (e.g., with more than 8 bits of input multiplicand data) can be designed to use a 32 bit input summation operand and accumulator resultant with approximately 1 MAD being performed per cycle. So doing will, similar to the low precision approach, avoid saturation of the accumulator only until after a significant number of cycles have been executed. For example, in the case of 12 bit input multiplicand image data, 256 cycles of single MADs are executed before the 32 bit accumulator will saturate.

FIG. 16 shows a method that includes executing a convolutional neural network layer on an image processor having an array of execution lanes and a two-dimensional shift register 1601. The two-dimensional shift register provides local respective register space for the execution lanes. The executing of the convolutional neural network includes loading a plane of image data of a three-dimensional block of image data into the two-dimensional shift register 1602. The executing of the convolutional neural network also includes performing 1603 a two-dimensional convolution of the plane of image data with an array of coefficient values by sequentially: concurrently multiplying within the execution lanes respective pixel and coefficient values to produce an array of partial products; concurrently summing within the execution lanes the partial products with respective accumulations of partial products being kept within the two dimensional register for different stencils within the image data; and, effecting correct alignment of values for the two-dimensional convolution within the execution lanes by shifting content within the two-dimensional shift register array.

d. Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 17 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two.

As observed in FIG. 17, the basic computing system may include a central processing unit 1701 (which may include, e.g., a plurality of general purpose processing cores 1715_1 through 1715_N and a main memory controller 1717 disposed on a multi-core processor or applications processor), system memory 1702, a display 1703 (e.g., touchscreen, flat-panel), a local wired point-to-point link (e.g., USB) interface 1704, various network I/O functions 1705 (such as an Ethernet interface and/or cellular modem subsystem), a wireless local area network (e.g., WiFi) interface 1706, a wireless point-to-point link (e.g., Bluetooth) interface 1707 and a Global Positioning System interface 1708, various sensors 1709_1 through 1709_N, one or more cameras 1710, a battery 1711, a power management control unit 1712, a speaker and microphone 1713 and an audio coder/decoder 1714.

An applications processor or multi-core processor 1750 may include one or more general purpose processing cores 1715 within its CPU 1701, one or more graphical processing units 1716, a memory management function 1717 (e.g., a memory controller), an I/O control function 1718 and an image processing unit 1719. The general purpose processing cores 1715 typically execute the operating system and application software of the computing system. The graphics processing units 1716 typically execute graphics intensive functions to, e.g., generate graphics information that is presented on the display 1703. The memory control function 1717 interfaces with the system memory 1702 to write/read data to/from system memory 1702. The power management control unit 1712 generally controls the power consumption of the system 1700.

The image processing unit 1719 may be implemented according to any of the image processing unit embodiments described at length above in the preceding sections. Alternatively or in combination, the IPU 1719 may be coupled to either or both of the GPU 1716 and CPU 1701 as a co-processor thereof. Additionally, in various embodiments, the GPU 1716 may be implemented with any of the image processor features described at length above.

Each of the touchscreen display 1703, the communication interfaces 1704-1707, the GPS interface 1708, the sensors 1709, the camera 1710, and the speaker/microphone codec 1713, 1714 all can be viewed as various forms of I/O (input and/or output) relative to the overall computing system including, where appropriate, an integrated peripheral device as well (e.g., the one or more cameras 1710). Depending on implementation, various ones of these I/O components may be integrated on the applications processor/multi-core processor 1750 or may be located off the die or outside the package of the applications processor/multi-core processor 1750.

In an embodiment one or more cameras 1710 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, elements may be downloaded as a computer program transferred from a remote computer (e.g., a server) to a requesting computer (e.g., a client) by way of data signals embodied in a carrier wave or other propagation medium via a communication link (e.g., a modem or network connection).

In the foregoing specification, specific example embodiments have been described. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
executing a convolutional neural network layer having a plurality of coefficient sets on an image processor comprising a plurality of stencil processors, each stencil processor comprising a respective array of execution lanes and a respective two-dimensional shift-register array, the executing of the convolutional neural network layer comprising:
loading different respective portions of an image having a plurality of image planes comprising pixel values into each two-dimensional shift register array of each of the plurality of stencil processors;
loading, into each two-dimensional shift register array of each of the plurality of stencil processors, different respective coefficient sets of the plurality of coefficient sets that each correspond to a respective portion of the image loaded into each two-dimensional shift-register array; and
performing, by each of the plurality of stencil processors, a two-dimensional convolution of the coefficient sets with the respective portions of the image loaded into the stencil processor by sequentially:
concurrently multiplying within the execution lanes respective pixel values and coefficient values of the different coefficient sets loaded into the stencil processor to produce an array of partial products;
concurrently summing within the execution lanes the partial products with respective accumulations of partial products being kept within the two-dimensional shift register array for different stencils defining sub-regions of pixel values of the image; and
shifting content within the two-dimensional shift register array according to a two-dimensional pattern associated with the convolution.

2. The method of claim 1, wherein loading the different respective portions of the image comprises loading different respective image planes, and wherein each stencil processor is configured to perform the two-dimensional convolution using the respective coefficient sets on each of multiple respective image planes.

3. The method of claim 1, wherein loading the different respective portions of the image comprises loading different respective image planes, and wherein each stencil processor is configured to perform the two-dimensional convolution using the respective coefficient sets on a respective image plane.

4. The method of claim 1, wherein loading the different respective portions of the image comprises loading different respective portions of an image plane, and wherein each stencil processor is configured to perform the two-dimensional convolution using the respective coefficient sets on the respective portion of the image plane.

5. The method of claim 1, wherein the concurrently multiplying further comprises concurrently multiplying a same coefficient value against the portion of the image within the two-dimensional shift register array.

6. The method of claim 1, wherein shifting content within the two-dimensional shift register array comprises shifting the portion of the image within the two-dimensional shift register array prior to multiplying the portion of the image by a next coefficient value along a same direction of the two-dimensional shift register array.

7. The method of claim 1, wherein the image processor is configured to use an output from the convolutional neural network layer as an input for a next convolutional neural network layer to be computed by the image processor.

8. The method of claim 1, wherein the image processor is configured to multiplex the convolutional neural network layer and a second convolutional neural network layer with the portion of the image remaining local to the execution lanes between processing of the convolutional neural network layer and the second convolutional neural network layer.

9. The method of claim 1, wherein the two-dimensional shift register array of each stencil processor comprises local respective register space accessible by the array of execution lanes of the stencil processor, the local respective register space comprising respective dedicated register space for each execution lane, and wherein executing the convolutional neural network layer further comprises:
whenever the content is shifted in the two-dimensional shift register array, multiplying within the execution lanes the respective pixel values and coefficient values by reading respective shifted pixel values from the respective dedicated register space for each execution lane.

10. The method of claim 1, wherein each stencil processor is interconnected with a respective sheet generator unit, each sheet generator unit configured to perform operations comprising:
receiving, by the sheet generator unit, input image data;
generating a sheet from the input image data; and
sending the sheet to a stencil processor interconnected with the sheet generator unit,
wherein loading the different respective portions of the image having a plurality of image planes comprises loading the sheet from a respective sheet generator unit interconnected with the stencil processor.

11. A non-transitory machine readable storage medium having stored thereon program code that when processed by an image processor comprising a plurality of stencil processors, each stencil processor comprising a respective array of execution lanes and a respective two-dimensional shift register array, causes the image processor to execute a convolutional neural network layer having a plurality of coefficient sets including performing operations comprising:
loading different respective portions of an image having a plurality of image planes comprising pixel values into each two-dimensional shift register array of each of the plurality of stencil processors;
loading, into each two-dimensional shift register array of each of the plurality of stencil processors, different respective coefficient sets of the plurality of coefficient sets that each correspond to a respective portion of the image loaded into each two-dimensional shift-register array; and
performing, by each of the plurality of stencil processors, a two-dimensional convolution of the coefficient sets with the respective portions of the image loaded into the stencil processor by sequentially:
concurrently multiplying within the execution lanes respective pixel values and coefficient values of the different coefficient sets loaded into the stencil processor to produce an array of partial products;
concurrently summing within the execution lanes the partial products with respective accumulations of partial products being kept within the two-dimensional shift register array for different stencils defining sub-regions of pixel values of the image; and shifting content within the two-dimensional shift register array according to a two-dimensional pattern associated with the convolution.

12. The non-transitory machine readable storage medium of claim 11, wherein loading the different respective portions of the image comprises loading different respective image planes, and wherein each stencil processor is configured to perform the two-dimensional convolution using the respective coefficient sets on each of multiple respective image planes.

13. The non-transitory machine readable storage medium of claim 11, wherein loading the different respective portions of the image comprises loading different respective image planes, and wherein each stencil processor is configured to perform the two-dimensional convolution using the respective coefficient sets on a respective image plane.

14. The non-transitory machine readable storage medium of claim 11, wherein loading the different respective portions of the image comprises loading different respective portions of an image plane, and wherein each stencil processor is configured to perform the two-dimensional convolution using the respective coefficient sets on the respective portion of the image plane.

15. The non-transitory machine readable storage medium of claim 11, wherein the concurrently multiplying further comprises concurrently multiplying a same coefficient value against the portion of the image within the two-dimensional shift register array.

16. The non-transitory machine readable storage medium of claim 11, wherein shifting content within the two-dimensional shift register array comprises shifting the portion of the image within the two-dimensional shift register array prior to multiplying the portion of the image by a next coefficient value along a same direction of the two-dimensional shift register array.

17. The non-transitory machine readable storage medium of claim 11, wherein the image processor is configured to use an output from the convolutional neural network layer as an input for a next convolutional neural network layer to be computed by the image processor.

18. An apparatus, comprising:
an image processor comprising a plurality of stencil processors, each stencil processor comprising a respective array of execution lanes and a respective two-dimensional shift register array; and
a non-transitory machine readable storage medium having stored thereon program code that when executed by the image processor causes the image processor to execute a convolutional neural network layer having a plurality of coefficient sets including performing operations comprising:
loading different respective portions of an image having a plurality of image planes comprising pixel values into each two-dimensional shift register array of each of the plurality of stencil processors;
loading, into each two-dimensional shift register array of each of the plurality of stencil processors, different respective coefficient sets of the plurality of coefficient sets that each correspond to a respective portion of the image loaded into each two-dimensional shift-register array; and
performing, by each of the plurality of stencil processors, a two-dimensional convolution of the coefficient sets with the respective portions of the image loaded into the stencil processor by sequentially:
concurrently multiplying within the execution lanes respective pixel values and coefficient values of the different coefficient sets loaded into the stencil processor to produce an array of partial products;
concurrently summing within the execution lanes the partial products with respective accumulations of partial products being kept within the two-dimensional shift register array for different stencils defining sub-regions of pixel values of the image; and
shifting content within the two-dimensional shift register array according to a two-dimensional pattern associated with the convolution.

\* \* \* \* \*